United States Patent [19]
Sasaki et al.

[11] Patent Number: 6,069,987
[45] Date of Patent: May 30, 2000

[54] OPTICAL DEVICE FOR AN OPTICAL NETWORK UNIT AND MANUFACTURING METHOD THEREFOR

[75] Inventors: Hironori Sasaki; Takeshi Kamijoh, both of Tokyo, Japan

[73] Assignee: Oki Electric Industry Co., Ltd., Tokyo, Japan

[21] Appl. No.: 09/081,080

[22] Filed: May 19, 1998

[30] Foreign Application Priority Data

| May 21, 1997 | [JP] | Japan | 9-147115 |
| Oct. 29, 1997 | [JP] | Japan | 9-312611 |
| Nov. 17, 1997 | [JP] | Japan | 9-322444 |

[51] Int. Cl.$^7$ ............................... G02B 6/28; G02B 6/34; G02B 5/32
[52] U.S. Cl. ............................... 385/24; 385/37; 385/34; 385/89; 359/9; 359/15; 359/130
[58] Field of Search ............................... 385/15, 24, 31, 385/33, 34, 37, 88, 89, 49, 50; 359/9, 10, 15, 19, 20, 25, 130, 568

[56] References Cited

U.S. PATENT DOCUMENTS

| 5,774,239 | 6/1998 | Feldman et al. ............... 359/9 |
| 5,930,012 | 7/1999 | Mears et al. ............... 359/15 |
| 5,937,115 | 8/1999 | Domash ............... 385/37 |

OTHER PUBLICATIONS

Dr. Sing H. Lee, "CghCAD, Diffractive Optical Element and Computer Generated Hologram CAD for E–Bean Lithography", NIPT, Inc., Mar. 1996, pp. 9–11.

*Primary Examiner*—Hemang Sanghavi
*Attorney, Agent, or Firm*—Venable; Robert J. Frank; Allen Wood

[57] ABSTRACT

An optical device for use in optical communication optical network units, having an aptitude for efficient production, manufacturing cost reduction and size reduction, comprising: a first CGH element 21 for converting a multiplexed light from the first input terminal 11 into a parallel light beam; a wavelength splitting filter 23 for deflecting a light having passed through the CGH elements according to wavelengths; a second CGH element 22 for directing a first wavelength component separated by the wavelength splitting filter to the first output terminal 12; an optical path splitting means 22 for guiding a second wavelength component separated by the wavelength splitting filter to a desired optical path; a third CGH element 24 for directing a beam of a second wavelength component having passed through one optical path 27 to a second output terminal 18; and a fourth CGH element 26 guiding a beam of the second wavelength component from the second input terminal 17 to the optical path splitting means 24 so as to transmit the beam of the second wavelength component to travel through the other optical path 28 to the first input terminal 11.

34 Claims, 71 Drawing Sheets

FIG. 2

$$\rho(x,y) = \sum_{r=0}^{10} \frac{1}{r!} \left(x\frac{\partial}{\partial \eta} + y\frac{\partial}{\partial \xi}\right)^r \rho(\eta,\xi)\bigg|_{\eta=\xi=0} + \Delta \quad (3)$$

TAYLOR EXPANSION

FIG. 3

TABLE (1)

| m+n | POWER SERIES | OPTICAL PATH DIFFERENCE COEF. | EQ No. |
|---|---|---|---|
| 0 | 1 | $C_0 = 1$ | (4-0) |
| 1 | $x$ | $C_1 = \frac{\partial}{\partial x}\rho(x,y)\big|_{x=y=0}$ | (4-1) |
| 1 | $y$ | $C_2 = \frac{\partial}{\partial y}\rho(x,y)\big|_{x=y=0}$ | (4-2) |
| 2 | $x^2$ | $C_3 = \frac{1}{2}\left(\frac{\partial}{\partial x}\right)^2 \rho(x,y)\big|_{x=y=0}$ | (4-3) |
| 2 | $xy$ | $C_4 = \frac{\partial}{\partial x}\frac{\partial}{\partial y}\rho(x,y)\big|_{x=y=0}$ | (4-4) |
| 2 | $y^2$ | $C_5 = \frac{1}{2}\left(\frac{\partial}{\partial y}\right)^2 \rho(x,y)\big|_{x=y=0}$ | (4-5) |
| 3 | $x^3$ | $C_6 = \frac{1}{6}\left(\frac{\partial}{\partial x}\right)^3 \rho(x,y)\big|_{x=y=0}$ | (4-6) |
| 3 | $x^2 y$ | $C_7 = \frac{1}{2}\left(\frac{\partial}{\partial x}\right)^2 \frac{\partial}{\partial y}\rho(x,y)\big|_{x=y=0}$ | (4-7) |
| 3 | $xy^2$ | $C_8 = \frac{1}{2}\frac{\partial}{\partial x}\left(\frac{\partial}{\partial y}\right)^2 \rho(x,y)\big|_{x=y=0}$ | (4-8) |
| 3 | $y^3$ | $C_9 = \frac{1}{6}\left(\frac{\partial}{\partial y}\right)^3 \rho(x,y)\big|_{x=y=0}$ | (4-9) |

FIG. 4

TABLE (2)

| m+n | POWER SERIES | OPTICAL PATH DIFFERENCE COEF. | EQ No. |
|---|---|---|---|
| 4 | $x^4$ | $C_{10} = \frac{1}{24}\left(\frac{\partial}{\partial x}\right)^4 \rho(x,y)\big|_{x=y=0}$ | (4-10) |
| | $x^3 y$ | $C_{11} = \frac{1}{6}\left(\frac{\partial}{\partial x}\right)^3 \frac{\partial}{\partial y} \rho(x,y)\big|_{x=y=0}$ | (4-11) |
| | $x^2 y^2$ | $C_{12} = \frac{1}{4}\left(\frac{\partial}{\partial x}\right)^2 \left(\frac{\partial}{\partial y}\right)^2 \rho(x,y)\big|_{x=y=0}$ | (4-12) |
| | $x y^3$ | $C_{13} = \frac{1}{6}\frac{\partial}{\partial x}\left(\frac{\partial}{\partial y}\right)^3 \rho(x,y)\big|_{x=y=0}$ | (4-13) |
| | $y^4$ | $C_{14} = \frac{1}{24}\left(\frac{\partial}{\partial y}\right)^4 \rho(x,y)\big|_{x=y=0}$ | (4-14) |
| 5 | $x^5$ | $C_{15} = \frac{1}{120}\left(\frac{\partial}{\partial x}\right)^5 \rho(x,y)\big|_{x=y=0}$ | (4-15) |
| | $x^4 y$ | $C_{16} = \frac{1}{24}\left(\frac{\partial}{\partial x}\right)^4 \frac{\partial}{\partial y} \rho(x,y)\big|_{x=y=0}$ | (4-16) |
| | $x^3 y^2$ | $C_{17} = \frac{1}{12}\left(\frac{\partial}{\partial x}\right)^3 \left(\frac{\partial}{\partial y}\right)^3 \rho(x,y)\big|_{x=y=0}$ | (4-17) |
| | $x^2 y^3$ | $C_{18} = \frac{1}{12}\left(\frac{\partial}{\partial x}\right)^2 \left(\frac{\partial}{\partial y}\right)^3 \rho(x,y)\big|_{x=y=0}$ | (4-18) |
| | $x y^4$ | $C_{19} = \frac{1}{24}\frac{\partial}{\partial x}\left(\frac{\partial}{\partial y}\right)^4 \rho(x,y)\big|_{x=y=0}$ | (4-19) |
| | $y^5$ | $C_{20} = \frac{1}{120}\left(\frac{\partial}{\partial y}\right)^5 \rho(x,y)\big|_{x=y=0}$ | (4-20) |

FIG. 5

TABLE (3)

| m+n | POWER SERIES | OPTICAL PATH DIFFERENCE COEF. | EQ No. |
|---|---|---|---|
| 6 | $x^6$ | $C_{21} = \frac{1}{720} \left(\frac{\partial}{\partial y}\right)^6 \rho(x,y)\bigg|_{x=y=0}$ | (4-21) |
| | $x^5 y$ | $C_{22} = \frac{1}{120} \left(\frac{\partial}{\partial x}\right)^5 \frac{\partial}{\partial y} \rho(x,y)\bigg|_{x=y=0}$ | (4-22) |
| | $x^4 y^2$ | $C_{23} = \frac{1}{48} \left(\frac{\partial}{\partial x}\right)^4 \left(\frac{\partial}{\partial y}\right)^2 \rho(x,y)\bigg|_{x=y=0}$ | (4-23) |
| | $x^3 y^3$ | $C_{24} = \frac{1}{36} \left(\frac{\partial}{\partial x}\right)^3 \left(\frac{\partial}{\partial y}\right)^3 \rho(x,y)\bigg|_{x=y=0}$ | (4-24) |
| | $x^2 y^4$ | $C_{25} = \frac{1}{48} \left(\frac{\partial}{\partial x}\right)^2 \left(\frac{\partial}{\partial y}\right)^4 \rho(x,y)\bigg|_{x=y=0}$ | (4-25) |
| | $xy^5$ | $C_{26} = \frac{1}{120} \frac{\partial}{\partial x} \left(\frac{\partial}{\partial y}\right)^5 \rho(x,y)\bigg|_{x=y=0}$ | (4-26) |
| | $y^6$ | $C_{27} = \frac{1}{720} \left(\frac{\partial}{\partial y}\right)^6 \rho(x,y)\bigg|_{x=y=0}$ | (4-27) |

FIG. 6

TABLE (4)

| m+n | POWER SERIES | OPTICAL PATH DIFFERENCE COEF. | EQ No. |
|---|---|---|---|
| 7 | $x^7$ | $C_{28} = \frac{1}{5040} \left(\frac{\partial}{\partial x}\right)^7 \rho(x,y) \Big|_{x=y=0}$ | (4-28) |
| | $x^6 y$ | $C_{29} = \frac{1}{720} \left(\frac{\partial}{\partial x}\right)^6 \frac{\partial}{\partial y} \rho(x,y) \Big|_{x=y=0}$ | (4-29) |
| | $x^5 y^2$ | $C_{30} = \frac{1}{240} \left(\frac{\partial}{\partial x}\right)^5 \left(\frac{\partial}{\partial y}\right)^2 \rho(x,y) \Big|_{x=y=0}$ | (4-30) |
| | $x^4 y^3$ | $C_{31} = \frac{1}{144} \left(\frac{\partial}{\partial x}\right)^4 \left(\frac{\partial}{\partial y}\right)^3 \rho(x,y) \Big|_{x=y=0}$ | (4-31) |
| | $x^3 y^4$ | $C_{32} = \frac{1}{144} \left(\frac{\partial}{\partial x}\right)^3 \left(\frac{\partial}{\partial y}\right)^4 \rho(x,y) \Big|_{x=y=0}$ | (4-32) |
| | $x^2 y^5$ | $C_{33} = \frac{1}{240} \left(\frac{\partial}{\partial x}\right)^2 \left(\frac{\partial}{\partial y}\right)^5 \rho(x,y) \Big|_{x=y=0}$ | (4-33) |
| | $xy^6$ | $C_{34} = \frac{1}{720} \frac{\partial}{\partial x} \left(\frac{\partial}{\partial y}\right)^6 \rho(x,y) \Big|_{x=y=0}$ | (4-34) |
| | $y^7$ | $C_{35} = \frac{1}{5040} \left(\frac{\partial}{\partial x}\right)^7 \rho(x,y) \Big|_{x=y=0}$ | (4-35) |

FIG. 7

TABLE (5)

| m+n | POWER SERIES | OPTICAL PATH DIFFERENCE COEF. | EQ No. |
|---|---|---|---|
| 8 | $x^8$ | $C_{36} = \frac{1}{40320}\left(\frac{\partial}{\partial x}\right)^8 \rho(x,y)\Big|_{x=y=0}$ | (4-36) |
|  | $x^7 y$ | $C_{37} = \frac{1}{5040}\left(\frac{\partial}{\partial x}\right)^7 \frac{\partial}{\partial y} \rho(x,y)\Big|_{x=y=0}$ | (4-37) |
|  | $x^6 y^2$ | $C_{38} = \frac{1}{1440}\left(\frac{\partial}{\partial x}\right)^6 \left(\frac{\partial}{\partial y}\right)^2 \rho(x,y)\Big|_{x=y=0}$ | (4-38) |
|  | $x^5 y^3$ | $C_{39} = \frac{1}{720}\left(\frac{\partial}{\partial x}\right)^5 \left(\frac{\partial}{\partial y}\right)^3 \rho(x,y)\Big|_{x=y=0}$ | (4-39) |
|  | $x^4 y^4$ | $C_{40} = \frac{1}{576}\left(\frac{\partial}{\partial x}\right)^4 \left(\frac{\partial}{\partial y}\right)^4 \rho(x,y)\Big|_{x=y=0}$ | (4-40) |
|  | $x^3 y^5$ | $C_{41} = \frac{1}{720}\left(\frac{\partial}{\partial x}\right)^3 \left(\frac{\partial}{\partial y}\right)^5 \rho(x,y)\Big|_{x=y=0}$ | (4-41) |
|  | $x^2 y^6$ | $C_{42} = \frac{1}{1440}\left(\frac{\partial}{\partial x}\right)^2 \left(\frac{\partial}{\partial y}\right)^6 \rho(x,y)\Big|_{x=y=0}$ | (4-42) |
|  | $xy^7$ | $C_{43} = \frac{1}{5040}\left(\frac{\partial}{\partial x}\right)^7 \rho(x,y)\Big|_{x=y=0}$ | (4-43) |
|  | $y^8$ | $C_{44} = \frac{1}{40320}\left(\frac{\partial}{\partial x}\right)^8 \rho(x,y)\Big|_{x=y=0}$ | (4-44) |

FIG. 8

TABLE (6)

| m+n | POWER SERIES | OPTICAL PATH DIFFERENCE COEF. | EQ No. |
|---|---|---|---|
| 9 | $x^9$ | $C_{45} = \frac{1}{362880}\left(\frac{\partial}{\partial x}\right)^9 \rho(x,y)\Big|_{x=y=0}$ | (4-45) |
| | $x^8 y$ | $C_{46} = \frac{1}{40320}\left(\frac{\partial}{\partial x}\right)^8 \frac{\partial}{\partial y} \rho(x,y)\Big|_{x=y=0}$ | (4-46) |
| | $x^7 y^2$ | $C_{47} = \frac{1}{10080}\left(\frac{\partial}{\partial x}\right)^7 \left(\frac{\partial}{\partial y}\right)^2 \rho(x,y)\Big|_{x=y=0}$ | (4-47) |
| | $x^6 y^3$ | $C_{48} = \frac{1}{4320}\left(\frac{\partial}{\partial x}\right)^6 \left(\frac{\partial}{\partial y}\right)^3 \rho(x,y)\Big|_{x=y=0}$ | (4-48) |
| | $x^5 y^4$ | $C_{49} = \frac{1}{2880}\left(\frac{\partial}{\partial x}\right)^5 \left(\frac{\partial}{\partial y}\right)^4 \rho(x,y)\Big|_{x=y=0}$ | (4-49) |
| | $x^4 y^5$ | $C_{50} = \frac{1}{2880}\left(\frac{\partial}{\partial x}\right)^4 \left(\frac{\partial}{\partial y}\right)^5 \rho(x,y)\Big|_{x=y=0}$ | (4-50) |
| | $x^3 y^6$ | $C_{51} = \frac{1}{4320}\left(\frac{\partial}{\partial x}\right)^3 \left(\frac{\partial}{\partial y}\right)^6 \rho(x,y)\Big|_{x=y=0}$ | (4-51) |
| | $x^2 y^7$ | $C_{52} = \frac{1}{10080}\left(\frac{\partial}{\partial x}\right)^2 \left(\frac{\partial}{\partial y}\right)^7 \rho(x,y)\Big|_{x=y=0}$ | (4-52) |
| | $xy^8$ | $C_{53} = \frac{1}{40320} \frac{\partial}{\partial x}\left(\frac{\partial}{\partial y}\right)^8 \rho(x,y)\Big|_{x=y=0}$ | (4-53) |
| | $y^9$ | $C_{54} = \frac{1}{362880}\left(\frac{\partial}{\partial y}\right)^9 \rho(x,y)\Big|_{x=y=0}$ | (4-54) |

FIG. 9

TABLE (7)

| m+n | POWER SERIES | OPTICAL PATH DIFFERENCE COEF. | EQ No. |
|---|---|---|---|
| 10 | $x^{10}$ | $C_{55} = \frac{1}{3628800}\left(\frac{\partial}{\partial x}\right)^{10} \rho(x,y)\Big|_{x=y=0}$ | (4-55) |
| | $x^9 y$ | $C_{56} = \frac{1}{362880}\left(\frac{\partial}{\partial x}\right)^9 \frac{\partial}{\partial y} \rho(x,y)\Big|_{x=y=0}$ | (4-56) |
| | $x^8 y^2$ | $C_{57} = \frac{1}{80640}\left(\frac{\partial}{\partial x}\right)^8 \left(\frac{\partial}{\partial y}\right)^2 \rho(x,y)\Big|_{x=y=0}$ | (4-57) |
| | $x^7 y^3$ | $C_{58} = \frac{1}{30240}\left(\frac{\partial}{\partial x}\right)^7 \left(\frac{\partial}{\partial y}\right)^3 \rho(x,y)\Big|_{x=y=0}$ | (4-58) |
| | $x^6 y^4$ | $C_{59} = \frac{1}{17280}\left(\frac{\partial}{\partial x}\right)^6 \left(\frac{\partial}{\partial y}\right)^4 \rho(x,y)\Big|_{x=y=0}$ | (4-59) |
| | $x^5 y^5$ | $C_{60} = \frac{1}{14400}\left(\frac{\partial}{\partial x}\right)^5 \left(\frac{\partial}{\partial y}\right)^5 \rho(x,y)\Big|_{x=y=0}$ | (4-60) |
| | $x^4 y^6$ | $C_{61} = \frac{1}{17280}\left(\frac{\partial}{\partial x}\right)^4 \left(\frac{\partial}{\partial y}\right)^6 \rho(x,y)\Big|_{x=y=0}$ | (4-61) |
| | $x^3 y^7$ | $C_{62} = \frac{1}{30240}\left(\frac{\partial}{\partial x}\right)^3 \left(\frac{\partial}{\partial y}\right)^7 \rho(x,y)\Big|_{x=y=0}$ | (4-62) |
| | $x^2 y^8$ | $C_{63} = \frac{1}{80640}\left(\frac{\partial}{\partial x}\right)^2 \left(\frac{\partial}{\partial y}\right)^8 \rho(x,y)\Big|_{x=y=0}$ | (4-63) |
| | $xy^9$ | $C_{64} = \frac{1}{362880} \frac{\partial}{\partial x}\left(\frac{\partial}{\partial y}\right)^9 \rho(x,y)\Big|_{x=y=0}$ | (4-64) |
| | $y^{10}$ | $C_{65} = \frac{1}{3628800}\left(\frac{\partial}{\partial y}\right)^{10} \rho(x,y)\Big|_{x=y=0}$ | (4-65) |

FIG. 11

TABLE (1)

| m + n | POWER SERIES | OPTICAL PATH DIFFERENCE COEF. | EQ. NO. |
|---|---|---|---|
| 0 | 1 | $C_0 = 1$ | (9-0) |
| 1 | x | $C_1 = \dfrac{n_2(S_1+S_2)}{\sqrt{(S_1+S_2)^2 + 4T_2^2}}$ | (9-1) |
| | y | $C_2 = 0$ | (9-2) |
| 2 | $x^2$ | $C_3 = \dfrac{n_1}{2T_1}$ | (9-3) |
| | xy | $C_4 = 0$ | (9-4) |
| | $y^2$ | $C_5 = \dfrac{n_1}{2T_1}$ | (9-5) |
| 3 | $x^3$ | $C_6 = 0$ | (9-6) |
| | $x^2 y$ | $C_7 = 0$ | (9-7) |
| | $xy^2$ | $C_8 = 0$ | (9-8) |
| | $y^3$ | $C_9 = 0$ | (9-9) |
| 4 | $x^4$ | $C_{10} = -\dfrac{n_1}{8T_1^3}$ | (9-10) |
| | $x^3 y$ | $C_{11} = 0$ | (9-11) |
| | $x^2 y^2$ | $C_{12} = -\dfrac{n_1}{4T_1^3}$ | (9-12) |
| | $xy^3$ | $C_{13} = 0$ | (9-13) |
| | $y^4$ | $C_{14} = -\dfrac{n_1}{8T_1^3}$ | (9-14) |
| 5 | $x^5$ | $C_{15} = 0$ | (9-15) |
| | $x^4 y$ | $C_{16} = 0$ | (9-16) |
| | $x^3 y^2$ | $C_{17} = 0$ | (9-17) |
| | $x^2 y^3$ | $C_{18} = 0$ | (9-18) |
| | $xy^4$ | $C_{19} = 0$ | (9-19) |
| | $y^5$ | $C_{20} = 0$ | (9-20) |

FIG. 12

TABLE (2)

| m + n | POWER SERIES | OPTICAL PATH DIFFERENCE COEF. | EQ. NO. |
|---|---|---|---|
| 6 | $x^6$ | $C_{21} = \dfrac{n_1}{16T_1^5}$ | (9-21) |
| | $x^5 y$ | $C_{22} = 0$ | (9-22) |
| | $x^4 y^2$ | $C_{23} = \dfrac{3n_1}{16T_1^5}$ | (9-23) |
| | $x^3 y^3$ | $C_{24} = 0$ | (9-24) |
| | $x^2 y^4$ | $C_{25} = \dfrac{3n_1}{16T_1^5}$ | (9-25) |
| | $x y^5$ | $C_{26} = 0$ | (9-26) |
| | $y^6$ | $C_{27} = \dfrac{n_1}{16T_1^5}$ | (9-27) |
| 7 | $x^7$ | $C_{28} = 0$ | (9-28) |
| | $x^6 y$ | $C_{29} = 0$ | (9-29) |
| | $x^5 y^2$ | $C_{30} = 0$ | (9-30) |
| | $x^4 y^3$ | $C_{31} = 0$ | (9-31) |
| | $x^3 y^4$ | $C_{32} = 0$ | (9-32) |
| | $x^2 y^5$ | $C_{33} = 0$ | (9-33) |
| | $x y^6$ | $C_{34} = 0$ | (9-34) |
| | $y^7$ | $C_{35} = 0$ | (9-35) |
| 8 | $x^8$ | $C_{36} = -\dfrac{5n_1}{128T_1^7}$ | (9-36) |
| | $x^7 y$ | $C_{37} = 0$ | (9-37) |
| | $x^6 y^2$ | $C_{38} = -\dfrac{5n_1}{32T_1^7}$ | (9-38) |
| | $x^5 y^3$ | $C_{39} = 0$ | (9-39) |
| | $x^4 y^4$ | $C_{40} = -\dfrac{15n_1}{64T_1^7}$ | (9-40) |
| | $x^3 y^5$ | $C_{41} = 0$ | (9-41) |

FIG. 13

TABLE (3)

| m + n | POWER SERIES | OPTICAL PATH DIFFERENCE COEF. | EQ. NO. |
|---|---|---|---|
| 8 | $x^2 y^6$ | $C_{42} = -\dfrac{5n_1}{32 T_1^7}$ | (9-42) |
| 8 | $x y^7$ | $C_{43} = 0$ | (9-43) |
| 8 | $y^8$ | $C_{44} = -\dfrac{5n_1}{128 T_1^7}$ | (9-44) |
| 9 | $x^9$ | $C_{45} = 0$ | (9-45) |
| 9 | $x^8 y$ | $C_{46} = 0$ | (9-46) |
| 9 | $x^7 y^2$ | $C_{47} = 0$ | (9-47) |
| 9 | $x^6 y^3$ | $C_{48} = 0$ | (9-48) |
| 9 | $x^5 y^4$ | $C_{49} = 0$ | (9-49) |
| 9 | $x^4 y^5$ | $C_{50} = 0$ | (9-50) |
| 9 | $x^3 y^6$ | $C_{51} = 0$ | (9-51) |
| 9 | $x^2 y^7$ | $C_{52} = 0$ | (9-52) |
| 9 | $x y^8$ | $C_{53} = 0$ | (9-53) |
| 9 | $y^9$ | $C_{54} = 0$ | (9-54) |

FIG. 14

TABLE (4)

| m+n | POWER SERIES | OPTICAL PATH DIFFERENCE COEF. | EQ. NO. |
|---|---|---|---|
| 10 | $x^{10}$ | $C_{55}=\dfrac{7n_1}{256T_1^9}$ | (9-55) |
| | $x^9 y$ | $C_{56}=0$ | (9-56) |
| | $x^8 y^2$ | $C_{57}=\dfrac{35n_1}{256T_1^9}$ | (9-57) |
| | $x^7 y^3$ | $C_{58}=0$ | (9-58) |
| | $x^6 y^4$ | $C_{59}=\dfrac{105n_1}{384T_1^9}$ | (9-59) |
| | $x^5 y^5$ | $C_{60}=0$ | (9-60) |
| | $x^4 y^6$ | $C_{61}=\dfrac{105n_1}{384L^9}$ | (9-61) |
| | $x^3 y^7$ | $C_{62}=0$ | (9-62) |
| | $x^2 y^8$ | $C_{63}=\dfrac{35n_1}{256T_1^9}$ | (9-63) |
| | $xy^9$ | $C_{64}=0$ | (9-64) |
| | $y^{10}$ | $C_{65}=\dfrac{7n_1}{256T_1^9}$ | (9-65) |

FIG. 16

TABLE (1)

| m+n | POWER SERIES | OPTICAL PATH DIFFERENCE COEF. | EQ. NO. |
|---|---|---|---|
| 0 | 1 | $C_0 = 1$ | (14-0) |
| 1 | $x$ | $C_1 = -\dfrac{n_2(S_1+S_2)}{\sqrt{(S_1+S_2)^2 + 4T_2^2}}$ | (14-1) |
|   | $y$ | $C_2 = 0$ | (14-2) |
| 2 | $x^2$ | $C_3 = \dfrac{n_1}{2T_1}$ | (14-3) |
|   | $xy$ | $C_4 = 0$ | (14-4) |
|   | $y^2$ | $C_5 = \dfrac{n_1}{2T_1}$ | (14-5) |
| 3 | $x^3$ | $C_6 = 0$ | (14-6) |
|   | $x^2 y$ | $C_7 = 0$ | (14-7) |
|   | $xy^2$ | $C_8 = 0$ | (14-8) |
|   | $y^3$ | $C_9 = 0$ | (14-9) |
| 4 | $x^4$ | $C_{10} = -\dfrac{n_1}{8T_1^3}$ | (14-10) |
|   | $x^3 y$ | $C_{11} = 0$ | (14-11) |
|   | $x^2 y^2$ | $C_{12} = -\dfrac{n_1}{4T_1^3}$ | (14-12) |
|   | $xy^3$ | $C_{13} = 0$ | (14-13) |
|   | $y^4$ | $C_{14} = -\dfrac{n_1}{8T_1^3}$ | (14-14) |
| 5 | $x^5$ | $C_{15} = 0$ | (14-15) |
|   | $x^4 y$ | $C_{16} = 0$ | (14-16) |
|   | $x^3 y^2$ | $C_{17} = 0$ | (14-17) |
|   | $x^2 y^3$ | $C_{18} = 0$ | (14-18) |
|   | $xy^4$ | $C_{19} = 0$ | (14-19) |
|   | $y^5$ | $C_{20} = 0$ | (14-20) |

FIG. 17

TABLE (2)

| m + n | POWER SERIES | OPTICAL PATH DIFFERENCE COEF. | EQ. NO. |
|---|---|---|---|
| 6 | $x^6$ | $C_{21} = \dfrac{n_1}{16T_1^5}$ | (14-21) |
| | $x^5 y$ | $C_{22} = 0$ | (14-22) |
| | $x^4 y^2$ | $C_{23} = \dfrac{3n_1}{16T_1^5}$ | (14-23) |
| | $x^3 y^3$ | $C_{24} = 0$ | (14-24) |
| | $x^2 y^4$ | $C_{25} = \dfrac{3n_1}{16T_1^5}$ | (14-25) |
| | $x y^5$ | $C_{26} = 0$ | (14-26) |
| | $y^6$ | $C_{27} = \dfrac{n_1}{16T_1^5}$ | (14-27) |
| 7 | $x^7$ | $C_{28} = 0$ | (14-28) |
| | $x^6 y$ | $C_{29} = 0$ | (14-29) |
| | $x^5 y^2$ | $C_{30} = 0$ | (14-30) |
| | $x^4 y^3$ | $C_{31} = 0$ | (14-31) |
| | $x^3 y^4$ | $C_{32} = 0$ | (14-32) |
| | $x^2 y^5$ | $C_{33} = 0$ | (14-33) |
| | $x y^6$ | $C_{34} = 0$ | (14-34) |
| | $y^7$ | $C_{35} = 0$ | (14-35) |
| 8 | $x^8$ | $C_{36} = -\dfrac{5n_1}{128T_1^7}$ | (14-36) |
| | $x^7 y$ | $C_{37} = 0$ | (14-37) |
| | $x^6 y^2$ | $C_{38} = -\dfrac{5n_1}{32T_1^7}$ | (14-38) |
| | $x^5 y^3$ | $C_{39} = 0$ | (14-39) |
| | $x^4 y^4$ | $C_{40} = -\dfrac{15n_1}{64T_1^7}$ | (14-40) |
| | $x^3 y^5$ | $C_{41} = 0$ | (14-41) |

FIG. 18

TABLE (3)

| m + n | POWER SERIES | OPTICAL PATH DIFFERENCE COEF. | EQ. NO. |
|---|---|---|---|
| 8 | $x^2y^6$ | $C_{42}=-\dfrac{5n_1}{32T_1^7}$ | (14-42) |
| | $xy^7$ | $C_{43}=0$ | (14-43) |
| | $y^8$ | $C_{44}=-\dfrac{5n_1}{128T_1^7}$ | (14-44) |
| 9 | $x^9$ | $C_{45}=0$ | (14-45) |
| | $x^8y$ | $C_{46}=0$ | (14-46) |
| | $x^7y^2$ | $C_{47}=0$ | (14-47) |
| | $x^6y^3$ | $C_{48}=0$ | (14-48) |
| | $x^5y^4$ | $C_{49}=0$ | (14-49) |
| | $x^4y^5$ | $C_{50}=0$ | (14-50) |
| | $x^3y^6$ | $C_{51}=0$ | (14-51) |
| | $x^2y^7$ | $C_{52}=0$ | (14-52) |
| | $xy^8$ | $C_{53}=0$ | (14-53) |
| | $y^9$ | $C_{54}=0$ | (14-54) |

FIG. 19

TABLE (4)

| m+n | POWER SERIES | OPTICAL PATH DIFFERENCE COEF. | EQ. NO. |
|---|---|---|---|
| 10 | $x^{10}$ | $C_{55} = \dfrac{7n_1}{256T_1^9}$ | (14-55) |
| | $x^9y$ | $C_{56} = 0$ | (14-56) |
| | $x^8y^2$ | $C_{57} = \dfrac{35n_1}{256T_1^9}$ | (14-57) |
| | $x^7y^3$ | $C_{58} = 0$ | (14-58) |
| | $x^6y^4$ | $C_{59} = \dfrac{105n_1}{384T_1^9}$ | (14-59) |
| | $x^5y^5$ | $C_{60} = 0$ | (14-60) |
| | $x^4y^6$ | $C_{61} = \dfrac{105n_1}{384L^9}$ | (14-61) |
| | $x^3y^7$ | $C_{62} = 0$ | (14-62) |
| | $x^2y^8$ | $C_{63} = \dfrac{35n_1}{256T_1^9}$ | (14-63) |
| | $xy^9$ | $C_{64} = 0$ | (14-64) |
| | $y^{10}$ | $C_{65} = \dfrac{7n_1}{256T_1^9}$ | (14-65) |

FIG. 26

| m + n | POWER SERIES | OPTICAL PATH DIFFERENCE COEF. | EQ. NO. |
|---|---|---|---|
| 0 | 1 | $C_0 = 1$ | (33-0) |
| 1 | x | $C_1 = n_2 \dfrac{(x_1 - S_1)}{\sqrt{(x_1 - S_1)^2 + T_2^2}} + n_3 \dfrac{(x_1 + x_2)}{\sqrt{(x_1 + x_2)^2 + T_3^2}}$ | (33-1) |
|  | y | $C_2 = 0$ | (33-2) |

FIG. 29

TABLE (1)

| m+n | POWER SERIES | OPTICAL PATH DIFFERENCE COEF. | EQ. NO. |
|---|---|---|---|
| 0 | 1 | $C_0 = 1$ | (50-0) |
| 1 | $x$ | $C_1 = -\dfrac{nX_{41}}{L_{41}} - \dfrac{n_4 X_{42}}{L_{42}}$ | (50-1) |
|   | $y$ | $C_2 = 0$ | (50-2) |
| 2 | $x^2$ | $C_3 = \dfrac{n}{2}\left(-\dfrac{X_{41}^2}{L_{41}^3} + \dfrac{1}{L_{41}}\right) + \dfrac{n_4}{2}\left(-\dfrac{X_{42}^2}{L_{42}^3} + \dfrac{1}{L_{42}}\right)$ | (50-3) |
|   | $xy$ | $C_4 = 0$ | (50-4) |
|   | $y^2$ | $C_5 = \dfrac{n}{2L_{41}} + \dfrac{n_4}{2L_{42}}$ | (50-5) |
| 3 | $x^3$ | $C_6 = \dfrac{n}{2}\left(-\dfrac{X_{41}^3}{L_{41}^5} + \dfrac{X_{41}}{L_{41}^3}\right) + \dfrac{n_4}{2}\left(-\dfrac{X_{42}^3}{L_{42}^5} + \dfrac{X_{42}}{L_{42}^3}\right)$ | (50-6) |
|   | $x^2 y$ | $C_7 = 0$ | (50-7) |
|   | $xy^2$ | $C_8 = \dfrac{n}{2}\dfrac{X_{41}}{L_{41}^3} + \dfrac{n_4}{2}\dfrac{X_{42}}{L_{42}^3}$ | (50-8) |
|   | $y^3$ | $C_9 = 0$ | (50-9) |
| 4 | $x^4$ | $C_{10} = -\dfrac{n}{8}\left(5\dfrac{X_{41}^4}{L_{41}^7} - 6\dfrac{X_{41}^2}{L_{41}^5} + \dfrac{1}{L_{41}^3}\right) - \dfrac{n_4}{8}\left(5\dfrac{X_{42}^4}{L_{42}^7} - 6\dfrac{X_{42}^2}{L_{42}^5} + \dfrac{1}{L_{42}^3}\right)$ | (50-10) |
|   | $x^3 y$ | $C_{11} = 0$ | (50-11) |
|   | $x^2 y^2$ | $C_{12} = \dfrac{n}{4}\left(3\dfrac{X_{41}^2}{L_{41}^5} - \dfrac{1}{L_{41}^3}\right) + \dfrac{n_4}{4}\left(3\dfrac{X_{42}^2}{L_{42}^5} - \dfrac{1}{L_{42}^3}\right)$ | (50-12) |
|   | $xy^3$ | $C_{13} = 0$ | (50-13) |
|   | $y^4$ | $C_{14} = -\dfrac{n}{8L_{41}^3} - \dfrac{n_4}{8L_{42}^3}$ | (50-14) |

FIG. 30

TABLE (2)

| m+n | POWER SERIES | OPTICAL PATH DIFFERENCE COEF. | EQ. NO. |
|---|---|---|---|
| 5 | $x^5$ | $C_{15} = -\dfrac{n}{8}\left(7\dfrac{X_{41}^5}{L_{41}^9} - 10\dfrac{X_{41}^3}{L_{41}^7} + 3\dfrac{X_{41}}{L_{41}^5}\right) - \dfrac{n_4}{8}\left(7\dfrac{X_{42}^5}{L_{42}^9} - 10\dfrac{X_{42}^3}{L_{42}^7} + 3\dfrac{X_{42}}{L_{42}^5}\right)$ | (50-15) |
| | $x^4 y$ | $C_{16} = 0$ | (50-16) |
| | $x^3 y^2$ | $C_{17} = -\dfrac{n}{4}\left(-5\dfrac{X_{41}^3}{L_{41}^7} + 3\dfrac{X_{41}}{L_{41}^5}\right) - \dfrac{n_4}{4}\left(-5\dfrac{X_{42}^3}{L_{42}^7} + 3\dfrac{X_{42}}{L_{42}^5}\right)$ | (50-17) |
| | $x^2 y^3$ | $C_{18} = 0$ | (50-18) |
| | $x y^4$ | $C_{19} = -\dfrac{3n}{8}\dfrac{X_{41}}{L_{41}^5} - \dfrac{3n_4}{8}\dfrac{X_{42}}{L_{42}^5}$ | (50-19) |
| | $y^5$ | $C_{20} = 0$ | (50-20) |
| 6 | $x^6$ | $C_{21} = -\dfrac{n}{16}\left(-21\dfrac{X_{41}^6}{L_{41}^{11}} + 35\dfrac{X_{41}^4}{L_{41}^9} - 15\dfrac{X_{41}^2}{L_{41}^7} + \dfrac{1}{L_{41}^5}\right) + \dfrac{n_4}{16}\left(-21\dfrac{X_{42}^6}{L_{42}^{11}} + 35\dfrac{X_{42}^4}{L_{42}^9} - 15\dfrac{X_{42}^2}{L_{42}^7} + \dfrac{1}{L_{42}^5}\right)$ | (50-21) |
| | $x^5 y$ | $C_{22} = 0$ | (50-22) |
| | $x^4 y^2$ | $C_{23} = \dfrac{n}{16}\left(35\dfrac{X_{41}^4}{L_{41}^9} - 30\dfrac{X_{41}^2}{L_{41}^7} + \dfrac{3}{L_{41}^5}\right) + \dfrac{n_4}{16}\left(35\dfrac{X_{42}^4}{L_{42}^9} - 30\dfrac{X_{42}^2}{L_{42}^7} + \dfrac{3}{L_{42}^5}\right)$ | (50-23) |
| | $x^3 y^3$ | $C_{24} = 0$ | (50-24) |
| | $x^2 y^4$ | $C_{25} = \dfrac{n}{16}\left(-15\dfrac{X_{41}^2}{L_{41}^7} + \dfrac{3}{L_{41}^5}\right) + \dfrac{n_4}{16}\left(-15\dfrac{X_{42}^2}{L_{42}^7} + \dfrac{3}{L_{42}^5}\right)$ | (50-25) |
| | $x y^5$ | $C_{26} = 0$ | (50-26) |
| | $y^6$ | $C_{27} = \dfrac{n}{16 L_{41}^5} + \dfrac{n_4}{16 L_{42}^5}$ | (50-27) |

FIG. 31

TABLE (3)

| m+n | POWER SERIES | OPTICAL PATH DIFFERENCE COEF. | EQ. NO. |
|---|---|---|---|
| 7 | $x^7$ | $C_{28} = \dfrac{n}{16}\left(-33\dfrac{X_{41}^7}{L_{41}^{13}} + 63\dfrac{X_{41}^5}{L_{41}^{11}} - 35\dfrac{X_{41}^3}{L_{41}^9} + 5\dfrac{X_{41}}{L_{41}^7}\right) + \dfrac{n_4}{16}\left(-33\dfrac{X_{42}^7}{L_{42}^{13}} + 63\dfrac{X_{42}^5}{L_{42}^{11}} - 35\dfrac{X_{42}^3}{L_{42}^9} + 5\dfrac{X_{42}}{L_{42}^7}\right)$ | (50-28) |
| | $x^6 y$ | $C_{29} = 0$ | (50-29) |
| | $x^5 y^2$ | $C_{30} = \dfrac{n}{16}\left(63\dfrac{X_{41}^5}{L_{41}^{11}} - 70\dfrac{X_{41}^3}{L_{41}^9} + 15\dfrac{X_{41}}{L_{41}^7}\right) + \dfrac{n_4}{16}\left(63\dfrac{X_{42}^5}{L_{42}^{11}} - 70\dfrac{X_{42}^3}{L_{42}^9} + 15\dfrac{X_{42}}{L_{42}^7}\right)$ | (50-30) |
| | $x^4 y^3$ | $C_{31} = 0$ | (50-31) |
| | $x^3 y^4$ | $C_{32} = \dfrac{5n}{16}\left(-7\dfrac{X_{41}^3}{L_{41}^9} + 3\dfrac{X_{41}}{L_{41}^7}\right) + \dfrac{5n_4}{16}\left(-7\dfrac{X_{42}^3}{L_{42}^9} + 3\dfrac{X_{42}}{L_{42}^7}\right)$ | (50-32) |
| | $x^2 y^5$ | $C_{33} = 0$ | (50-33) |
| | $x y^6$ | $C_{34} = \dfrac{5n}{16}\dfrac{X_{41}}{L_{41}^7} + \dfrac{5n_4}{16}\dfrac{X_{42}}{L_{42}^7}$ | (50-34) |
| | $y^7$ | $C_{35} = 0$ | (50-35) |

FIG. 32
TABLE (4)

| m+n | POWER SERIES | OPTICAL PATH DIFFERENCE COEF. | EQ. NO. |
|---|---|---|---|
| 8 | $x^8$ | $C_{36} = -\frac{n}{128}\left(429\frac{X_{41}^8}{L_{41}^{15}} - 924\frac{X_{41}^6}{L_{41}^{13}} + 630\frac{X_{41}^4}{L_{41}^{11}} - 140\frac{X_{41}^2}{L_{41}^9} + \frac{5}{L_{41}^7}\right)$ $-\frac{n_4}{128}\left(429\frac{X_{42}^8}{L_{42}^{15}} - 924\frac{X_{42}^6}{L_{42}^{13}} + 630\frac{X_{42}^4}{L_{42}^{11}} - 140\frac{X_{42}^2}{L_{42}^9} + \frac{5}{L_{42}^7}\right)$ | (50-36) |
| | $x^7 y$ | $C_{37} = 0$ | (50-37) |
| | $x^6 y^2$ | $C_{38} = -\frac{n}{32}\left(-231\frac{X_{41}^6}{L_{41}^{13}} + 315\frac{X_{41}^4}{L_{41}^{11}} - 105\frac{X_{41}^2}{L_{41}^9} + \frac{5}{L_{41}^7}\right)$ $-\frac{n_4}{32}\left(-231\frac{X_{42}^6}{L_{42}^{13}} + 315\frac{X_{42}^4}{L_{42}^{11}} - 105\frac{X_{42}^2}{L_{42}^9} + \frac{5}{L_{42}^7}\right)$ | (50-38) |
| | $x^5 y^3$ | $C_{39} = 0$ | (50-39) |
| | $x^4 y^4$ | $C_{40} = -\frac{15n}{64}\left(+21\frac{X_{41}^4}{L_{41}^{11}} - 14\frac{X_{41}^2}{L_{41}^9} + \frac{1}{L_{41}^7}\right) - \frac{15n_4}{64}\left(+21\frac{X_{42}^4}{L_{42}^{11}} - 14\frac{X_{42}^2}{L_{42}^9} + \frac{1}{L_{42}^7}\right)$ | (50-40) |
| | $x^3 y^5$ | $C_{41} = 0$ | (50-41) |
| | $x^2 y^6$ | $C_{42} = -\frac{n}{32}\left(-35\frac{X_{41}^2}{L_{41}^9} + \frac{5}{L_{41}^7}\right) - \frac{n_4}{32}\left(-35\frac{X_{42}^2}{L_{42}^9} + \frac{5}{L_{42}^7}\right)$ | (50-42) |
| | $xy^7$ | $C_{43} = 0$ | (50-43) |
| | $y^8$ | $C_{44} = \frac{5n}{128 L_{41}^7} - \frac{5n_4}{128 L_{42}^7}$ | (50-44) |

FIG. 33
TABLE (5)

| m+n | POWER SERIES | OPTICAL PATH DIFFERENCE COEF. | EQ. NO. |
|---|---|---|---|
| 9 | $x^9$ | $C_{45} = -\frac{n}{128}\left(715\frac{X_{41}^9}{L_{41}^{17}} - 1716\frac{X_{41}^7}{L_{41}^{15}} + 1386\frac{X_{41}^5}{L_{41}^{13}} - 420\frac{X_{41}^3}{L_{41}^{11}} + 35\frac{X_{41}}{L_{41}^9}\right)$ $-\frac{n_4}{128}\left(715\frac{X_{42}^9}{L_{42}^{17}} - 1716\frac{X_{42}^7}{L_{42}^{15}} + 1386\frac{X_{42}^5}{L_{42}^{13}} - 420\frac{X_{42}^3}{L_{42}^{11}} + 35\frac{X_{42}}{L_{42}^9}\right)$ | (50-45) |
| | $x^8 y$ | $C_{46} = 0$ | (50-46) |
| | $x^7 y^2$ | $C_{47} = -\frac{n}{32}\left(-429\frac{X_{41}^7}{L_{41}^{15}} + 693\frac{X_{41}^5}{L_{41}^{13}} - 315\frac{X_{41}^3}{L_{41}^{11}} + 35\frac{X_{41}}{L_{41}^9}\right)$ $-\frac{n_4}{32}\left(-429\frac{X_{42}^7}{L_{42}^{15}} + 693\frac{X_{42}^5}{L_{42}^{13}} - 315\frac{X_{42}^3}{L_{42}^{11}} + 35\frac{X_{42}}{L_{42}^9}\right)$ | (50-47) |
| | $x^6 y^3$ | $C_{48} = 0$ | (50-48) |
| | $x^5 y^4$ | $C_{49} = -\frac{21n}{64}\left(33\frac{X_{41}^5}{L_{41}^{13}} - 30\frac{X_{41}^3}{L_{41}^{11}} + 5\frac{X_{41}}{L_{41}^9}\right) - \frac{21n_4}{64}\left(33\frac{X_{42}^5}{L_{42}^{13}} - 30\frac{X_{42}^3}{L_{42}^{11}} + 5\frac{X_{42}}{L_{42}^9}\right)$ | (50-49) |
| | $x^4 y^5$ | $C_{50} = 0$ | (50-50) |
| | $x^3 y^6$ | $C_{51} = -\frac{35n}{32}\left(-3\frac{X_{41}^3}{L_{41}^{11}} + \frac{X_{41}}{L_{41}^9}\right) - \frac{35n_4}{32}\left(-3\frac{X_{42}^3}{L_{42}^{11}} + \frac{X_{42}}{L_{42}^9}\right)$ | (50-51) |
| | $x^2 y^7$ | $C_{52} = 0$ | (50-52) |
| | $xy^8$ | $C_{53} = -\frac{35nX_{41}}{128L_{41}^9} - \frac{35n_4 X_{42}}{128L_{42}^9}$ | (50-53) |
| | $y^9$ | $C_{54} = 0$ | (50-54) |

F I G. 34
T A B L E (6)

| m+n | POWER SERIES | OPTICAL PATH DIFFERENCE COEF. | EQ. NO. |
|---|---|---|---|
| 10 | $x^{10}$ | $C_{55} = \frac{n}{256}\left(-2431\frac{X_{41}^{10}}{L_{41}^{19}} + 6435\frac{X_{41}^{8}}{L_{41}^{17}} - 6006\frac{X_{41}^{6}}{L_{41}^{15}} + 2310\frac{X_{41}^{4}}{L_{41}^{13}} - 315\frac{X_{41}^{2}}{L_{41}^{11}} + \frac{7}{L_{41}^{9}}\right)$ $+ \frac{n_4}{256}\left(-2431\frac{X_{42}^{10}}{L_{42}^{19}} + 6435\frac{X_{42}^{8}}{L_{42}^{17}} - 6006\frac{X_{42}^{6}}{L_{42}^{15}} + 2310\frac{X_{42}^{4}}{L_{42}^{13}} - 315\frac{X_{42}^{2}}{L_{42}^{11}} + \frac{7}{L_{42}^{9}}\right)$ | (50-55) |
| | $x^9 y$ | $C_{56} = 0$ | (50-56) |
| | $x^8 y^2$ | $C_{57} = \frac{n}{256}\left(6435\frac{X_{41}^{8}}{L_{41}^{17}} - 12012\frac{X_{41}^{6}}{L_{41}^{15}} + 6930\frac{X_{41}^{4}}{L_{41}^{13}} - 1260\frac{X_{41}^{2}}{L_{41}^{11}} + \frac{35}{L_{41}^{9}}\right)$ $+ \frac{n_4}{256}\left(6435\frac{X_{42}^{8}}{L_{42}^{17}} - 12012\frac{X_{42}^{6}}{L_{42}^{15}} + 6930\frac{X_{42}^{4}}{L_{42}^{13}} - 1260\frac{X_{42}^{2}}{L_{42}^{11}} + \frac{35}{L_{42}^{9}}\right)$ | (50-57) |
| | $x^7 y^3$ | $C_{58} = 0$ | (50-58) |
| | $x^6 y^4$ | $C_{59} = \frac{7n}{128}\left(-429\frac{X_{41}^{6}}{L_{41}^{15}} + 495\frac{X_{41}^{4}}{L_{41}^{13}} - 135\frac{X_{41}^{2}}{L_{41}^{11}} + \frac{5}{L_{41}^{9}}\right) + \frac{7n_4}{128}\left(-429\frac{X_{42}^{6}}{L_{42}^{15}} + 495\frac{X_{42}^{4}}{L_{42}^{13}} - 135\frac{X_{42}^{2}}{L_{42}^{11}} + \frac{5}{L_{42}^{9}}\right)$ | (50-59) |
| | $x^5 y^5$ | $C_{60} = 0$ | (50-60) |
| | $x^4 y^6$ | $C_{61} = \frac{7n}{128}\left(+165\frac{X_{41}^{4}}{L_{41}^{13}} - 90\frac{X_{41}^{2}}{L_{41}^{11}} + \frac{5}{L_{41}^{9}}\right) + \frac{7n_4}{128}\left(+165\frac{X_{42}^{4}}{L_{42}^{13}} - 90\frac{X_{42}^{2}}{L_{42}^{11}} + \frac{5}{L_{42}^{9}}\right)$ | (50-61) |
| | $x^3 y^7$ | $C_{62} = 0$ | (50-62) |
| | $x^2 y^8$ | $C_{63} = \frac{n}{256}\left(-315\frac{X_{41}^{2}}{L_{41}^{11}} + \frac{35}{L_{41}^{9}}\right) + \frac{n_4}{256}\left(-315\frac{X_{42}^{2}}{L_{42}^{11}} + \frac{35}{L_{42}^{9}}\right)$ | (50-63) |
| | $xy^9$ | $C_{64} = 0$ | (50-64) |
| | $y^{10}$ | $C_{65} = \frac{7n}{256 L_{41}^{9}} + \frac{7n_4}{256 L_{42}^{9}}$ | (50-65) |

FIG. 36

TABLE (1)

| m+n | POWER SERIES | OPTICAL PATH DIFFERENCE COEF. | EQ. NO. |
|---|---|---|---|
| 0 | 1 | $C_0 = 1$ | (62-0) |
| 1 | $x$ | $C_1 = -\dfrac{nX_{51}}{L_{51}}$ | (62-1) |
|   | $y$ | $C_2 = 0$ | (62-2) |
| 2 | $x^2$ | $C_3 = \dfrac{n}{2}\left(-\dfrac{X_{51}^2}{L_{51}^3} + \dfrac{1}{L_{51}}\right) + \dfrac{n_4}{2L_{52}}$ | (62-3) |
|   | $xy$ | $C_4 = 0$ | (62-4) |
|   | $y^2$ | $C_5 = \dfrac{n}{2L_{51}} + \dfrac{n_4}{2L_{52}}$ | (62-5) |
| 3 | $x^3$ | $C_6 = \dfrac{n}{2}\left(-\dfrac{X_{51}^3}{L_{51}^5} + \dfrac{X_{51}}{L_{51}^3}\right)$ | (62-6) |
|   | $x^2 y$ | $C_7 = 0$ | (62-7) |
|   | $xy^2$ | $C_8 = \dfrac{n}{2}\dfrac{X_{51}}{L_{51}^3}$ | (62-8) |
|   | $y^3$ | $C_9 = 0$ | (62-9) |
| 4 | $x^4$ | $C_{10} = -\dfrac{n}{8}\left(5\dfrac{X_{51}^4}{L_{51}^7} - 6\dfrac{X_{51}^2}{L_{51}^5} + \dfrac{1}{L_{51}^3}\right) - \dfrac{n_4}{8L_{52}^3}$ | (62-10) |
|   | $x^3 y$ | $C_{11} = 0$ | (62-11) |
|   | $x^2 y^2$ | $C_{12} = \dfrac{n}{4}\left(3\dfrac{X_{51}^2}{L_{51}^5} - \dfrac{1}{L_{51}^3}\right) - \dfrac{n_4}{4L_{52}^3}$ | (62-12) |
|   | $xy^3$ | $C_{13} = 0$ | (62-13) |
|   | $y^4$ | $C_{14} = -\dfrac{n}{8L_{51}^3} - \dfrac{n_4}{8L_{52}^3}$ | (62-14) |

FIG. 37

TABLE (2)

| m+n | POWER SERIES | OPTICAL PATH DIFFERENCE COEF. | EQ. NO. |
|---|---|---|---|
| 5 | $x^5$ | $C_{15} = -\dfrac{n}{8}\left(7\dfrac{X_{51}^5}{L_{51}^9} - 10\dfrac{X_{51}^3}{L_{51}^7} + 3\dfrac{X_{51}}{L_{51}^5}\right)$ | (62-15) |
| | $x^4 y$ | $C_{16} = 0$ | (62-16) |
| | $x^3 y^2$ | $C_{17} = -\dfrac{n}{4}\left(-5\dfrac{X_{51}^3}{L_{51}^7} + 3\dfrac{X_{51}}{L_{51}^5}\right)$ | (62-17) |
| | $x^2 y^3$ | $C_{18} = 0$ | (62-18) |
| | $x y^4$ | $C_{19} = -\dfrac{3n}{8}\dfrac{X_{51}}{L_{51}^5}$ | (62-19) |
| | $y^5$ | $C_{20} = 0$ | (62-20) |
| 6 | $x^6$ | $C_{21} = \dfrac{n}{16}\left(-21\dfrac{X_{51}^6}{L_{51}^{11}} + 35\dfrac{X_{51}^4}{L_{51}^9} - 15\dfrac{X_{51}^2}{L_{51}^7} + \dfrac{1}{L_{51}^5}\right) + \dfrac{n_4}{16 L_{52}^5}$ | (62-21) |
| | $x^5 y$ | $C_{22} = 0$ | (62-22) |
| | $x^4 y^2$ | $C_{23} = \dfrac{n}{16}\left(35\dfrac{X_{51}^4}{L_{51}^9} - 30\dfrac{X_{51}^2}{L_{51}^7} + \dfrac{3}{L_{51}^5}\right) + \dfrac{3 n_4}{16 L_{52}^5}$ | (62-23) |
| | $x^3 y^3$ | $C_{24} = 0$ | (62-24) |
| | $x^2 y^4$ | $C_{25} = \dfrac{n}{16}\left(-15\dfrac{X_{51}^2}{L_{51}^7} + \dfrac{3}{L_{51}^5}\right) + \dfrac{3 n_4}{16 L_{52}^5}$ | (62-25) |
| | $x y^5$ | $C_{26} = 0$ | (62-26) |
| | $y^6$ | $C_{27} = \dfrac{n}{16 L_{51}^5} + \dfrac{n_4}{16 L_{52}^5}$ | (62-27) |

FIG. 38

TABLE (3)

| m+n | POWER SERIES | OPTICAL PATH DIFFERENCE COEF. | EQ. NO. |
|---|---|---|---|
| 7 | $x^7$ | $C_{28}=\dfrac{n}{16}\left(-33\dfrac{X_{51}^7}{L_{51}^{13}}+63\dfrac{X_{51}^5}{L_{51}^{11}}-35\dfrac{X_{51}^3}{L_{51}^9}+5\dfrac{X_{51}}{L_{51}^7}\right)$ | (62-28) |
|  | $x^6 y$ | $C_{29}=0$ | (62-29) |
|  | $x^5 y^2$ | $C_{30}=\dfrac{n}{16}\left(63\dfrac{X_{51}^5}{L_{51}^{11}}-70\dfrac{X_{51}^3}{L_{51}^9}+15\dfrac{X_{51}}{L_{51}^7}\right)$ | (62-30) |
|  | $x^4 y^3$ | $C_{31}=0$ | (62-31) |
|  | $x^3 y^4$ | $C_{32}=\dfrac{5n}{16}\left(-7\dfrac{X_{51}^3}{L_{51}^9}+3\dfrac{X_{51}}{L_{51}^7}\right)$ | (62-32) |
|  | $x^2 y^5$ | $C_{33}=0$ | (62-33) |
|  | $x y^6$ | $C_{34}=\dfrac{5n}{16}\dfrac{X_{51}}{L_{51}^7}$ | (62-34) |
|  | $y^7$ | $C_{35}=0$ | (62-35) |

FIG. 39

TABLE (4)

| m+n | POWER SERIES | OPTICAL PATH DIFFERENCE COEF. | EQ. NO. |
|---|---|---|---|
| 8 | $x^8$ | $C_{36} = -\dfrac{n}{128}\left(429\dfrac{x_{51}^8}{L_{51}^{15}} - 924\dfrac{x_{51}^6}{L_{51}^{13}} + 630\dfrac{x_{51}^4}{L_{51}^{11}} - 140\dfrac{x_{51}^2}{L_{51}^9} + \dfrac{5}{L_{51}^7}\right) - \dfrac{5n_4}{128 L_{52}^7}$ | (62-36) |
| | $x^7 y$ | $C_{37} = 0$ | (62-37) |
| | $x^6 y^2$ | $C_{38} = -\dfrac{n}{32}\left(-231\dfrac{x_{51}^6}{L_{51}^{13}} + 315\dfrac{x_{51}^4}{L_{51}^{11}} - 105\dfrac{x_{51}^2}{L_{51}^9} + \dfrac{5}{L_{51}^7}\right) - \dfrac{5n_4}{32 L_{52}^7}$ | (62-38) |
| | $x^5 y^3$ | $C_{39} = 0$ | (62-39) |
| | $x^4 y^4$ | $C_{40} = -\dfrac{15n}{64}\left(+21\dfrac{x_{51}^4}{L_{51}^{11}} - 14\dfrac{x_{51}^2}{L_{51}^9} + \dfrac{1}{L_{51}^7}\right) - \dfrac{15n_4}{64 L_{52}^7}$ | (62-40) |
| | $x^3 y^5$ | $C_{41} = 0$ | (62-41) |
| | $x^2 y^6$ | $C_{42} = -\dfrac{n}{32}\left(-35\dfrac{x_{51}^2}{L_{51}^9} + \dfrac{5}{L_{51}^7}\right) - \dfrac{5n_4}{32 L_{52}^7}$ | (62-42) |
| | $x y^7$ | $C_{43} = 0$ | (62-43) |
| | $y^8$ | $C_{44} = -\dfrac{5n}{128 L_{51}^7} - \dfrac{5n_4}{128 L_{52}^7}$ | (62-44) |

FIG. 40

TABLE (5)

| m+n | POWER SERIES | OPTICAL PATH DIFFERENCE COEF. | EQ. NO. |
|---|---|---|---|
| 9 | $x^9$ | $C_{45} = -\frac{n}{128}\left(715\frac{X_{51}^9}{L_{51}^{17}} - 1716\frac{X_{51}^7}{L_{51}^{15}} + 1386\frac{X_{51}^5}{L_{51}^{13}} - 420\frac{X_{51}^3}{L_{51}^{11}} + 35\frac{X_{51}}{L_{51}^9}\right)$ | (62-45) |
| | $x^8 y$ | $C_{46} = 0$ | (62-46) |
| | $x^7 y^2$ | $C_{47} = -\frac{n}{32}\left(-429\frac{X_{51}^7}{L_{51}^{15}} + 693\frac{X_{51}^5}{L_{51}^{13}} - 315\frac{X_{51}^3}{L_{51}^{11}} + 35\frac{X_{51}}{L_{51}^9}\right)$ | (62-47) |
| | $x^6 y^3$ | $C_{48} = 0$ | (62-48) |
| | $x^5 y^4$ | $C_{49} = -\frac{21n}{64}\left(33\frac{X_{51}^5}{L_{51}^{13}} - 30\frac{X_{51}^3}{L_{51}^{11}} + 5\frac{X_{51}}{L_{51}^9}\right)$ | (62-49) |
| | $x^4 y^5$ | $C_{50} = 0$ | (62-50) |
| | $x^3 y^6$ | $C_{51} = -\frac{35n}{32}\left(-3\frac{X_{51}^3}{L_{51}^{11}} + \frac{X_{51}}{L_{51}^9}\right)$ | (62-51) |
| | $x^2 y^7$ | $C_{52} = 0$ | (62-52) |
| | $xy^8$ | $C_{53} = -\frac{35nX_{51}}{128L_{51}^9}$ | (62-53) |
| | $y^9$ | $C_{54} = 0$ | (62-54) |

FIG. 41

TABLE (6)

| m+n | POWER SERIES | OPTICAL PATH DIFFERENCE COEF. | EQ. NO. |
|---|---|---|---|
| 10 | $x^{10}$ | $C_{55} = \dfrac{n}{256}\left(-2431\dfrac{x_{51}^{10}}{L_{51}^{19}} + 6435\dfrac{x_{51}^{8}}{L_{51}^{17}} - 6006\dfrac{x_{51}^{6}}{L_{51}^{15}} + 2310\dfrac{x_{51}^{4}}{L_{51}^{13}} - 315\dfrac{x_{51}^{2}}{L_{51}^{11}} + \dfrac{7}{L_{51}^{9}}\right) + \dfrac{7n_4}{256 L_{52}^{9}}$ | (62-55) |
| | $x^{9} y$ | $C_{56} = 0$ | (62-56) |
| | $x^{8} y^{2}$ | $C_{57} = \dfrac{n}{256}\left(6435\dfrac{x_{51}^{8}}{L_{51}^{17}} - 12012\dfrac{x_{51}^{6}}{L_{51}^{15}} + 6930\dfrac{x_{51}^{4}}{L_{51}^{13}} - 1260\dfrac{x_{51}^{2}}{L_{51}^{11}} + \dfrac{35}{L_{51}^{9}}\right) + \dfrac{35 n_4}{256 L_{52}^{9}}$ | (62-57) |
| | $x^{7} y^{3}$ | $C_{58} = 0$ | (62-58) |
| | $x^{6} y^{4}$ | $C_{59} = \dfrac{7n}{128}\left(-429\dfrac{x_{51}^{6}}{L_{51}^{15}} + 495\dfrac{x_{51}^{4}}{L_{51}^{13}} - 135\dfrac{x_{51}^{2}}{L_{51}^{11}} + \dfrac{5}{L_{51}^{9}}\right) + \dfrac{35 n_4}{128 L_{52}^{9}}$ | (62-59) |
| | $x^{5} y^{5}$ | $C_{60} = 0$ | (62-60) |
| | $x^{4} y^{6}$ | $C_{61} = \dfrac{7n}{128}\left(-165\dfrac{x_{51}^{4}}{L_{51}^{13}} - 90\dfrac{x_{51}^{2}}{L_{51}^{11}} + \dfrac{5}{L_{51}^{9}}\right) + \dfrac{35 n_4}{128 L_{52}^{9}}$ | (62-61) |
| | $x^{3} y^{7}$ | $C_{62} = 0$ | (62-62) |
| | $x^{2} y^{8}$ | $C_{63} = \dfrac{n}{256}\left(-315\dfrac{x_{51}^{2}}{L_{51}^{11}} + \dfrac{35}{L_{51}^{9}}\right) + \dfrac{n_4}{256 L_{52}^{9}}$ | (62-63) |
| | $x y^{9}$ | $C_{64} = 0$ | (62-64) |
| | $y^{10}$ | $C_{65} = \dfrac{7n}{256 L_{51}^{9}} + \dfrac{7 n_4}{256 L_{52}^{9}}$ | (62-65) |

6,069,987

OPTICAL DEVICE FOR AN OPTICAL NETWORK UNIT AND MANUFACTURING METHOD THEREFOR

BACKGROUND OF THE INVENTION

1. Field of the Invention

The present invention relates to an optical device to be installed in an optical network unit in optical multiplex communication by optical signal carriers of different wavelength components multiplexed together, and also to a manufacturing method therefor, and more particularly to an optical device for an optical network unit, which incorporates as optical elements computer generated holograms utilizing optical diffraction, and yet to a manufacturing method therefor.

2. Related Art

In recent years, the so-called 'Fiber to the Home' project is being pushed forward by which to extend optical fibers to respective homes to enable optical communications with a large traffic capacity.

According to this project, a multiplexed light having component beams of wavelength bands of 1.3 $\mu$m and 1.55 $\mu$m, for example, are transmitted to the optical network units in the respective homes.

In the optical network units, there is provided an optical device, including a wavelength demultiplexer for separating a multiplexed light into beams of respective wavelengths, and an optical coupler for separating an optical path for one wavelength to enable bi-directional communication by one wavelength.

By this optical device, a multiplexed light is separated into wavelength components of different wavelength bands to be transmitted to various pieces of terminal equipment.

SUMMARY OF THE INVENTION

In conventional optical devices of this kind, the wavelength demultiplexer and the optical coupler are so-called optical fiber elements based on optical fiber. Since fusion splicing of optical fiber elements is troublesome, it is difficult to manufacture the above-mentioned optical devices. The size reduction of optical devices is not easy, either.

The object of the present invention is to provide an optical device for used in optical network units in optical communication and a manufacturing method therefor, which facilitate manufacture and which are favorable for reductions of manufacturing cost and device size.

To solve the above problems, the present invention is primarily characterized by the use of computer generated holograms utilizing light diffraction as optical elements in an optical network unit in wavelength division multiplex transmission by a multiplexed light of different wavelength components.

The computer generated hologram has a function to collimate or converge light as in optical lenses and a function to deflect light as in prisms, and can be provided with a strong wavelength dependency attributable to the application of diffraction. More important, by utilizing the wavelength dependency, the computer generated hologram can be charged with performing an optical path splitting action and a wavelength separating action to separate a multiplexed light into respective wavelength components and guide the wavelength components along divided optical paths.

<Construction 1>

According to the present invention, an optical device for use in optical network units in optical communication has a first input terminal for receiving a multiplexed light having component beams of mutually different wavelengths included therein; a first output terminal for outputting a beam of a first wavelength component separated from the multiplexed light received at the input terminal; and a pair of second input and output terminals for enabling bi-direction communication to direct to the first input terminal a beam of a second wavelength component separated from the multiplexed light.

The optical device comprises a first computer generated hologram for converting the multiplexed light from the first input terminal into a parallel beam;

deflection means for deflecting the multiplexed light having passed through the first computer generated hologram according to wavelengths thereof;

a second computer generated hologram for directing to the first output terminal a beam of the first wavelength component separated by the deflection means;

optical path splitting means for separating the second wavelength component separated by the deflection means;

a third computer generated hologram for directing a beam of the second wavelength component traveling through one optical path separated by the optical path splitting means to the second output terminal; and a fourth computer generated hologram for guiding a beam of the second wavelength component from the second input terminal to the optical path splitting means in order to direct the beam of the second wavelength component from the second input terminal to the first input terminal through the other optical path, the optical path splitting means and the first computer generated hologram.

<Function 1>

A multiplexed light incident on the first input terminal is converted into a parallel light beam by the first computer generated hologram, and the parallel light beam is separated into first and second wavelength components by the deflection means. The first wavelength component beam is guided through the second computer generated hologram to the first output terminal.

The second wavelength component separated by the deflection means is guided to one branch path by the optical path splitting means. The beam traveling along the one branch path is guided to the second output terminal by the third computer generated hologram. A beam of the second wavelength component input from the second input terminal for bi-directional communication is guided by the fourth computer generated hologram guided to the other branch path, and passes through the optical path splitting means and the first computer generated hologram to the first input terminal.

The computer generated holograms are optical elements utilizing diffraction and can each be charged with performing various functions, such as the collimating function, the light converging function, the deflection function, the optical path disjoining action and the wavelength separating action in duplication or selectively if desired. Therefore, they can be made in a compact size, and obviate the need of fusion splicing with optical fibers. Accordingly, this invention does not incur an increase in production cost, but more specifically can be manufactured at lower cost than the conventional optical fiber devices.

Because a computer generated hologram can be charged with performing a function of separating wavelengths, a computer generated hologram of a transmission type or a reflection type having a function to separate wavelengths can be used as the deflection means.

However, in the wavelength separation by the computer generated hologram, the wavelength components separated from a multiplexed light are obtained as a transmitted light or a reflected light.

On the other hand, by using a dielectric filter means like a WDM mirror made of dielectric films as the wavelength splitting filter, it is possible to obtain one wavelength component as a reflected light and the other wavelength component as a transmitted light. For this reason, the optical path can be shortened without incurring a decrease of the separation efficiency, so that it is desirable to use a dielectric filter like a WDM mirror as the wavelength splitting filter for the purpose of size reduction.

Furthermore, the deflection means can be configured by a parallel combination of computer generated holograms of different wavelength deflection characteristics.

Another possible example of the deflection means is a wavelength splitting filter formed by a dielectric filter, such as a half mirror made of dielectric films.

By way of size reduction, it is desirable to use a wavelength splitting filter formed by a dielectric filter like a half mirror.

As the optical path splitting means, it is possible to use a computer generated hologram or a wavelength filter called a half mirror made of a multilayer structure of dielectric films.

The third and the fourth computer generated holograms can be charged with performing the function of the above-mentioned deflection means and they can be further added with the function of the optical path splitting means.

<Construction 2>

An optical device for an optical network unit in optical communication has a common terminal for receiving a beam of one wavelength component and outputting a beam of the other wavelength component out of beams of mutually different wavelength components for bi-directional communication; an output terminal for sending out the beam of one wavelength component to a light detector; and an input terminal for receiving the beam of the other wavelength component from a light source, and further comprises:

deflection means for separating the optical path from the common terminal into first and second optical paths according to wavelengths of light;

a first computer generated hologram for converging the beam of one wavelength component entering the common terminal to the light detector; and a second computer generated hologram for guiding the beam of the second wavelength component from the light source to the deflection means to direct the beam of the second wavelength component to the common terminal through the deflection means.

The optical device having the common terminal for bi-directional communication may adopt an additional arrangement as follows.

For the deflection means, a computer generated hologram may be used.

The first and the second branch paths can be formed by diffracted light paths including at least an optical path of a high-order diffracted light of this computer generated hologram.

As the computer generated hologram for the deflection means, it is possible to use a transmission type computer generated hologram and a reflection type computer generated hologram as well which is formed by adding reflection means to the transmission type computer generated hologram.

This computer generated hologram can be formed by arranging in parallel in the optical path a pair of computer generated hologram portions which differ in the direction of deflection.

The first and the second paths for different wavelengths can be formed by utilizing the wavelength dependency of the deflection angle by the prism function of the computer generated hologram.

Furthermore, the deflection means can be formed by a wavelength splitting filter like a dielectric filter instead of forming the deflection means by a computer generated hologram as described above.

<Function 2>

In the optical device described in the Arrangement 2 in the present invention, the principal optical elements are basically formed by computer generated holograms.

A beam of one wavelength component input to the common input terminal passes through the first path and is guided by the first computer generated hologram to the photodetector. A beam of the other wavelength component from the light source is guided by the second computer generated hologram to pass through the second path to the first output terminal.

The above-mentioned optical device according to the present invention, the diffraction-applied computer generated holograms can be charged with performing the collimating function, the light converging function, the deflection function, the optical path disjoining action, and the wavelength splitting action in duplication or selectively as required, for which reason the optical device can be made in a compact size. Furthermore, since the computer generated holograms obviate the need of fusion splicing with optical fibers, the computer generated holograms save fusion splicing labor and reduce production cost, so that it becomes possible to produce the optical device at lower cost than the conventional fiber optical device.

<Construction 3>

According to the present invention, a method of manufacturing an optical device for optical network units in optical communication, concerns an optical device including:

a first computer generated hologram for converting a multiplexed light from a first input terminal into a parallel light beam;

deflection means for deflecting the multiplexed light having passed through the first computer generated hologram according to wavelengths;

a second computer generated hologram for directing a beam of a first wavelength component separated by the deflection means to a first output terminal;

optical path splitting means for deflecting a beam of a second wavelength component separated by the deflection means;

a third computer generated hologram for directing the beam of the second wavelength component traveling along one optical path separated by the optical path splitting means from a second output terminal to a light detector;

a fourth computer generated hologram for guiding a beam of the second wavelength component from a light source to the optical path splitting means in order to direct the beam of the second wavelength component from a second input terminal through the other optical path, the optical path splitting means and the first computer generated hologram to the first input terminal.

The above-mentioned manufacturing method according to the present invention comprises the steps of:

forming the computer generated holograms, the deflection means and the optical path splitting means in high density on selected attaching surfaces of a plurality of plates with transparency to be bonded together;

joining the plates together to form a laminated body; and splitting the laminated body in the through-thickness direction to form a large number of the optical devices.

The manufacturing method according to the present invention comprising the steps of:

forming in high density a large number of first and second computer generated holograms in pairs on one attaching surface of a second plate with transparency to be bonded to a first plate with transparency;

forming the deflection means in high density on the other surface of the second plate;

forming the deflection means in high density on one surface of a third plate with transparency facing the second plate and forming the third and fourth computer generated holograms in corresponding pairs in high density on the other surface of the third plate;

forming a laminated body by joining the first and third plates together; and splitting the laminated body in the through-thickness direction to obtain a large number of separate optical device.

<Function 3>

In the manufacturing method according to the present invention, a multilayer structure including a plurality of optical devices is formed by high density integration of optical elements including a large number of computer generated holograms. This multilayer structure including a plurality of optical devices is split into individual optical devices.

Therefore, it is possible to manufacture optical devices according to the present invention with high efficiency.

In the manufacture of a computer generated hologram, a phase difference function of light in a hologram exhibiting desired diffraction optical characteristics is obtained using CAD. This phase difference function is called an optical path difference function $\rho(x, y)$. The optical path difference function $\rho(x, y)$ is transformed into a polynomial as follows.

$$\rho(x,y) = \Sigma C_N x^m y^n \quad (1)$$

This polynomial($C_N x^m y^n$) is called an optical path difference coefficient. n and m are plus integers, and $C_N$ is called a phase coefficient. Between N and m, n, the following equation holds.

$$N = [(m+n)^2 + m + 3n]/2 \quad (2)$$

By obtaining this phase coefficient $C_N$ as the polynomial coefficients of Taylor expansion approximate expression obtained by two-dimensional Taylor expansion, and substituting those coefficients in a CAD program, photolithographic mask patterns can be generated which are required to produce desired shapes by photolithography.

As one example of such a CAD program, there is Cgh-CAD by NIPT in California, U.S.A.

In this CAD program, for reasons of data processing capacity, there are imposed operational conditions that the sum of m and n is 10 or less, and N is 65 or less.

Therefore, the conditions for the masks for computer generated holograms that show desired diffraction optical characteristics can be obtained by finding an optical path difference function $\rho(x, y)$ showing desired characteristics, and then obtaining the respective phase coefficients $C_N$ ($C_0$ to $C_{65}$) of the optical path difference function $\rho(x, y)$.

By making masks meeting the mask conditions, and performing a photolithographic process, computer generated holograms showing desirable diffraction optical characteristics can be obtained.

BRIEF DESCRIPTION OF THE DRAWINGS

FIG. 2 is an explanatory diagram of Taylor expansion;

FIG. 3 is an explanatory diagram of the optical path difference coefficient by Taylor expansion (Part 1);

FIG. 4 is an explanatory diagram of the optical path difference coefficient by Taylor expansion (Part 2);

FIG. 5 is an explanatory diagram of the optical path difference coefficient by Taylor expansion (Part 3);

FIG. 6 is an explanatory diagram of the optical path difference coefficient by Taylor expansion (Part 4);

FIG. 7 is an explanatory diagram of the optical path difference coefficient by Taylor expansion (Part 5);

FIG. 8 is an explanatory diagram of the optical path difference coefficient by Taylor expansion (Part 6);

FIG. 9 is an explanatory diagram of the optical path difference coefficient by Taylor expansion (Part 7);

FIG. 11 is an explanatory diagram of the optical path difference coefficient of the first CGH element (Part 1);

FIG. 12 is an explanatory diagram of the optical path difference coefficient of the first CGH element (Part 2);

FIG. 13 is an explanatory diagram of the optical path difference coefficient of the first CGH element (Part 3);

FIG. 14 is an explanatory diagram of the optical path difference coefficient of the first CGH element (Part 4);

FIG. 16 is an explanatory diagram of the optical path difference coefficient of the second CGH element (Part 1);

FIG. 17 is an explanatory diagram of the optical path difference coefficient of the second CGH element (Part 2);

FIG. 18 is an explanatory diagram of the optical path difference coefficient of the second CGH element (Part 3);

FIG. 19 is an explanatory diagram of the optical path difference coefficient of the second CGH element (Part 4);

FIG. 26 is an explanatory diagram of the optical path difference coefficient of the optical path splitting means (CGH element);

FIG. 29 is an explanatory diagram of the optical path difference coefficient of the third CGH element (Part 1);

FIG. 30 is an explanatory diagram of the optical path difference coefficient of the third CGH element (Part 2);

FIG. 31 is an explanatory diagram of the optical path difference coefficient of the third CGH element (Part 3);

FIG. 32 is an explanatory diagram of the optical path difference coefficient of the third CGH element (Part 4);

FIG. 33 is an explanatory diagram of the optical path difference coefficient of the third CGH element (Part 5);

FIG. 34 is an explanatory diagram of the optical path difference coefficient of the third CGH element (Part 6);

FIG. 36 is an explanatory diagram of the optical path difference coefficient of the fourth CGH element (Part 1);

FIG. 37 is an explanatory diagram of the optical path difference coefficient of the fourth CGH element (Part 2);

FIG. 38 is an explanatory diagram of the optical path difference coefficient of the fourth CGH element (Part 3);

FIG. 39 is an explanatory diagram of the optical path difference coefficient of the fourth CGH element (Part 4);

FIG. 40 is an explanatory diagram of the optical path difference coefficient of the fourth CGH element (Part 5);

FIG. 41 is an explanatory diagram of the optical path difference coefficient of the fourth CGH element (Part 6);

DESCRIPTION OF THE PREFERRED EMBODIMENTS OF THE INVENTION

The present invention will be described in detail with reference to the embodiments illustrated in the accompanying drawings.

<Embodiment 1>

Figure 1:
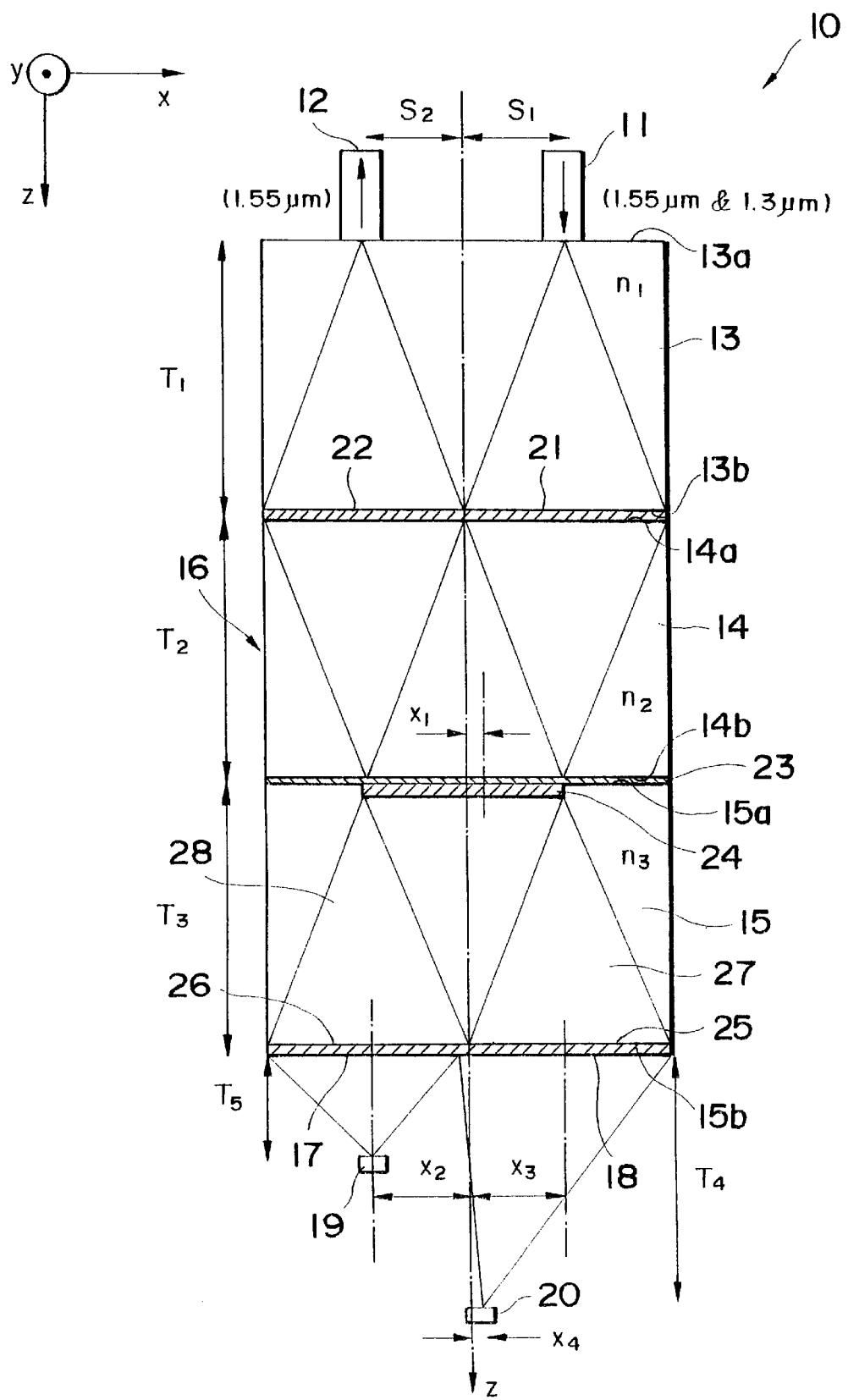
FIG. 1 is a longitudinal section schematically showing the optical device according to the present invention.

FIG. 1 is a sectional view schematically showing the optical device according to the present invention.

The optical device 10 according to the present invention comprises a multilayer structure 16 in a generally block form, which includes a first glass plate 13 having a first input terminal 11 and a first output terminal 12 provided on one surface 13a thereof; a second glass plate 14 having one surface 14a thereof bonded to the other surface 13b of the first glass plate 13; and a third glass plate 15 having one surface 15a thereof bonded to the other surface 14b of the second glass plate 14.

The respective glass plates 13, 14 and 15 have thickness of $T_1$, $T_2$ and $T_3$ and refractive indexes of $n_1$, $n_2$ and $n_3$.

If the axis passing about the center of multilayer structure 16 and through the thickness of the glass plates 13, 14 and 15 is designated as the z-axis, the first input terminal 11 and the first output terminal 12 are formed by optical fibers spaced from the z-axis by distances $S_1$ and $S_2$ in opposite directions along the x-axis.

The light input to the optical fiber 11 serving as the first input terminal is a multiplexed light having beams with wavelengths of 1.3 μm and 1.55 μm, for example, multiplexed together, which are signal carrier waves.

One wavelength component is guided to the optical fiber 12 serving as the first output terminal.

On the other surface 15b of the glass plate 15, which serves as the other end of the multilayer structure 16 having the first input terminal 11 and the first output terminal 12 both provided on one end thereof, there are provided a pair of a second input terminal 17 and a second output terminal 18 used for bi-directional communication.

The second input terminal 17 is provided on one-half portion of the other surface 15b of the glass plate 15, and receives a light from a semiconductor laser serving as a transmitter. The second output terminal 18 is provided on the other-half portion of the other surface 15b, and emits a beam of the other wavelength component toward a photodetector 20. In place of the semiconductor laser 19, another light source, such as a light-emitting diode may be used.

The photodetector 20 is arranged at a position separate for a distance of $T_4$ from the second output terminal 18 and lying in a direction along the x-axis and separate for a distance of $x_4$ from the z-axis and lying in a direction along the x-axis.

The semiconductor laser 19 is arranged at a position separate for a distance of $T_5$ from the second input terminal 17 and lying in a direction along the z-axis and separate for a distance of $x_2$ from the z-axis and lying in a direction along the x-axis.

First and second computer generated holograms (hereafter referred to as a CGH element or CGH elements) 21 and 22 are provided between the first glass plate 13 and the second glass plate 14. A wavelength splitting filter 23 as the deflection means and a CGH element 24 as the optical path splitting means are arranged between the second glass plate 14 and the third glass plate 15. A third CGH element 25 and a fourth CGH element 26 are arranged at the second output terminal 18 and the second input terminal 17.

The first and the second CGH elements 21 and 22 are formed in parallel at the one-half and the other-half of the one surface 14a of the glass plate 14. The wavelength splitting filter 23 as the deflection means is formed substantially on the whole surface of the other surface 14b of the glass plate 14.

The CGH element 24 as the optical path splitting means is formed substantially in the center of the one surface 15a of the glass plate 15.

The third and the fourth CGH elements 25 and 26 are formed, as has been described, in parallel at the one-half and the other-half of the other surface 15b of the glass plate 15 which serve as the second output terminal 18 and the second input terminal 17.

The first CGH element 21 has a function to collimate divergent spherical waves from a multiplexed light emerging from the first input terminal 11, and a deflection function to direct the parallel light beam to the wavelength splitting filter 23.

The wavelength splitting filter 23 to receive a multiplexed light guided by the first CGH element 21 is a well-known dielectric filter formed of multiple dielectric layers in the example shown in FIG. 1.

The wavelength splitting filter 23 formed by a dielectric filter, which is referred to as a WDM mirror, functions as a surface to reflect the first wavelength component beam with a wavelength of 1.55 µm, included in the multiplexed light injected into the first input terminal 11 and guided by the first CGH element 21. On the other hand, the wavelength splitting filter 23 transmits a beam of the second wavelength component of 1.3 µm of the multiplexed light.

The parallel light beam of wavelength 1.55 µm as the first wavelength component reflected by the wavelength splitting filter 23 is converged by the second 22 into the output fiber 12 as the first output terminal. The first wavelength component beam emerging from the first output terminal 12 is sent to the terminal equipment of unidirectional communication, such as television broadcast.

Of the parallel light beam of wavelength 1.3 µm as the second wavelength component having passed through the wavelength splitting filter 23 as the deflection means, about 40% of the parallel light beam is deflected as the minus1st order diffracted light by the CGH element as the optical path splitting means and travels toward the third CGH element 25. On the other hand, about 40% of the second wavelength component having passed through the wavelength splitting filter 23 is deflected as a1st order diffracted light and travels toward the fourth CGH element 26.

The parallel light beam of the second wavelength component traveling along the first path 27 and directed to the third CGH element 25 is converged by the converging function of the CGH element 25 to the photodetector 20, and by the receiving circuit of telephone, for example, not shown, which is connected to the photodetector 20, information contained in the second wavelength component beam is obtained.

The parallel light beam of the second wavelength component directed through the second path 28 to the fourth CGH element 26 is converged by the converging action of the fourth CGH element 26 to the semiconductor laser 19.

Therefore, when the second wavelength component beam is diverged to the fourth CGH element from the semiconductor laser of the transmitter circuit of telephone, for example, arranged at the focal point of the fourth CGH element, the second wavelength component beam passes through the CGH element 24, the wavelength splitting filter 23 as the deflection means and the first CGH element 21, and is guided to the first input terminal 11.

Therefore, bi-directional communication between a multiplexed light source (not shown) and the optical device 10 to receive the multiplexed light with the first input terminal 11 is made possible by the use of the second input terminal 17 and the second output terminal 18 of the optical device.

Before moving on to a detailed description of the optical characteristics of the respective CGH elements 21 to 26 according to the present invention, description will be made of the phase coefficient $C_N$ ($C_0$ to $C_{65}$) of the optical path difference function ρ(x, y) for a general CGH element.

The phase coefficients $C_0$ to $C_{65}$ can be obtained from approximate expressions of up to the degree-ten term of Taylor expansion of the two-dimensional optical path difference function ρ(x, y) with respect to the x-axis and the y-axis.

The relation in the above calculation is expressed by equation (3) in FIG. 2. The Δ in the second term on the right side of equation (3) is a remainder term of Taylor expansion and therefore is a value small enough to be negligible.

FIGS. 3 to 9 are explanatory diagrams showing the phase coefficients $C_0$ to $C_{65}$ obtained by expanding equation (3) by rearranging the optical path difference coefficients $C_0$ to $C_{65}$ in a relational expression of the general expression ρ(x, y) of the optical path difference function.

By finding an optical path difference function ρ(x, y) showing the optical characteristics, and finding the optical path difference coefficients shown in FIGS. 3 to 9, that is to say, the phase coefficients $C_0$ to $C_{65}$ from the optical path difference function ρ(x, y) and then by inputting their values into the above-mentioned CAD program, mask conditions for a computer generated hologram showing a desired diffractive optical characteristics can be obtained.

Description will next be made of the optical path difference function ρ(x, y) of the first CGH element 21 to convert divergent spherical waves from a point light source at the first input terminal 11.

Figure 10:
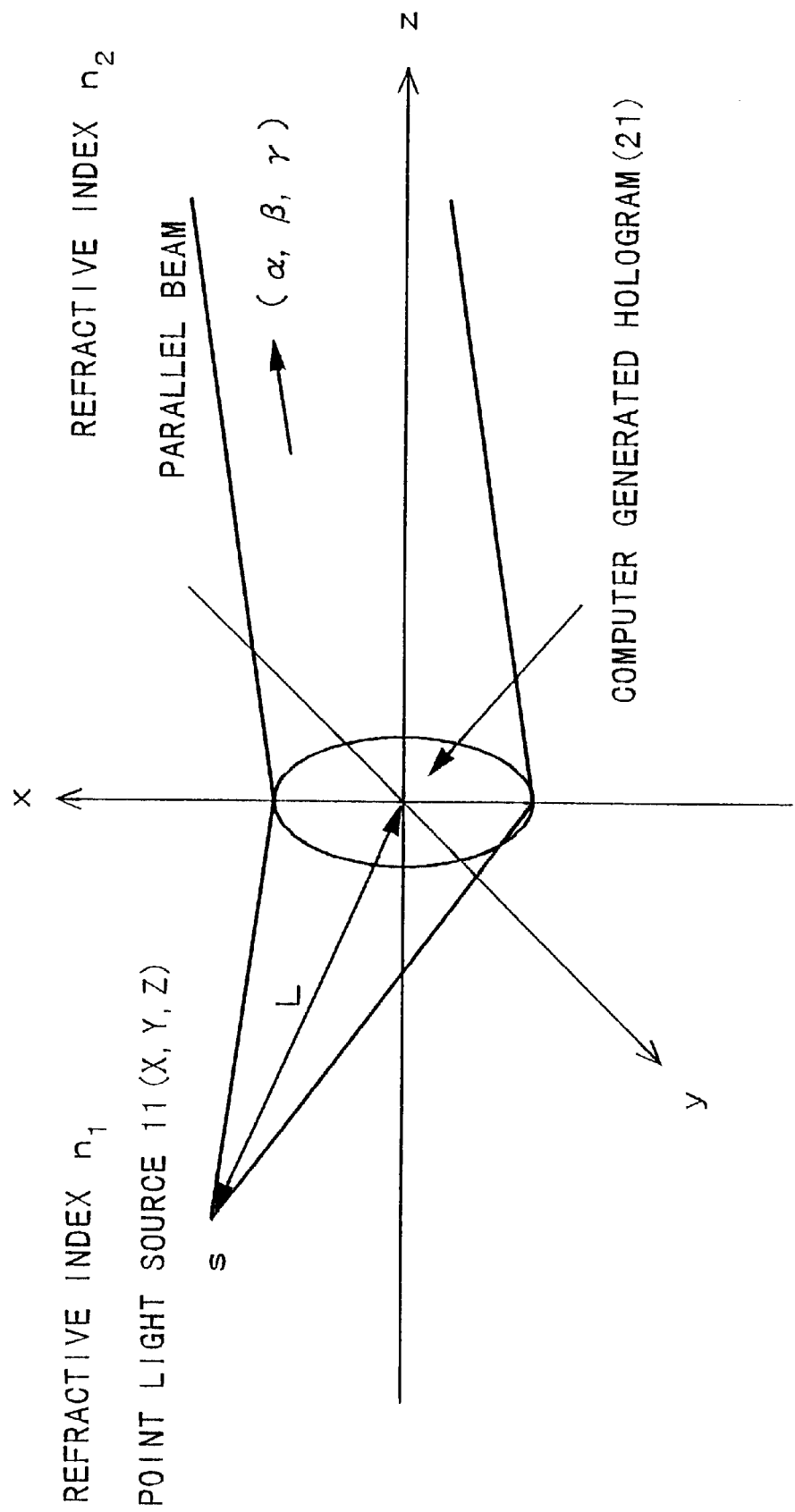
FIG. 10 is an explanatory diagram of optical characteristics of the first CGH element.

FIG. 10 is an explanatory diagram showing the optical characteristics of the diffractive optical element in the first CGH element.

The diffractive optical element (21) shown in FIG. 10 a computer generated hologram for converting the divergent spherical waves from the point light source located at coordinates (x, y, z) into a parallel light beam in which vector components passing through the origin are expressed by (α,β,γ).

The refractive index of the incident-light-side medium is expressed by $n_1$ and the refractive index of the output-light-side medium by $n_2$.

For simplicity of description, the diffractive optical element (21) is placed on the z-axis and its thickness is set at a value small enough to be negligible. Those assumptions do not spoil generality in calculation of the phase coefficient $C_N$.

The optical path difference function ρ(x, y) of the diffractive optical element (21) shown in FIG. 10 can be given by the following equation.

$$\rho(x,y)=n_1 \cdot [(X-x)^2+(Y-y)^2+Z^2]^{1/2}-n_1 L-n_2 \cdot [(\alpha x+\beta y)/(\alpha^2+\beta^2+\gamma^2)^{1/2}] \quad (5)$$

where L denotes the distance from the light source and the origin and can be expressed by the following equation.

$$L=(X^2+Y^2+Z^2)^{1/2} \quad (6)$$

The first term and the second term of equation (4) represent two-dimensional optical path differences in the diffractive optical element (21) with spherical waves from the point light source. The third term of equation (4) represents the optical path difference of the deflected parallel light beam (α,β,γ).

When the optical path difference function ρ(x, y) of the first CGH element 21 shown in FIG. 1 is obtained by referring to the general optical characteristics, shown in FIG. 10, of the diffractive optical element having a collimating function to convert divergent spherical waves into a parallel light beam and also referring to equations (5) and (6) of the general optical path difference function expressing the general optical characteristics, the following equation of the optical path difference function can be obtained as.

$$\rho(x,y)=n_1 \cdot [x^2+y^2+T_1^2]^{1/2}-n_1 L-n_2 \cdot (S_1+S_2)x/[(S_1+S_2)^2+4T_2^2]^{1/2} \quad (7)$$

where S1 and S2 are the distances from the first input terminal 11 and the first output terminal 12 to the z-axis. The distance L from the point light source and the center of the first CGH element 21 can be given by the following equation.

$$L = T_1 \quad (8)$$

The optical path difference coefficients by Taylor expansion for the optical path difference function $\rho(x, y)$ shown in equation (7), that is to say, the phase coefficients $C_0$ to $C_{65}$ can be obtained by substituting equation (7) in equations (4-0) to (4-65) in FIGS. 3 to 9.

FIGS. 11 to 14 show the operational results of each term $C_N$ as indicated by equations (9-0) to (9-65).

By inputting the values of the optical path difference coefficients $C_0$ to $C_{65}$ indicated by equations (9-0) to (9-65) into the optical path difference coefficient $C_N$ in equation (1) of the CAD program and executing this program, data on mask patterns can be obtained which is required to form the first CGH element 21 expressed by equation (7).

Because the refractive index n is a function of a wavelength of light, $n_1$ as the refractive index of the glass plate 13 and $n_2$ as the refractive index of the glass plate 14 differ with the wavelength of light (1.3 μm and 1.55 μm).

Therefore, both refractive indexes $n_1$ and $n_2$ may be adopted for a wavelength of 1.3 μm as the refractive indexes in equation (7), but in the embodiment shown in FIG. 1, the refractive indexes $n_1$ and $n_2$ are adopted for a wavelength of 1.55 μm.

Description will now be made of the optical path difference function $\rho(x, y)$ of the second CGH element 22 to converge a parallel light beam to the first output terminal 12 as the object point.

Figure 15:
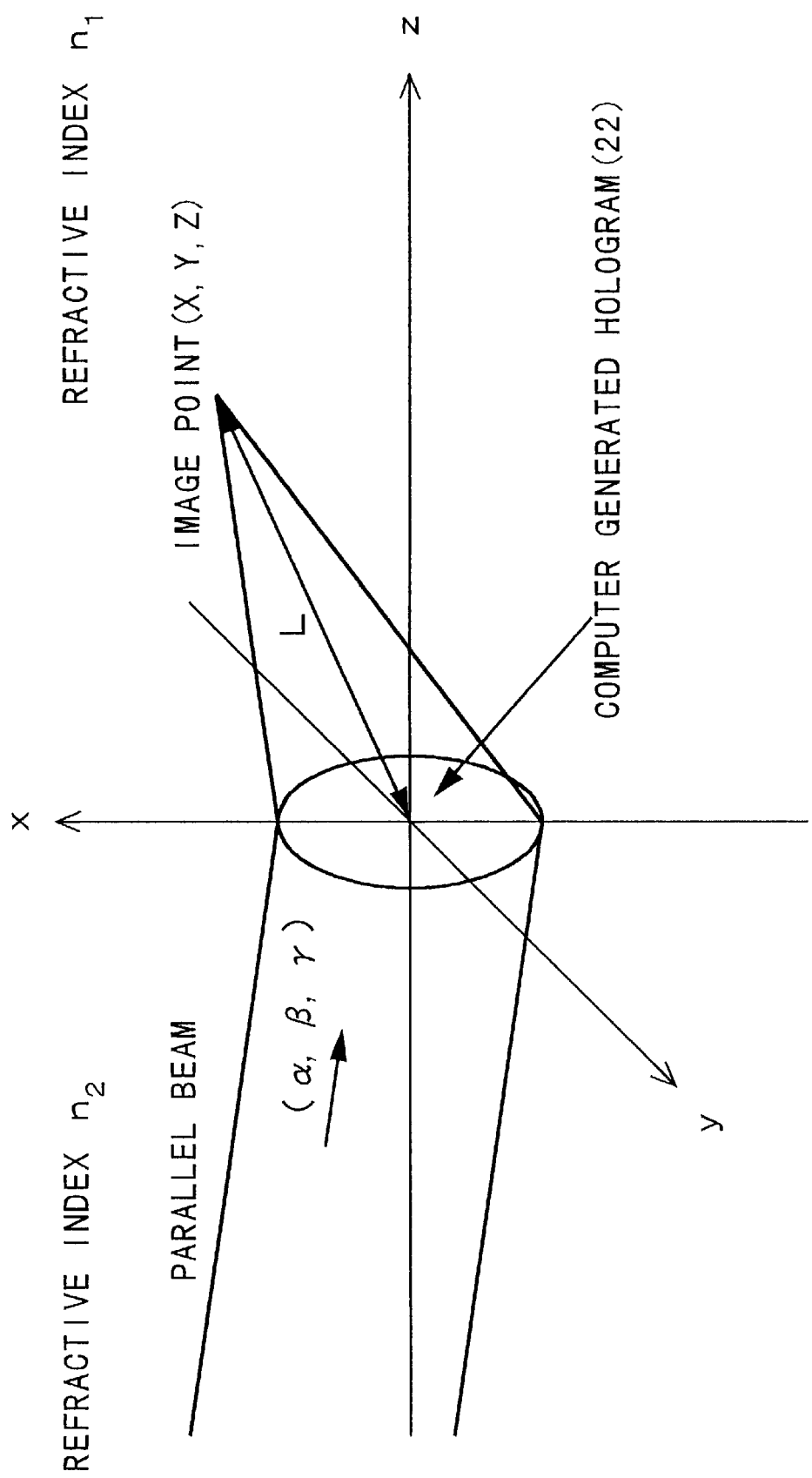
FIG. 15 is an explanatory diagram of the optical characteristics of the second CGH element.

FIG. 15 is an explanatory diagram showing the optical characteristics of the diffractive optical element in the second CGH element.

The diffractive optical element (22) in FIG. 15 is a computer generated hologram for converting a parallel light beam in which vector components passing through the origin have any deflection angles indicated by $(\alpha,\beta,\gamma)$ into spherical waves, and converging the spherical waves to the image point (X, Y, Z).

In the example in FIG. 15, the refractive index of the medium on the side where light is incident on the diffractive optical element is denoted by $n_2$ and the refractive index of the medium on the side where the light emerges is denoted by $n_1$.

As shown in FIG. 10, for simplicity of description, the diffractive optical element (22) is placed on the z-axis and its thickness is set at a value small enough to be negligible.

The optical path difference function $\rho(x, y)$ of the diffractive optical element (22) in FIG. 15 can be given by the following equation.

$$\rho(x,y) = n_1 \cdot [(X-x)^2 + (Y-y)^2 + Z^2]^{1/2} - n_1 L + n_2 \cdot [(\alpha x + \beta y)/(\alpha^2 + \beta^2 + y^2)^{1/2}] \quad (10)$$

where L denotes the distance from the origin to the image point and is expressed by the following equation.

$$L = (X^2 + Y^2 + Z^2)^{1/2} \quad (11)$$

When the optical path difference function $\rho(x, y)$ of the second CGH element 22 shown in FIG. 1 is obtained by referring to the general optical characteristics, shown in FIG. 10, of the diffractive optical element having a converging function to converge a parallel light beam into an image point and also referring to equations (10) and (11) of the general optical path difference function expressing the general optical characteristics, the following equation of the optical path difference function can be obtained as.

$$\rho(x,y) = n_1 \cdot [x^2 + y^2 + T_1^2]^{1/2} - n_1 L + n_2 \cdot (S_1 + S_2) x / [(S_1 + S_2)^2 + 4T_2^2]^{1/2} \quad (12)$$

where $S_1$ and $S_2$ are the distances from the first input terminal 11 and the first output terminal 12 to the z-axis. The distance L from the point light source and the center of the second CGH element 22 can be given by the following equation.

$$L = T_1 \quad (13)$$

The optical path difference coefficients by Taylor expansion for the optical path difference function $\rho(x, y)$ shown in equation (12), that is to say, the phase coefficients $C_0$ to $C_{65}$ can be obtained by substituting equation (12) in equations (4-0) to (4-65) in FIGS. 3 to 9.

FIGS. 16 to 19 show the operational results of each term $C_N$ as indicated by equations (14-0) to (14-65).

By inputting the values of the optical path difference coefficients $C_0$ to $C_{65}$ indicated by equations (14-0) to (14-65) into the optical path difference coefficient $C_N$ in equation (1) of the CAD program and executing this program, data on mask patterns can be obtained which is required to form the second CGH element 22 expressed by equation (12).

In the embodiment of FIG. 1, as in the case of the first CGH element 21, for the refractive indexes in equation (13), the refractive indexes $n_1$ and $n_2$ for a wavelength of 1.55 μm are adopted.

The first CGH element 21 and the second CGH element 22 are set for a 1.55 μm of the first wavelength component as described above. With the optical path splitting means 24, the third and the fourth CGH elements 25, 26, the focal length and the diffraction angle need to be corrected according to a shift of wavelength.

Before describing the optical characteristics of the respective CGH elements 24 to 25, the wavelength dependency of the deflection angle and the focal length of the CGH element will first be discussed.

Figure 20:
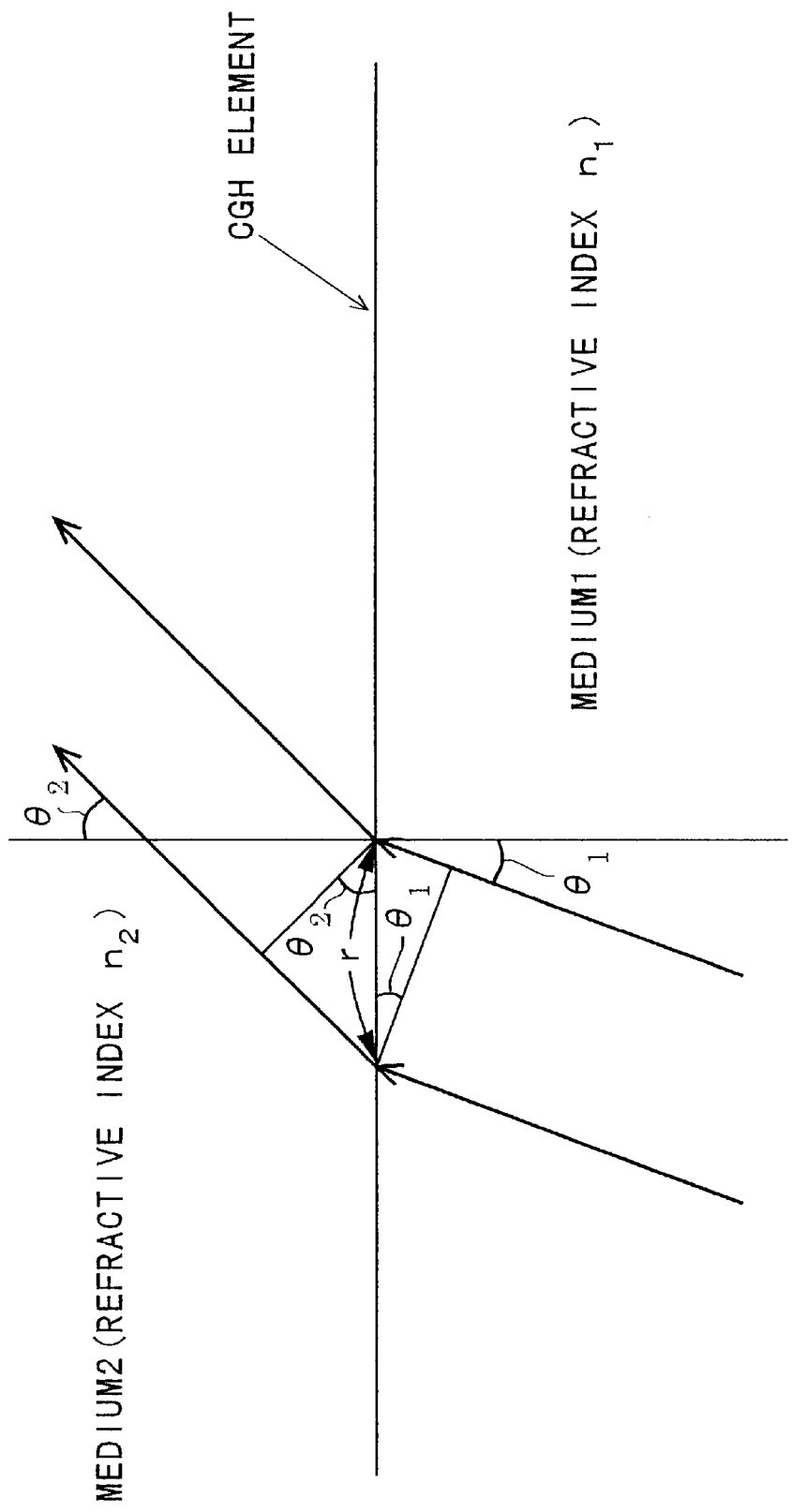
FIG. 20 is an explanatory diagram of the wavelength dependency of the deflection angle of a computer generated hologram.

Referring to FIG. 20, the wavelength dependency of the deflection angle in diffraction of the computer generated hologram or the CGH element will be considered.

A CGH element which deflects an incident parallel light beam can be regarded as a grating having a periodic phase distribution. Therefore, the optical characteristics of the CGH element can be explained by a well-known grating equation.

As shown in FIG. 20, if the incident angle and the output angle of light to the optical axis of the CGH element are denoted as $\theta_1$ and $\theta_2$, respectively, the relation between the grating period r and the wavelength $\lambda$ is expressed by the following equation.

$$r = \lambda/(n_2 \sin\theta_2 - n_1 \sin\theta_1) \quad (15)$$

The grating period r corresponds to one periodic pitch of a concentric circle pattern of the CGH element having a lens function.

If the output angle $\theta_2$ for a wavelength $\lambda$ is obtained by rearranging equation (15), the following equation can be given.

$$\sin\theta_2 = \lambda/(r n_2) + (n_1/n_2) \cdot \sin\theta_1 \quad (16)$$

In equations (15) and (16), the refractive indexes $n_1$ and $n_2$ are regarded as constant regardless of the wavelength $\lambda$, and variations of the refractive indexes with respect to changes of wavelength are not considered. Strictly speaking, the refractive indexes $n_1$ and $n_2$ are functions of wavelength.

Thus, about the wavelength $\lambda$ of incident light beam and wavelength $\lambda'$ having a little difference from wavelength $\lambda$, their relations with equation (15) are expressed as $$r=\lambda/(n_2(\lambda)\sin\theta_2-n_1(\lambda)\sin\theta_1) \quad (17)$$

$$r=\lambda'/(n_2(\lambda')\sin\theta_2-n_1(\lambda')\sin\theta_1) \quad (18)$$

where $n_1(\lambda)$, $n_2(\lambda)$, $n_1(\lambda')$, $n_2(\lambda')$ denote the refractive indexes $n_1$ and $n_2$ for wavelengths $\lambda$ and $\lambda'$.

By removing the grating period r from equations (17) and (18) and rearranging the equations to derive an identical grating period r, that is, the wavelength dependency of the CGH element, the following equation can be given.

$$\sin\theta_2' = \{(1/n_2(\lambda'))\cdot(\lambda'/\lambda)\cdot(n_2(\lambda)\sin\theta_2-n_1(\lambda)\sin\theta_1)\}+(n_1(\lambda')/n_2(\lambda'))\cdot\sin\theta_1 \quad (19)$$

Equation (19) shows the relation between the output light angle $\theta_2$ and $\theta_2'$ of the wavelengths $\lambda$ and $\lambda'$ of the incident light and indicates that a shift arises in the output angle as a result of a shift in the wavelength of the incident light.

Therefore, with the CGH element which has been set for a light of a wavelength of 1.55 μm, for example, a correction of the deflection angle of the angle $\theta_2'$ for a light with a wavelength of 1.3 μm can be given by the following equation.

$$\theta_2'=\sin^{-1}[\{(1/n_2(\lambda'))\cdot(\lambda'/\lambda)\cdot(n_2(\lambda)\sin\theta_2-n_1(\lambda)\sin\theta_1)\}+(n_1(\lambda')/n_2(\lambda'))\cdot\sin\theta_1] \quad (20)$$

Figure 21:
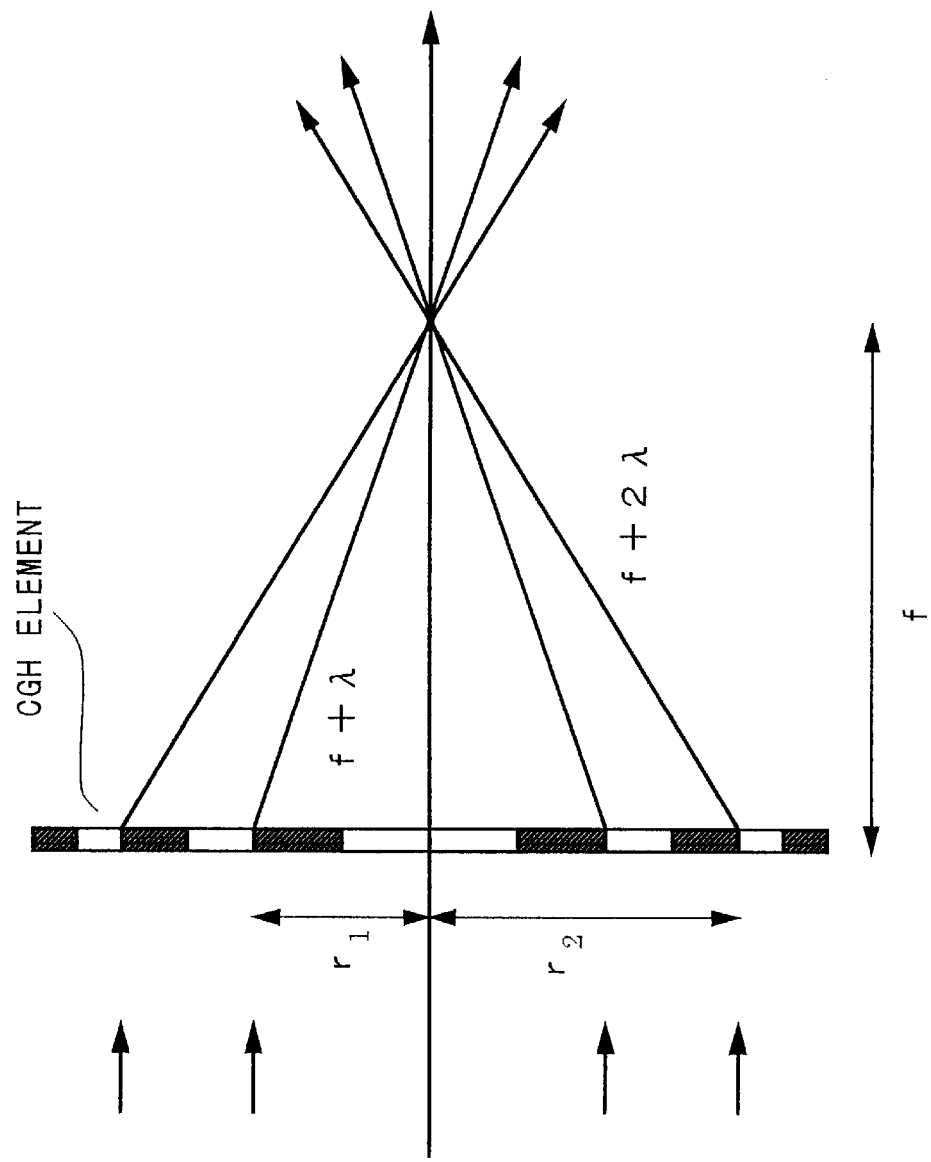
FIG. 21 is an explanatory diagram of the wavelength dependency of the focal length of a computer generated hologram.

Description will then be made of the wavelength dependency of the focal length in diffraction of the computer generated hologram, that is, the CGH element with reference to FIG. 21.

As shown in FIG. 21, a CGH element to converge a parallel light beam at a focal length f can be obtained by forming the CGH element grating in radial direction so as to satisfy the conditions that the optical path lengths from the respective grating radii r to the focal point are the focal length f added with integer multiples of a wavelength.

Therefore, the relation between the focal length f and the grating radius $r_j$ of the j-th period is expressed by the following equation.

$$r^2+f^2=(f+j\lambda)^2 \quad (21)$$

From equation (21), an equation can be derived as follows.

$$r_j^2=2j\lambda f+(j\lambda)^2 \quad (22)$$

Since the unit of the focal length f is mm and the unit of wavelength $\lambda$ is μm, the second term of the right side of equation (22) is a value small enough to be negligible compared with the first term of the right side. Therefore, an approximate equation of equation (22) is obtained as:

$$r_j^2=2j\lambda f \quad (23)$$

If j=1 is substituted in equation (23), the following equation can be obtained.

$$f=r_j^2/2\lambda \quad (24)$$

Equation (24) is a relational expression between the focal length f of a well-known Fresnel lens and the wavelength $\lambda$.

The focal length f' when the wavelength changes from $\lambda$ to $\lambda'$ by integration of equation (24) is expressed as $$f'=f(\lambda/\lambda') \quad (25)$$

Equation (25) indicates that the CGH element acts as an equivalent lens with a short focal length for longer wavelengths than the initial design wavelength of the CGH element.

In consideration of the wavelength $\lambda$ dependency of a CGH element having an image-forming function shown in FIG. 22, as an example, from an image-forming relational expression of an optical lens, an equation can be derived as follows.

$$(n_1/a)+(n_2/b)=(1/f) \quad (26)$$

where a denotes the distance to the object point, b denotes the distance to the image point, and f denotes the focal length of the CGH element in vacuum.

The relation between the deflection angles $\theta_2$ and $\theta_2'$ of output light with respect to wavelengths $\lambda$ and $\lambda'$ of incident light is as expressed by the above-mentioned equation (20).

From equation (26), the image point position b' at a wavelength $\lambda'$ is given by the following equation.

$$(n_1/a)+(n_2/b')=(1/f')=\lambda'/(f\lambda) \quad (27)$$

Figure 22:
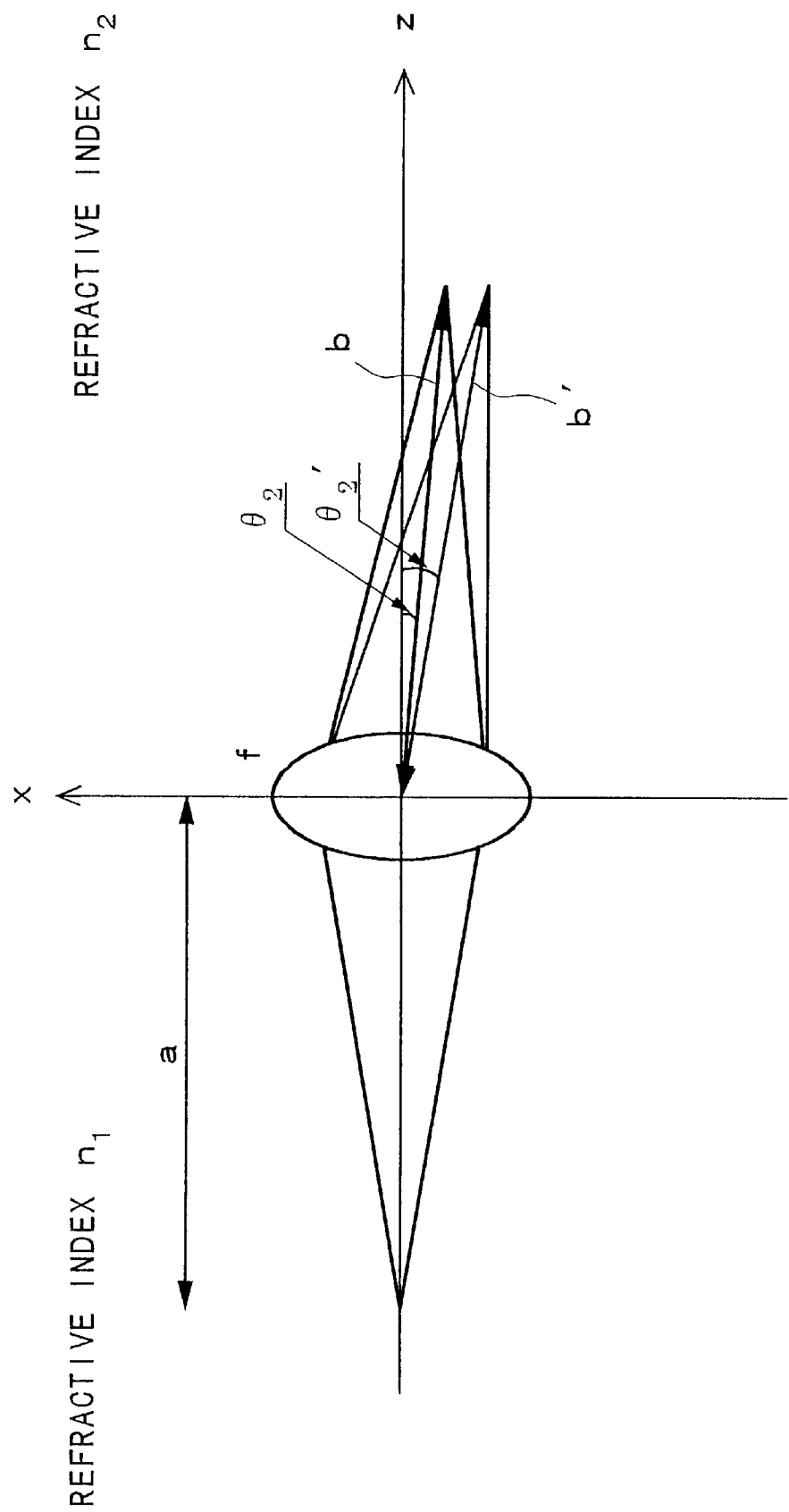
FIG. 22 is an explanatory diagram of the wavelength dependency of the deflection angle and the focal length of the image-forming lens using a computer generated hologram.

Therefore, it is indicated that according to the CGH element shown in FIG. 22, when the focal point is f for a beam with a wavelength component $\lambda$, a shift of $\theta_2'$ indicated by equation (20) occurs in the deflection angle $\theta_2$ and the image point length b changes to the image point length b' which satisfies equation (27).

To further clarify the optical characteristics of the CGH element 24 as the optical path splitting means in FIG. 1, in the case of the CGH element (24), description will be made of the optical path difference function ρ(x, y) of the diffractive optical element (24) which deflects an optional parallel light beam to a parallel light beam having an optional deflection angle.

Figure 23:
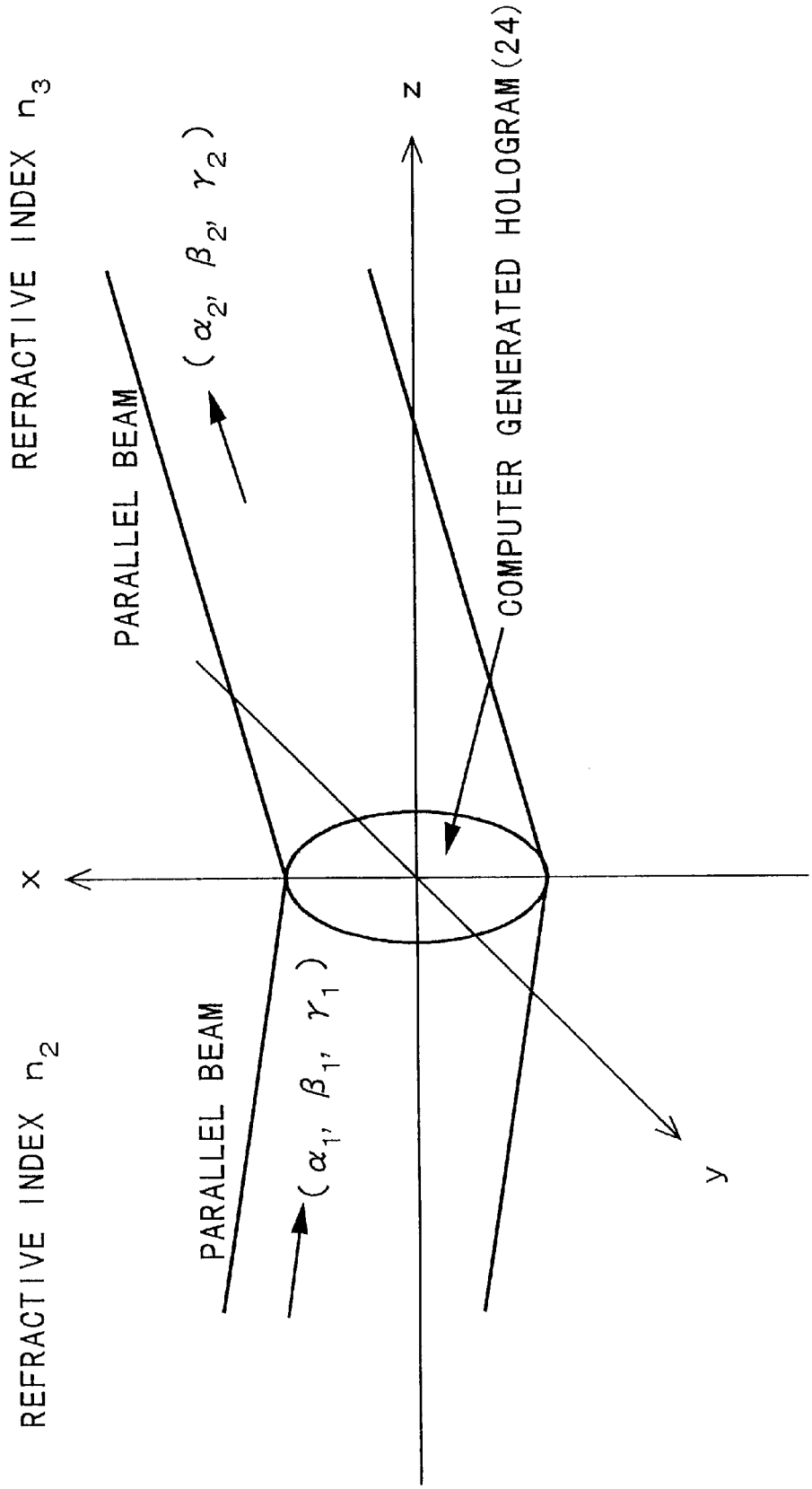
FIG. 23 is an explanatory diagram of the optical characteristics of the optical path splitting means (CGH element)

FIG. 23 shows the basic optical characteristics of the transmission type CGH element 24 serving as the optical path splitting means. The diffractive optical element (24) shown in FIG. 23 has a prism function to deflect an optional parallel light beam into a parallel flux having an optional deflection angle.

For simplicity of description, like in the above-mentioned cases, the CGH element passes through the origin and lies in within a plane including the x-axis and the y-axis. An incident parallel light beam to the CGH element is parallel with vector components ($\alpha_1$, $\beta_1$, $\gamma_1$) and an output parallel light beam is parallel with vector components ($\alpha_2$, $\beta_2$, $\gamma_2$) passing through the origin.

The incident-light-side medium where there is an incident parallel light beam has a refractive index $n_2$, while the output-light-side medium where there is an output parallel light beam has a refractive index $n_3$. At this time, the general expression of the optical path difference function ρ(x, y) is as follows.

$$\rho(x,y)=n_2\cdot(\alpha_1 x+\beta_1 y)/(\alpha_1^2+\beta_1^2+\gamma_1^2)^{1/2}-n_3\cdot(\alpha_2 x+\beta_2 y)/(\alpha_2^2+\beta_2^2+\gamma_2^2)^{1/2} \quad (28)$$

Meanwhile, generally, if the number of masks required to produce a computer generated hologram is denoted by M, the phase level or the number of phases of a resulting computer generated hologram is expressed by $2^M$. In accordance with this phase level, a required diffraction efficiency of the 1st order diffracted light varies. With a computer generated hologram of the two phase levels in which a phase of one period is formed with one mask, as has been well known, 40% each of the light quantity of the incident light is distributed as the 1st order diffracted light and the minus 1st order diffracted light, and the remaining 20% is distributed as another high-order diffracted light.

Therefore, by utilizing this phenomenon, in other words, by using a computer generated hologram of the two phase levels, 40% each of the light quantity of the incident light can be distributed as the 1st order diffracted light and the minus 1st order diffracted light.

Figure 24:
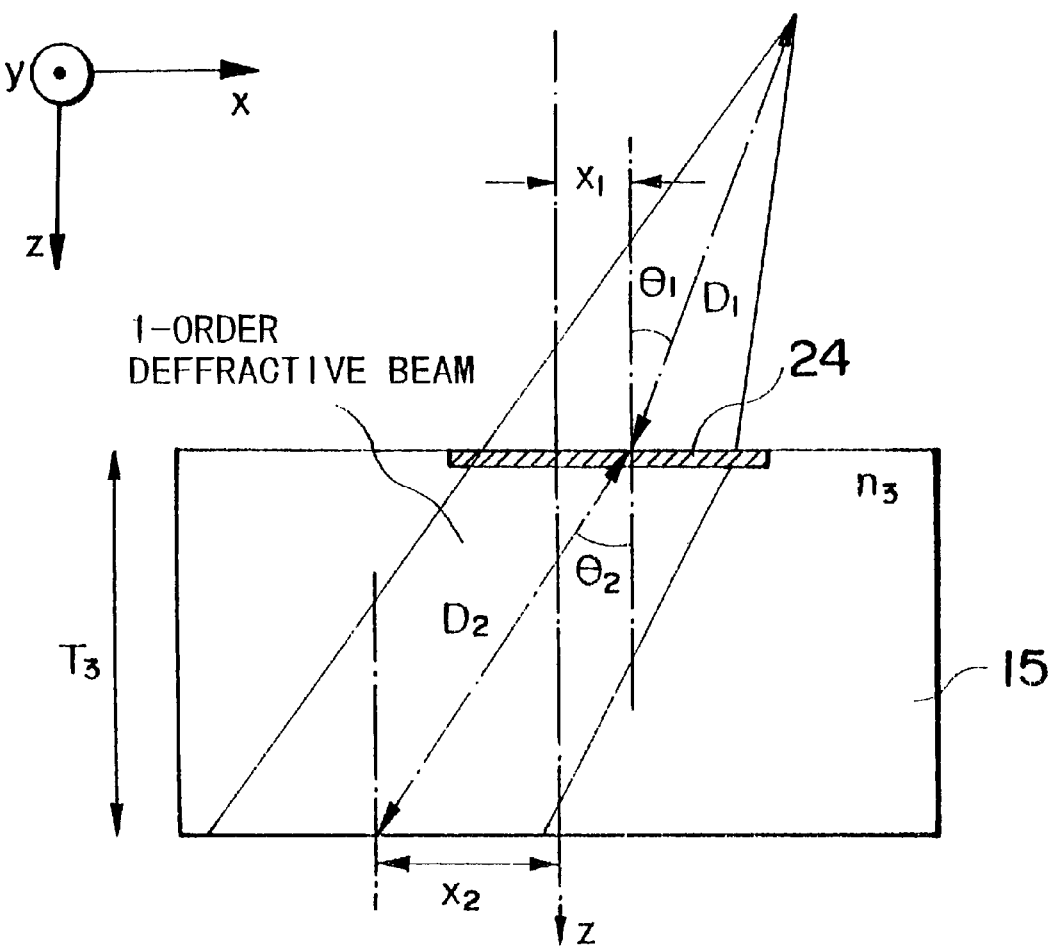
FIG. 24 is an explanatory diagram of the first-order diffracted light of the optical path splitting means (CGH element)
Figure 25:
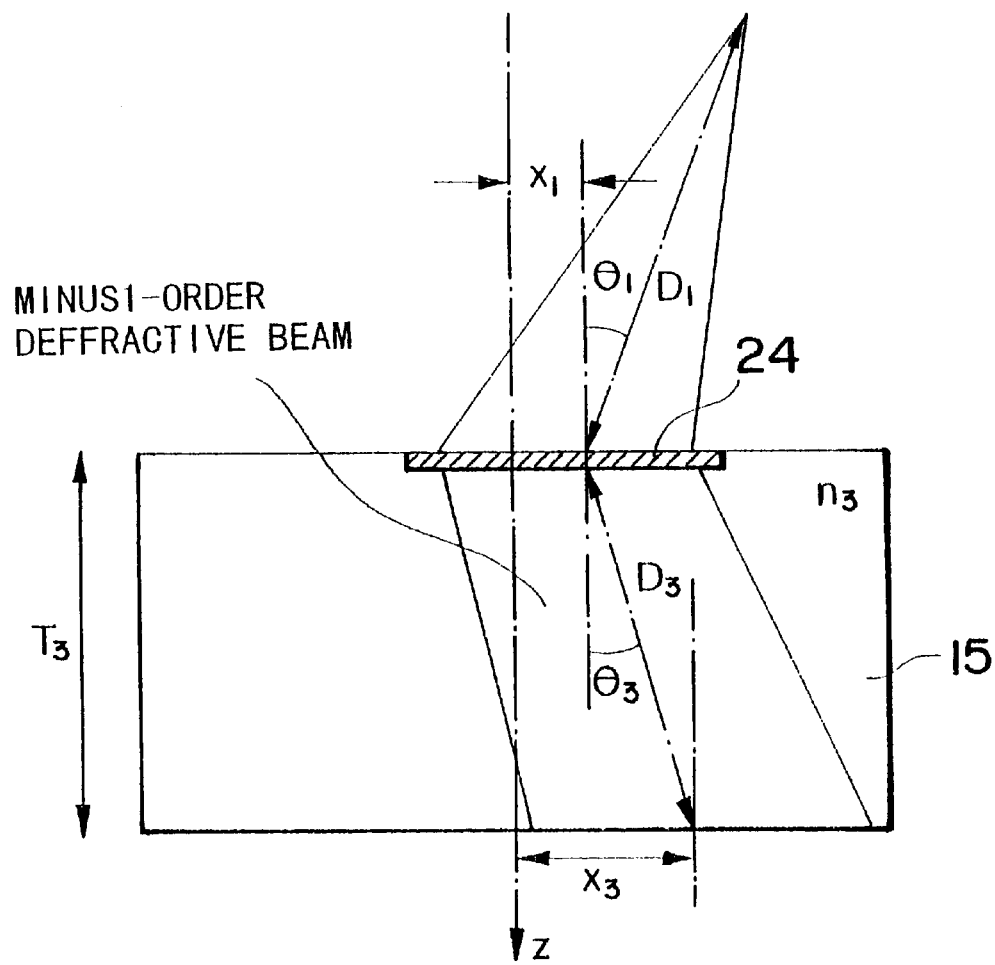
FIG. 25 is an explanatory diagram of the minus 1st order diffracted light of the optical path splitting means (CGH element)

The CGH element 24 serving as the optical path splitting means utilizes the optical path disjoining function of the computer generated hologram. FIGS. 24 and 25 show the behavior of the 1st order diffracted light and the minus 1st order diffracted light.

Referring to FIG. 24, the behavior of the 1st order diffracted light will be described.

The CGH element conducts a beam of 1.3 $\mu$m, and is set so as to perform a function to collimating a beam of 1.55 $\mu$m as described above. For this reason, with the CGH element serving as the optical path splitting means, the focal length and the deflection angle for a beam of 1.3 $\mu$m shift slightly as has been described.

A beam with a wavelength 1.3 $\mu$m incident on the CGH element as the optical path splitting means is regarded as equivalent divergent spherical waves separate for a distance $D_1$ from a point, and its angle of incidence $\theta_1$ differs from an angle of incidence $\theta_0$ for a beam with a wavelength 1.55 $\mu$m.

From the relation of the above-mentioned equation (20), a relational expression of the incidence angles $\theta_0$ and $\theta_1$ can be derived as follows.

$$\theta_1 = \sin^{-1}\{(1/n_2(\lambda_{=1.3\,\mu m}))\cdot(1.3/1.55)\cdot(n_2(\lambda_{=1.55\,\mu m})\sin\theta_0)\} \quad (29)$$

where $\theta_0$ is expressed as $$\theta_0 = \tan^{-1}\{(s_1+s_2)/(2T_1)\} \quad (30)$$

To converge a 1st order diffracted light to the semiconductor laser 19 arranged with a shift of the above-mentioned distance $x_2$ from the z-axis, the output deflection angle $\theta_2$ is required to satisfy the following equation.

$$\theta_2 = \tan^{-1}\{(x_1+x_2)/T_3\} \quad (31)$$

If an optical path difference function $\rho(x, y)$ is obtained for the CGH element 24 from the equation (28) with the above-mentioned conditions taken into account, the optical path difference function can be obtained as follows.

$$\rho(x,y) = n_2(x_1-s_1)x/\{(x_1-s_1)^2+T_2^2\}^{1/2} + n_3(x_1+x_2)x/\{(x_1+x_2)^2+T_3^2\}^{1/2} \quad (32)$$

The respective optical path difference coefficients by Taylor expansion for the optical path difference function $\rho(x, y)$ shown in equation (32), that is to say, the phase coefficients $C_0$ to $C_{65}$ can be obtained by substituting equation (32) in equations (4-0) to (4-65) in FIGS. 3 to 9. In FIG. 26, the operational results are shown as the phase coefficients, that is to say, the optical path difference coefficients $C_0$ to $C_2$. Since equation (32) is a linear function of x and y, the coefficients from $C_3$ on are zero. Therefore, by inputting equations (33-0) to (33-2) shown in FIG. 26 into the optical path difference coefficient $C_N$ in equation (1) of the CAD program and executing this program, data on mask patterns can be obtained which is required to form the first CGH element 24.

By the setting of the CGH element 24, the deflection angle $\theta_3$ of the minus 1st order diffracted light shown in FIG. 25 is determined uniquely, and a shift $x_3$ of the center position of the minus 1st order diffracted light from the z-axis can be obtained easily by executing the optical CAD program.

Subsequently, the optical characteristics of the third CGH element 25 will be considered with reference to FIG. 27. The third CGH element 25 has a function to converge the minus 1st order diffracted light guided by the CGH element 24 as the optical path splitting means to the photodetector 20.

The minus 1st order diffracted light incident on the third CGH element 25 has passed through the first CGH element 21 set to collimate a beam of 1.55 $\mu$m wavelength as described above. Therefore, like in the CGH element 24 as the optical path splitting means, it is necessary to correct the focal length and the deflection angle of a beam of 1.3 $\mu$m wavelength.

Figure 27:
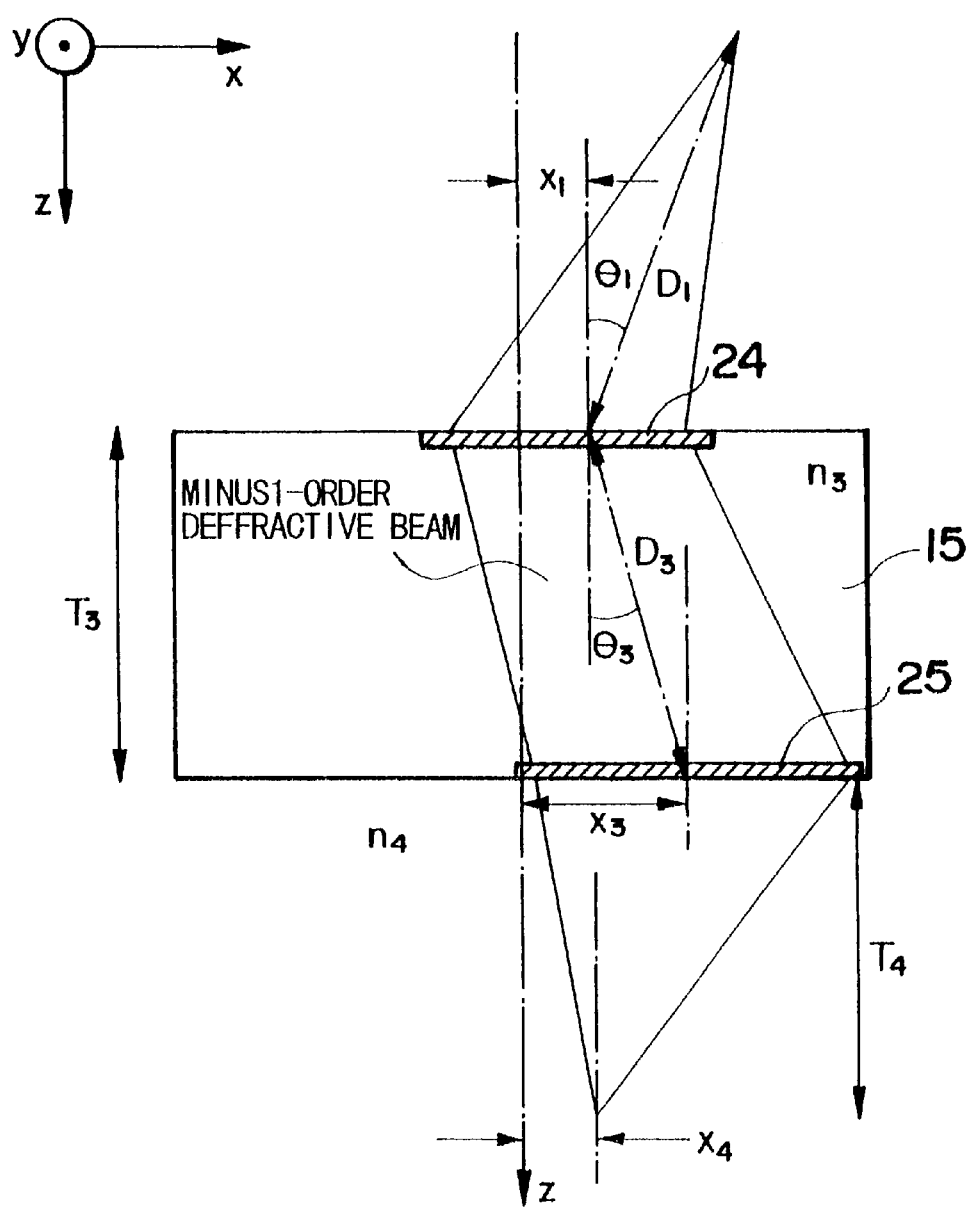
FIG. 27 is an explanatory diagram of the minus 1st order diffracted light of the third CGH element.

To this end, as shown in FIG. 27, a beam of a wavelength 1.3 $\mu$m incident on the CGH element 24 as the optical path splitting means is considered as equivalent divergent spherical waves from a point for a distance of $D_1$ away, and the relation between the incidence angle $\theta_1$ of this beam and the incidence angle $\theta_1$ of a beam of a wavelength 1.55 $\mu$m is the same as shown in equations (29) and (30) mentioned above.

To obtain a distance $D_1$ up to a virtual image as viewed from the CGH element as the optical path splitting means, from equation (27), the following equation can be given.

$$(n_1/T_1)-(n_2/D_1)=(n_1/T_1)\cdot(1.3/1.55) \quad (34)$$

By rearranging the equation (34), the distance $D_1$ can be expressed as follows.

$$D_1(n_2/T_1)/\{n_1(1-1.3/1.55)\} \quad (35)$$

Between the distance $D_3$ in which the minus 1st order diffracted light travels to the third CGH element 25 and the incidence angle $\theta_3$ to the third CGH element 25, relations hold as expressed by the following equations.

$$D_3=\{(x_3-x_1)^2+T_3^2\}^{1/2} \quad (36)$$

$$\theta_3=\tan^{-1}\{T_3/(x_1+x_2)\} \quad (37)$$

From the foregoing, the third CGH element 25 is considered as a CGH element to connect the object point $(X_{41}, Y_{41}, Z_{41})$ and the image point $(X_{42}, Y_{42}, Z_{42})$.

Figure 28:
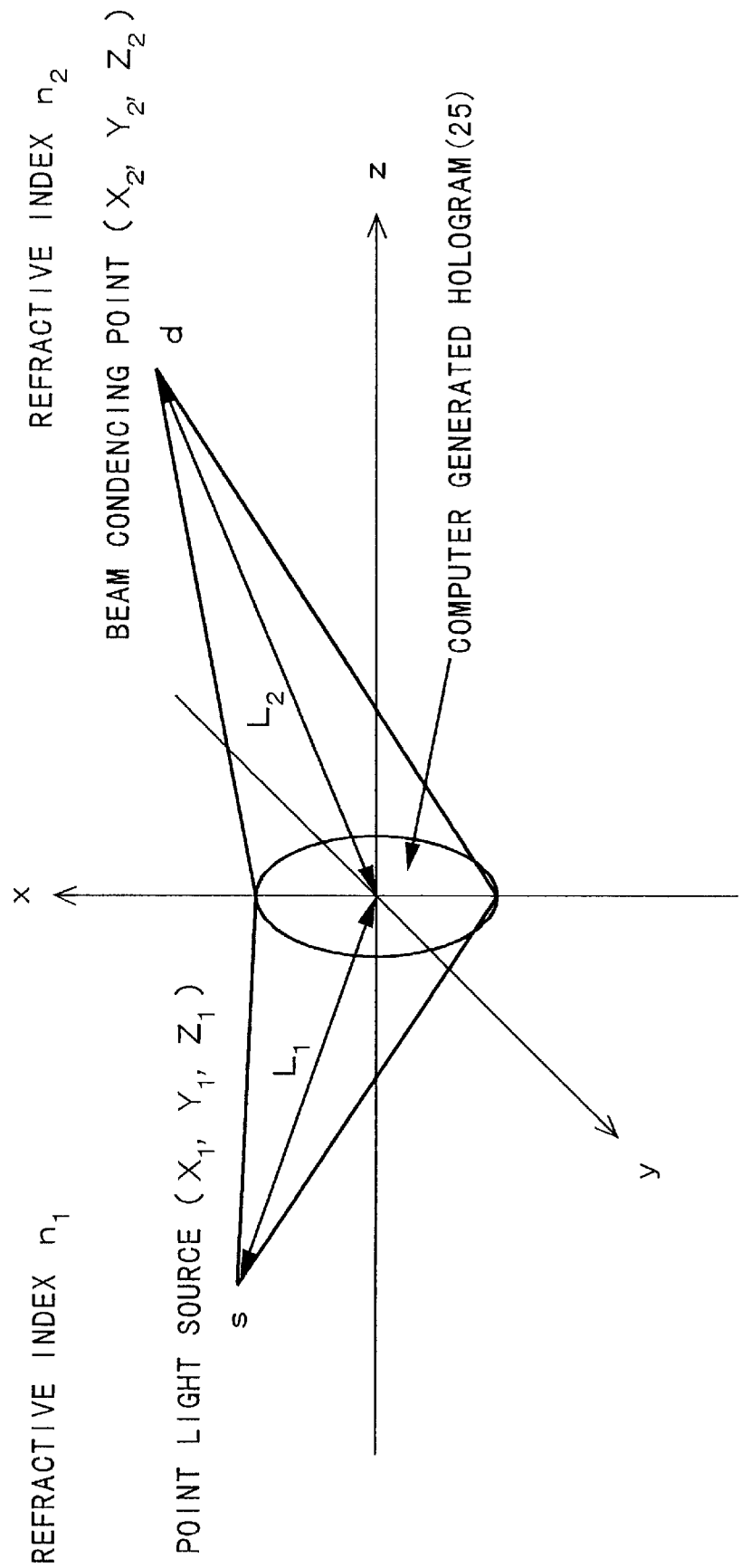
FIG. 28 is an explanatory diagram of image formation between the point light source and the beam-condensing point of the CGH element.

FIG. 28 shows a diffractive optical element which has a point light source $(X_1, Y_1, Z_1)$ and a light converging point $(X_2, Y_2, Z_2)$. The optical path difference function $\rho(x, y)$ of the diffractive optical element having this converging lens action can be given by the following equation.

$$\rho(x,y)=n_1\cdot[(X_1-x)^2+(Y_1-y)^2+Z_1^2]^{1/2}-n_1L_1, n_2\cdot[(X_2-x)^2+(Y_2-y)^2+Z_2^2]^{1/2}-n_2L_2 \quad (38)$$

where the distance $L_1$ from the origin to the point light source and the distance $L_2$ from the origin to the image point are expressed as $$L_1=(X_1^2+Y_1^2+Z_1^2)^{1/2} \quad (39)$$

$$L_2=(X_2^2+Y_2^2+Z_2^2)^{1/2} \quad (40)$$

From equations (38) to (40), as the optical path difference function $\rho(x, y)$ of the fourth CGH element to connect the object point $(X_{41}, Y_{41}, Z_{41})$ and the image point $(X_{42}, Y_{42}, Z_{42})$, the following equation can be given.

$$\rho(x,y)=n\cdot[(X_{41}-x)^2+(Y_{41}-y)^2+Z_{41}^2]^{1/2}-nL_{41}, n_4\cdot[(X_{42}-x)^2+(Y_{42}-y)^2+Z_{42}^2]^{1/2}-n_4L_{42} \quad (41)$$

As practical assumptions, an identical refractive index n is adopted for the refractive index $n_2$ and the refractive index $n_3$, and it is assumed that the photodetector 20 exists in a space which shows a refractive index $n_4$.

In equation (41), $$X_{41}=-(D_1+D_3)\sin\theta_3 \quad (42)$$

$$Y_{41}=0 \quad (43)$$

$$Z_{41}=-(D_1+D_3)\cos\theta_3 \quad (44)$$

and $$X_{42}=X_4-X_3 \quad (45)$$

$$Y_{42}=0 \quad (46)$$

$$Z_{42}=T_4 \quad (47)$$

The distance $L_{41}$ from the origin to the object point and the distance $L_{42}$ from the origin to the image point are expressed as $$L_{41}=(X_{41}^2+Y_{41}^2+Z_{41}^2)^{1/2}=(D_1+D_3) \quad (48)$$

$$L_{42}=(X_{42}^2+Y_{42}^2+Z_{42}^2)^{1/2}=\{(x_4-x_3)^2+T_4^2\}^{1/2} \quad (49)$$

In consideration of the number of degrees of freedom in positioning the photodetector 20, the center position of the third CGH element 25 and the position of the photodetector are treated here as independent parameters.

The respective optical path difference coefficients by Taylor expansion for the optical path difference function $\rho(x, y)$ shown in equation (41), that is to say, the phase coefficients $C_0$ to $C_{65}$ can be obtained by substituting equation (41) in equations (4-0) to (4-65) in FIGS. 3 to 9.

In FIGS. 29 to 34, the operational results are shown as the phase coefficients, that is to say, the optical path difference coefficients $C_0$ to $C_{65}$. Therefore, by inputting equations (50-0) to (50-65) shown in FIGS. 29 to 34 into the optical path difference coefficient $C_N$ in equation (1) of the CAD program and executing this program, data on mask patterns can be obtained which is required to form the third CGH element 25.

Figure 35:
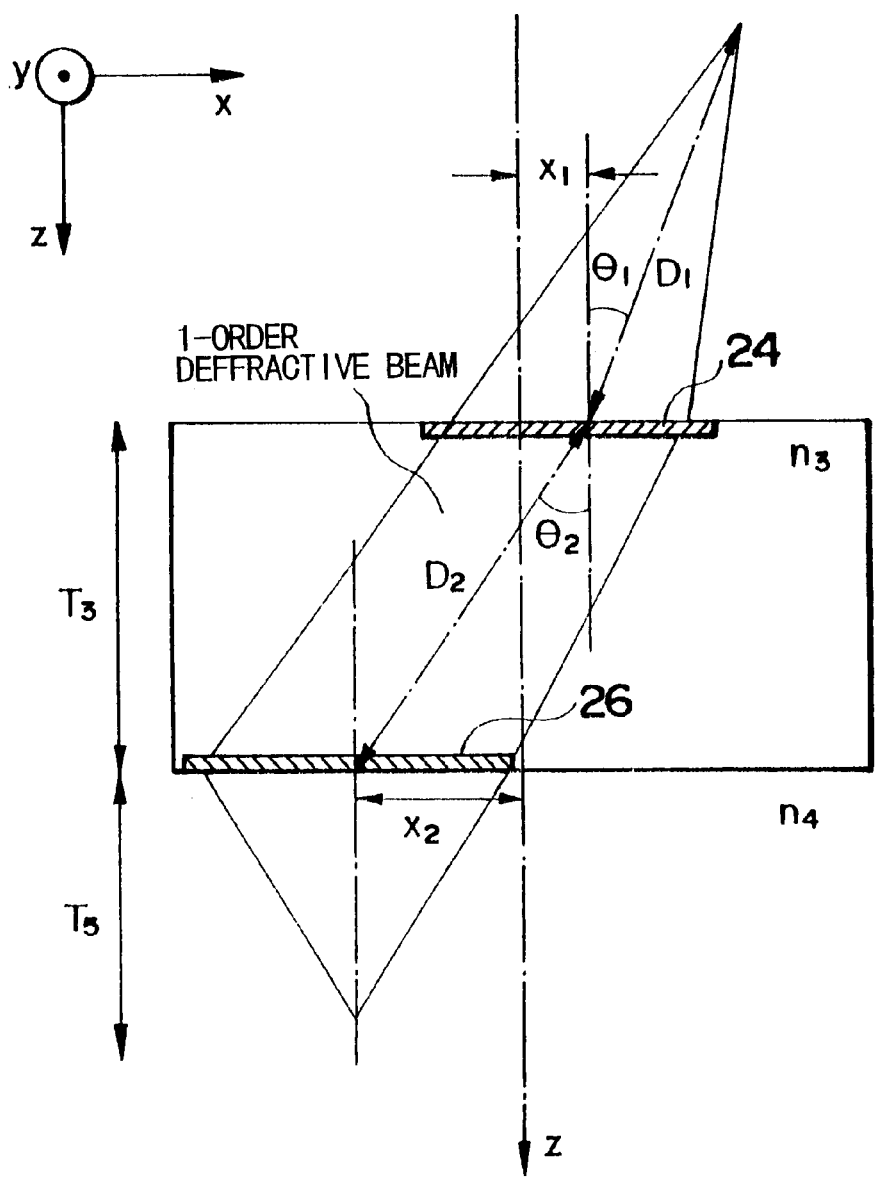
FIG. 35 is an explanatory diagram of the 1st order diffracted light of the fourth CGH element.

The fourth CGH element 26 as the final CGH element will be described with reference to FIG. 35. The fourth CGH element 26 has a function to converge the 1st order diffracted light guided by the CGH element 24 as the optical path splitting means to the semiconductor laser 19. In actuality, the fourth CGH element 26 in its bilateral operation collimates divergent spherical waves of wavelength 1.3 μm from the semiconductor laser 19 and sends the light toward the first input terminal 11.

The 1st order diffracted light incident on the fourth CGH element 26 has passed through the first CGH element 21 set to collimate a beam of 1.55 μm wavelength as described above. Therefore, like in the third CGH is element 25, it is necessary to correct the focal length and the deflection angle of a beam of 1.3 μm wavelength.

To this end, as shown in FIG. 28, a beam of a wavelength 1.3 μm incident on the third CGH element 25 is considered as equivalent divergent spherical waves from a point for a distance of $D_1$ away, and the relation between the incidence angle $\theta_1$ of this beam and the incidence angle $\theta_0$ of a beam of a wavelength 1.55 μm is the same as shown in equations (29) and (31) mentioned above.

Regarding a distance $D_1$ up to a virtual image as viewed from the CGH element 24 as the optical path splitting means, from equation (27), the relations as in the same equations (34) and (35).

On the other hand, between the distance $D_2$ for the 1st order diffracted light to reach the fourth CGH element 26 and the incidence angle $\theta_2$ to the fourth CGH element 26, relations hold as expressed by the following equations.

$$D_2=\{(x_2-x_1)^2+T_3^2\}^{1/2} \quad (51)$$

$$\theta_2=\tan^{-1}\{T_3/(x_2-x_1)\} \quad (52)$$

From the foregoing, the fourth CGH element 26 is considered as a CGH element to connect the object point ($X_{51}$, $Y_{51}$, $Z_{51}$) and the image point ($X_{52}$, $Y_{52}$, $Z_{52}$). Therefore, like in the third CGH element 25, from the above-mentioned equations (38) to (40), as an optical path difference function $\rho(x, y)$ of the fourth CGH element 26 to connect the object point ($X_{51}$, $Y_{51}$, $Z_{51}$) and the image point ($X_{52}$, $Y_{52}$, $Z_{52}$), the following equation is obtained.

$$\rho(x,y)=n\cdot[(X_{51}-x)^2+(Y_{51}-y)^2+Z_{51}^2]^{1/2}-n_1L_{51}+n_4\cdot[(X_{52}-x)^2+(Y_{52}-y)^2+Z_{52}^2]^{1/2}-n_4L_{52} \quad (53)$$

Like in the third CGH element 25, as practical assumptions, an identical refractive index n is adopted for the refractive index $n_2$ and the refractive index $n_3$, and it is assumed that the semiconductor laser 19 exists in a space which shows a refractive index $n_4$.

In equation (53), $$X_{51}=(D_1+D_2)\sin\theta_2 \quad (54)$$

$$Y_{51}=0 \quad (55)$$

$$Z_{51}=-(D_1+D_2)\cos\theta_2 \quad (56)$$

and $$X_{52}=0 \quad (57)$$

$$Y_{52}=0 \quad (58)$$

$$Z_{52}=T_5 \quad (59)$$

The distance $L_{51}$ from the origin to the object point and the distance $L_{52}$ from the origin to the image point are expressed as $$L_{51}=(X_{51}^2+Y_{51}^2+Z_{51}^2)^{1/2}=(D_1+D_2) \quad (60)$$

$$L_{52}=(X_{52}^2+Y_{52}^2+Z_{52}^2)^{1/2}=T_5 \quad (61)$$

So as to be consistent with the requirements in the production phase, there is a precondition that the position of the semiconductor laser 19 coincides with the center position of the fourth CGH element 26.

With regard to the fourth CGH element 26, the respective optical path difference coefficients by Taylor expansion for the optical path difference function $\rho(x, y)$ shown in equation (53), that is to say, the phase coefficients $C_0$ to $C_{65}$ can be obtained by substituting equation (53) in equations (4-0) to (4-65) in FIGS. 3 to 9.

In FIGS. 36 to 41, the operational results are shown as the phase coefficients, that is to say, the optical path difference coefficients $C_0$ to $C_{65}$. Therefore, by inputting equations (62-0) to (62-65) shown in FIGS. 36 to 41 into the optical path difference coefficient $C_N$ in equation (1) of the CAD program and executing this program, data on mask patterns can be obtained which is required to form the fourth CGH element 26.

Therefore, a multilayer structure 16 according to the optical device according to the present invention comprises the steps of:

manufacturing masks on the basis of data of the above-mentioned mask patterns for the CGH elements 21 to 26;

forming CGH elements 21 to 26 and a wavelength splitting filter 23 on glass plates 14 and 15 by photolithography and etching techniques using those masks; and bonding the glass plates 14 and 15, on which the optical elements 21, 22, 23, 24 and 25 have been formed, and a glass plate 13 together.

Figure 42:
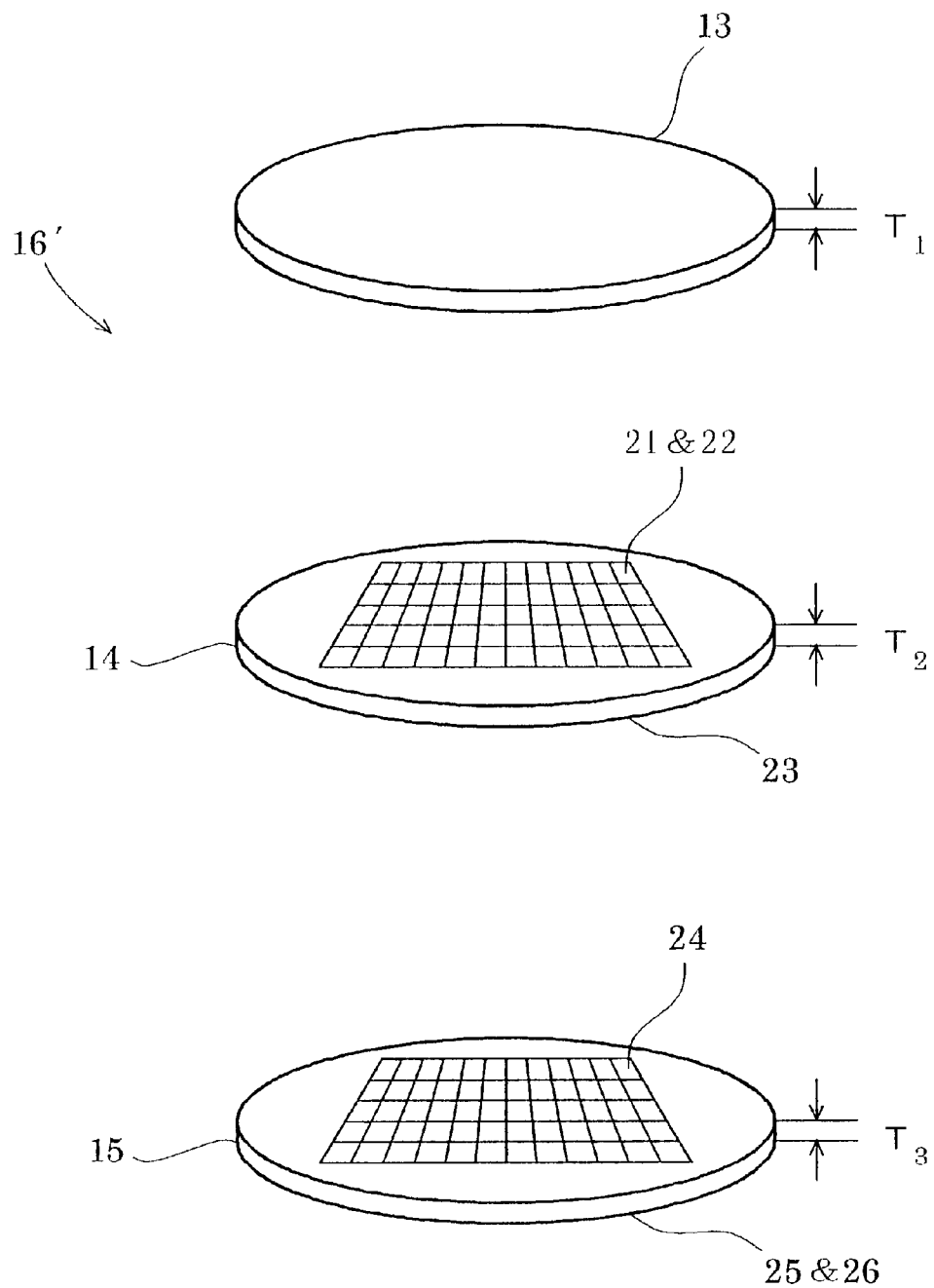
FIG. 42 is an exploded view in perspective showing the manufacturing method of an optical device 10 according to the present invention.

The size of the optical device 10 according to the present invention, formed by this multilayer structure 16, is no more than several hundreds of microns, so that the optical device 10 can be formed in a very small size. Therefore, as shown in FIG. 42, first CGH elements 21 and second CGH elements 22 are formed in high density, in pairs in a great number of sections on one surface of a large glass plate 14, each pair being provided in one section. A large number of wavelength splitting filters 23 as deflection means are formed in high density on the other surface of the glass plate 14 in such a way that the filters are located on one-to-one correspondence with the sections mentioned above.

On one surface of a large glass plate 15, a large number of CGH elements 22 as optical path splitting means in high integration on one-to-one correspondence with the sections mentioned above. On the other surface of the large glass plate, third CGH elements 25 and fourth CGH elements 26 are formed in high integration, in pairs on one-to-one correspondence with the sections.

Large-size glass plates 14 and 15 having the optical elements 21, 22, 23, 24, 25 and 26 formed thereon, and a large-size glass plate are bonded together in layers to form a multilayer structure 16' in which a large number of optical devices 10 are formed in high integration.

Subsequently, by splitting the integrated body 16' in the through-thickness direction of the glass plates 13, 14 and 15, a great number of optical devices 10 can be produced together with high efficiency.

The deflection means comprising a wavelength splitting filter 23 can be formed by a CGH element exhibiting a wavelength dependency which will be described later.

However, the wavelength splitting filter formed by a CGH element is unfavorable for size reduction of the optical device 10 compared with the wavelength splitting filter 23 formed by dielectric films. Therefore, as has been described with reference to FIG. 1, it is desirable to form the deflection means by a wavelength filter 23 formed by a dielectric film filter.

Instead of the glass plates 13 to 15, various types of glass materials, such as a silicon or plastic material that suffers less optical loss may be used.

<Embodiment 2>

Figure 43:
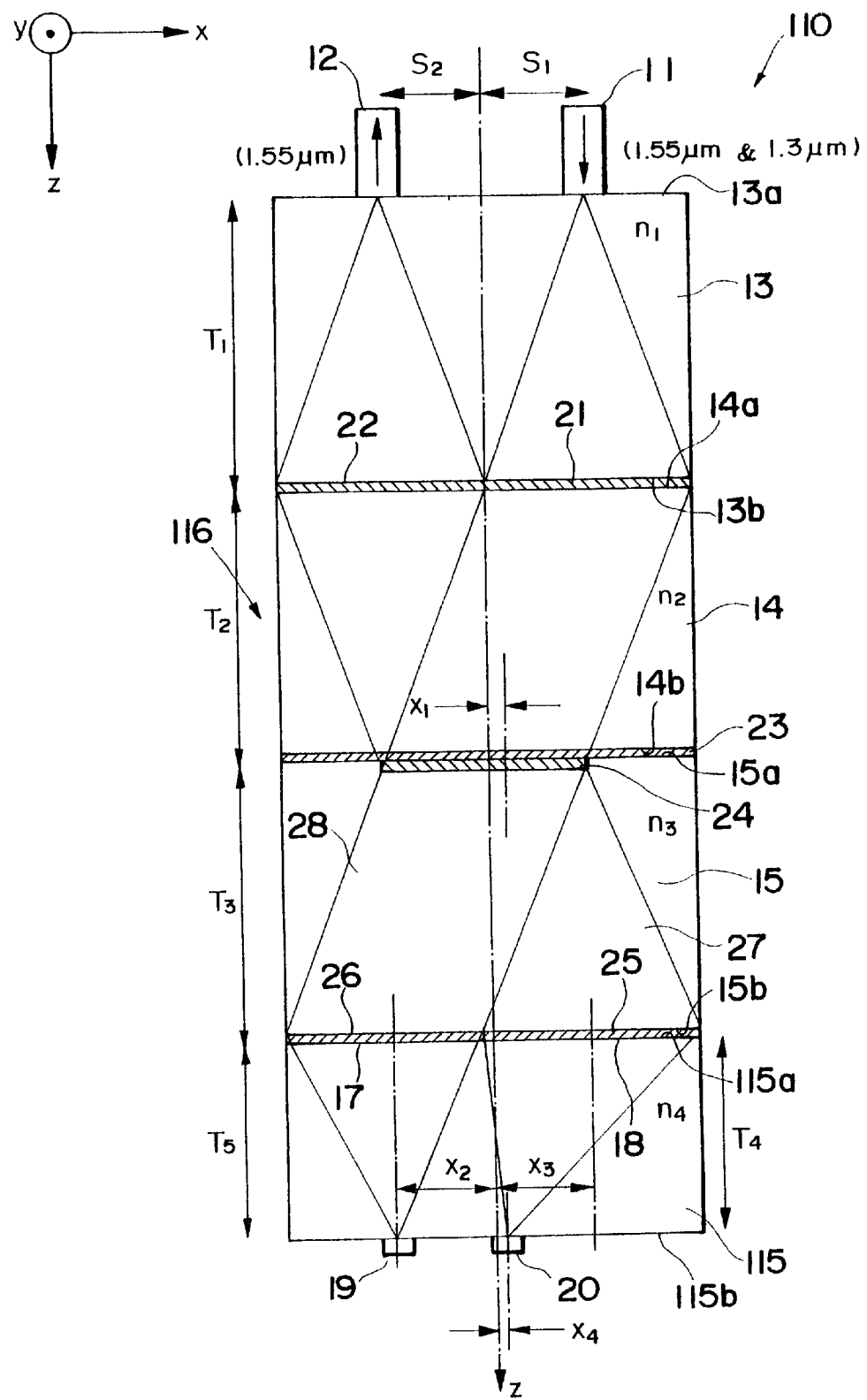
FIG. 43 is a longitudinal section schematically showing another optical device 110 according to the present invention.

FIG. 43 shows an optical device according to another embodiment of the present invention. In the optical device 110 shown in FIG. 43, the same functional parts as those in the first embodiment are designated by the same reference numerals.

One surface 115a of a fifth glass plate 115 having a refractive index n4 and a uniform thickness is bonded to the other surface 15b of the third glass plate 15 of the multilayer structure 16 of the first embodiment, so that a multilayer structure 116 comprises the first to fifth glass plates 13, 14, 15 and 116.

The semiconductor laser 19 and the photodetector 20 are provided on the other surface of the fourth glass plate 115. The distance T4 between the photodetector 20 and the second output terminal 18 is equal to the distance T5 between the semiconductor laser 19 nd the second input terminal 17.

In the optical device 110, the third CGH element 25 and the photodetector 20 facing each other and the fourth CGH element 26 and the semiconductor laser 19 facing each other can be formed at the same time by photolithography by forming the third CGH element 25 and the fourth CGH element 26 on one surface 115a of the fourth glass plate 115 and by forming the photodetector 20 and the semiconductor laser 19 on the other surface 115b thereof.

Consequently, a better accuracy can be expected in the alignment of the corresponding pairs of optical elements 25 and 20, and 26 and 19.

Figure 44:
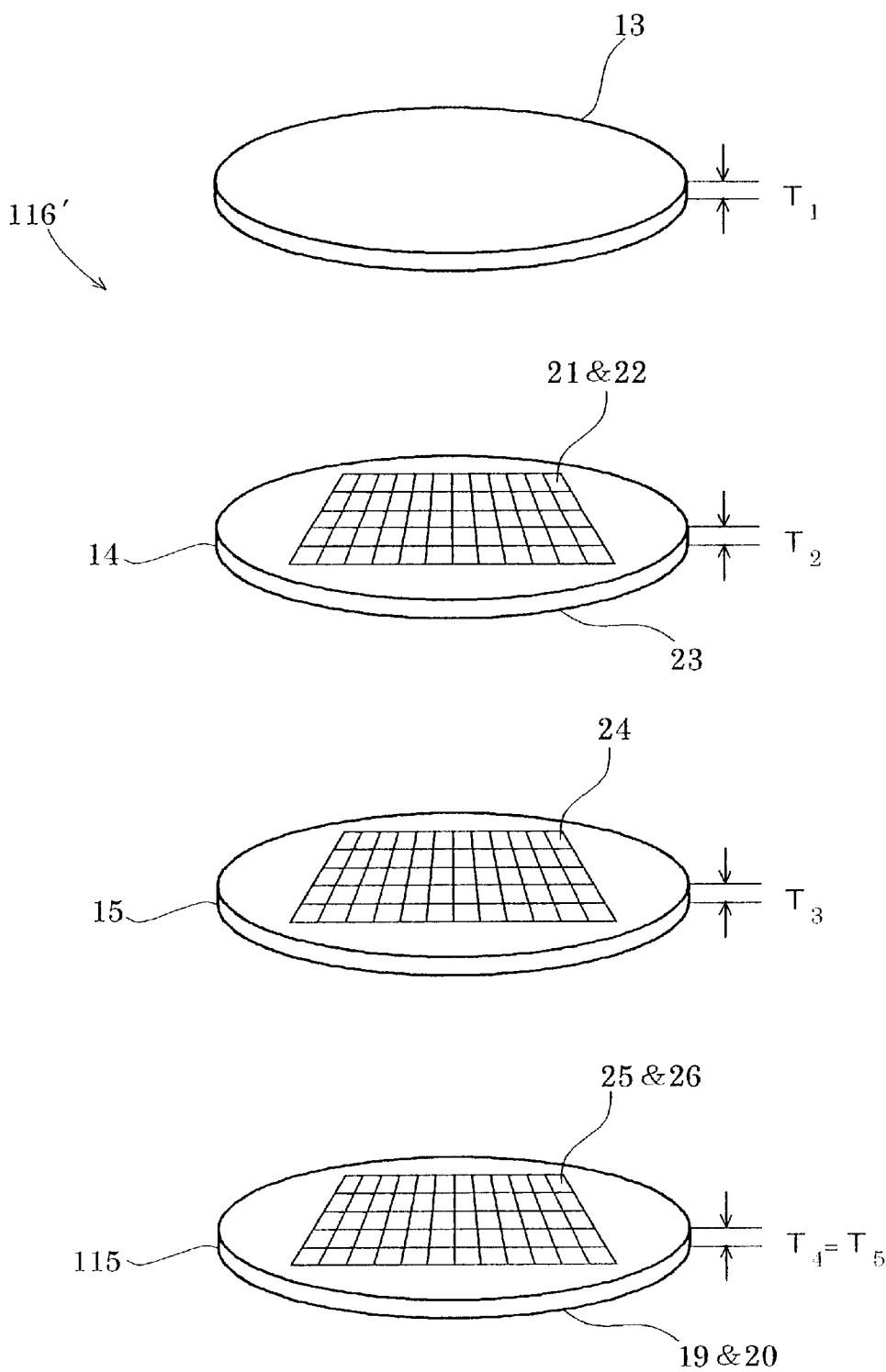
FIG. 44 is an exploded view in perspective in the manufacturing process showing the manufacturing method of the one other optical device according to the present invention.

In the manufacture of the optical device 110, as shown in FIG. 44, a multilayer structure 116' having a large number of optical devices 110 formed in high density can be formed by forming optical element 21, 22, 23, 24, 25, 26, 19 and 20 on the glass plates 13, 14, 15, which are the same as in the first embodiment, and on another glass plate 115, and bonding together those glass plates on which the optical elements have been formed.

Finally, the multilayer structure 116' can be split lengthwise as in the first embodiment to obtain individual optical devices 110.

In the subsequent embodiment, too, the same functional parts as in the first and the second embodiments are designated by the same reference numbers.

<Embodiment 3>

Figure 45:
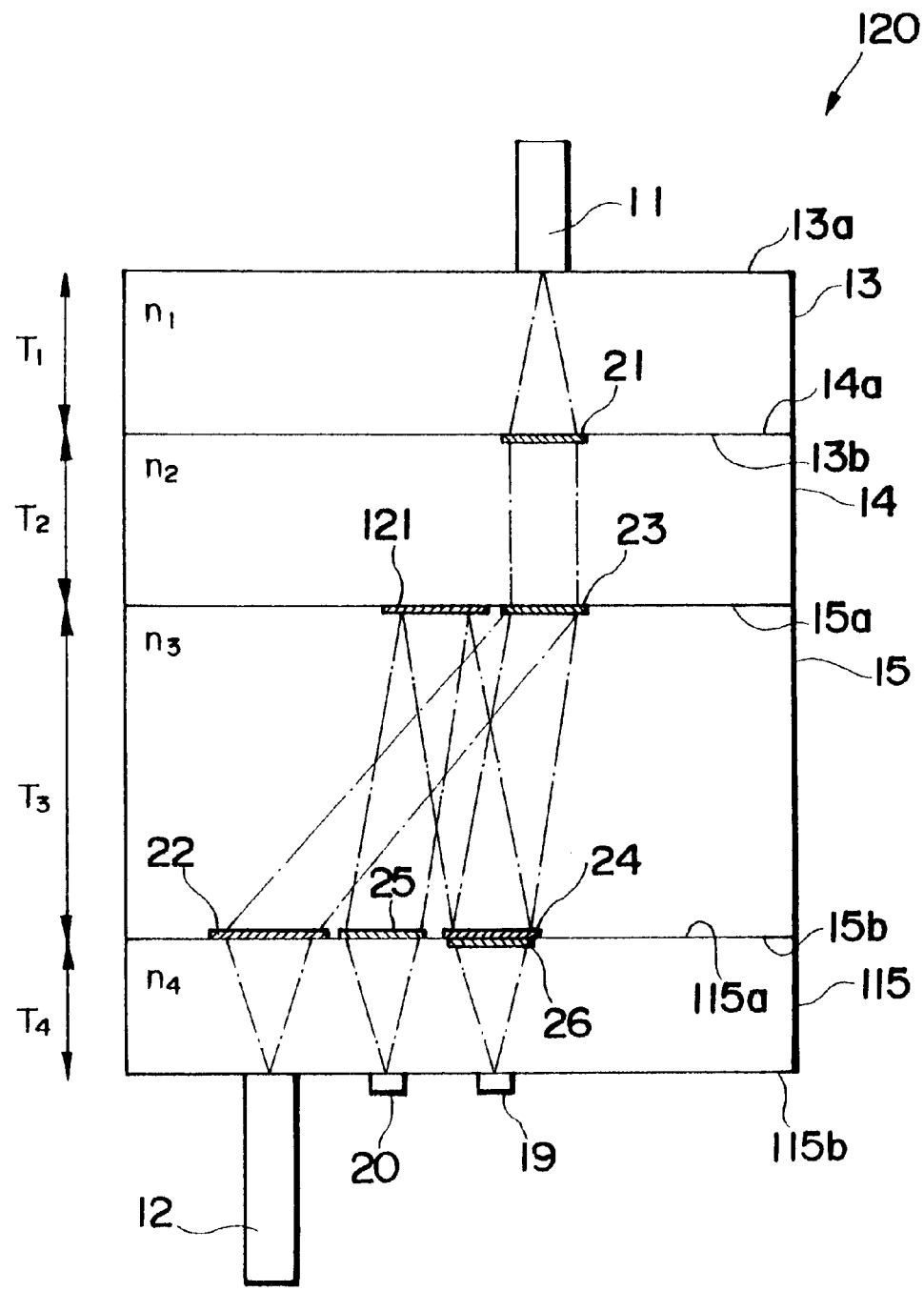
FIG. 45 is a longitudinal section schematically showing a further optical device 120 according to the present invention.

FIG. 45 shows a further optical device 120 according to a third embodiment of the present invention. In the optical device 120, only the first input terminal 11 is provided on one surface 13a of the first glass plate 13. Only the first CGH element 21 is provided on one surface 14a of the second glass place 14 to which the other surface 13b of the first glass plate 13 is to be bonded.

The deflection means 23 and a mirror 121 are provided on one surface 15a of the third glass plate 15 to which the other surface 14b of the second glass plate 14 is to be bonded. The mirror 121 can be formed by vapor-deposition of a metal film, such as aluminum or gold to the third glass plate 15.

The optical path splitting means 24, the second CGH element 22, and the third CGH element 25 are provided on the other surface 15b of the third glass plate 15.

A fourth CGH element 26 is provided on one surface 115a of the third glass plate 115, and the first output terminal 12, the semiconductor laser 19, and the photodetector 20 are provided on the other surface 115b thereof In the optical device 120 in the embodiment 3 in FIG. 45, the deflection means 23 is a transmission type computer generated hologram, in other words, a transmission type CGH element 23, which has a prism function.

A multiplexed light entering from the first input terminal 11 is converted into a parallel light beam by the first CGH element 21, and the parallel light beam guided to the CGH element 23 having the prism function.

The CGH element 23 which receives the parallel light beam, according to the wavelength dependency of the CGH element, separates the multiplexed light into a parallel light beam of the first wavelength component 1.55 $\mu$m to travel to the second CGH element 22 and a parallel light beam of the second wavelength component 1.3 $\mu$m to travel to the optical path splitting means 24.

The parallel light beam of 1.55 $\mu$m wavelength separated by the deflection means formed by a transmission type CGH element is converged by the second CGH element 22 to the first output terminal 12.

On the other hand, the parallel light beam of 1.3 $\mu$m wavelength separated by the CGH element 23 is guided to the optical path splitting means 24.

The optical path splitting means 24 is formed by a wavelength splitting filter comprising a multilayer dielectric film like in the first embodiment. The wavelength splitting filter 24 reflects part of the second wavelength component to the mirror 121m and conducts the remainder to the fourth CGH element 26.

The second wavelength component directed to the mirror 121 is guided to the third CGH element 25, and converged to the photodetector 20.

The light from the semiconductor laser 19 is reflected by the mirror 121 as a transmitted light which passes through the fourth CGH element 26, the optical path splitting means 24, and the CGH element 23 as the deflection means, and is guided to the first input terminal 11.

The deflection means formed by a CGH element can substantially eliminates light loss at the deflection means in contrast to the wavelength splitting filter, such as a half-mirror made of multiple dielectric films.

<Embodiment 4>

Figure 46:
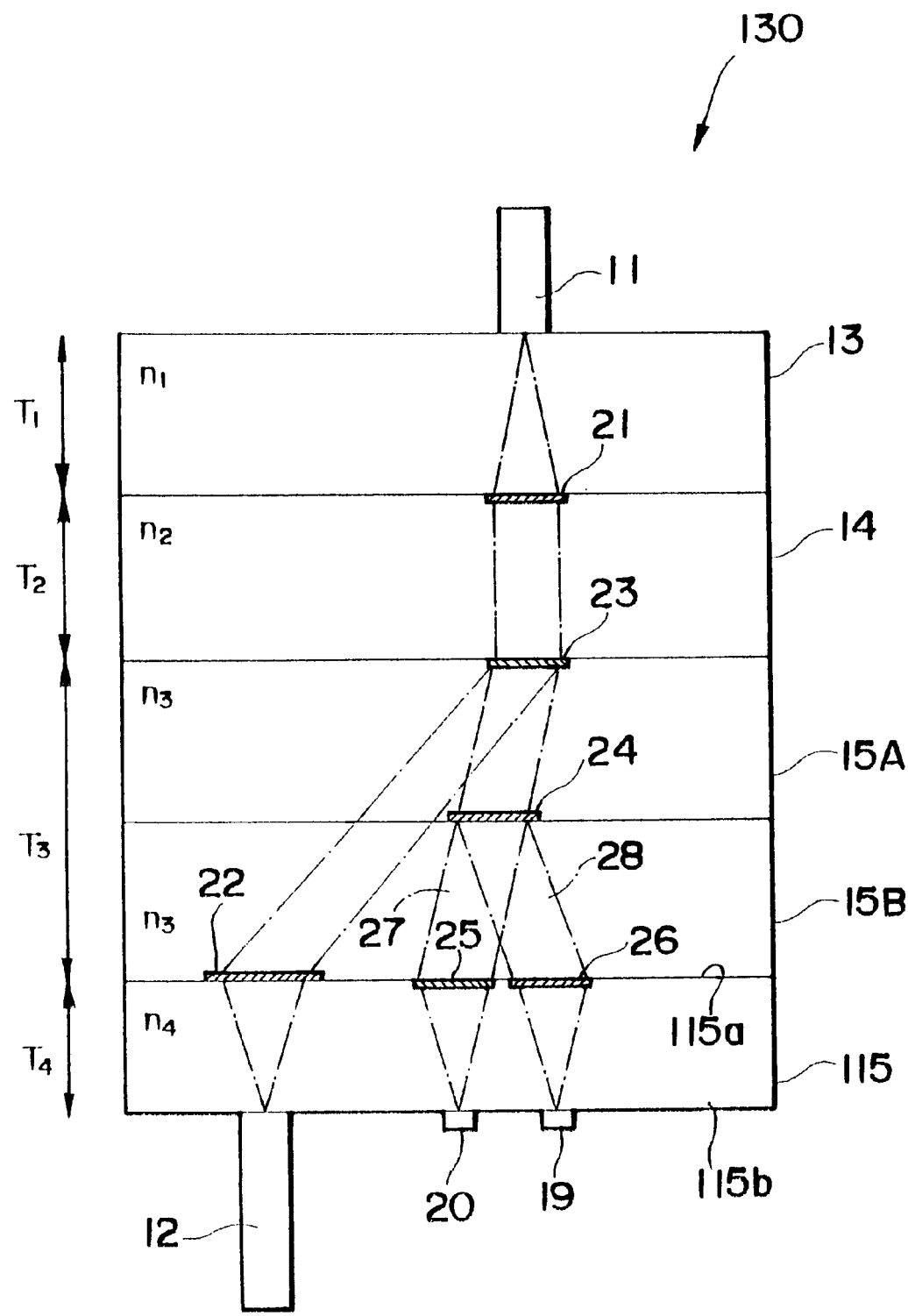
FIG. 46 is a longitudinal section schematically showing yet another optical device according to the present invention.

In an optical device 130 in an embodiment 4 shown in FIG. 46, the third glass plate 15 is formed of two subdivisions 15a and 15b bonded together, and the optical path splitting means 24 is formed between the subdivisions 15a and 15b.

The optical path splitting means 24 is formed by a transmission type CGH element 24. The optical path splitting means 24 using this CGH element guides a parallel light beam of 1.3 μm from the deflection means 23 to the third CGH element 25 and the fourth CGH element 26.

The CGH element can be formed by etching of a glass material through mask patterns by executing a CAD program as mentioned above. An interesting relation between the etching depth and the diffraction efficiency of the CGH element used as a diffractive optical element has been reported in "Binary Optics Technology: Theoretical Limit on Diffraction Efficiency of Multi-level Diffractive Optical Element", Technical Report No. 914 published in 1991 by Massachusetts Institute of Technology, Lincoln Laboratory.

According to this Technical Report, it is possible to obtain the relation between the etching depth and the diffraction efficiency at each phase level, which corresponds to a certain number of etching masks used to form a CGH element.

Figure 47:
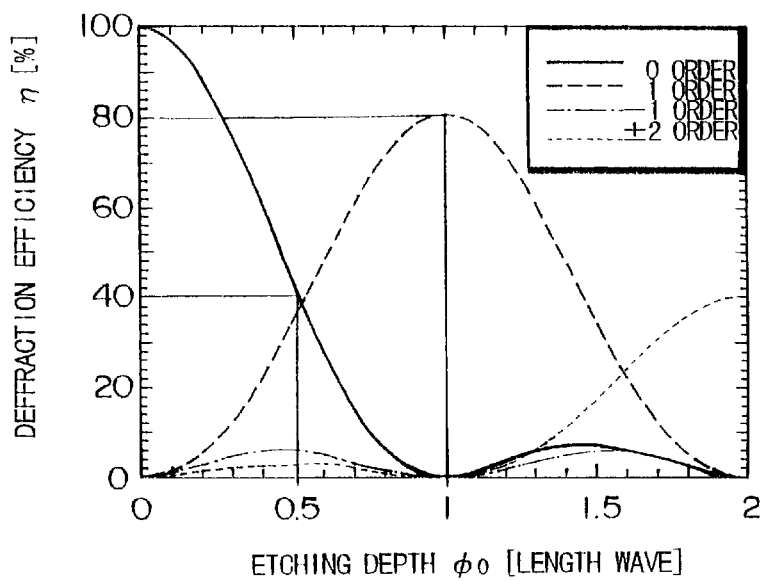
FIG. 47 is a graph showing the relation between the diffraction efficient and the etching depth of the CGH element.

FIG. 47 is a graph showing the relation between the diffraction efficiency η and the etching depth φ (in wavelength units) with two etching masks, that is, at four phase levels, in which the vertical axis indicates the diffraction efficiency and the horizontal axis indicates the etching depth.

The patterns of the respective characteristic curves in this graph vary with the number of phase levels.

According to the characteristics curves in FIG. 47, it is known that by setting the etching depth at 1.3 μm, which corresponds to a 1.3 μm wavelength, for example, only a 1st order diffracted light with an intensity of substantially 80% of the incident light can be obtained. By setting the etching depth at one-half of the wavelength, the incident light can be separated into about 40% of a 0-order light and about 40% of a 1st order light.

The correspondence relationship between the diffraction efficiency with the same wavelength, in other words, the divided intensity proportion of high-order light and the etching depth varies with the number of phase levels and the etching depth.

Therefore, by selecting an appropriate etching depth according to the number of phase levels of the CGH element used, a beam of the same wavelength can be divided at an appropriate intensity ratio.

Therefore, as has been described with reference to the first embodiment, a beam of the same wavelength can be divided at an appropriate intensity ratio by selecting an etching depth of the CGH element in addition to by selecting a phase level of the CGH element.

The optical path splitting means formed by a CGH element can select the direction of diffraction from a relatively wide range by using a high-order diffracted light in contrast to the case where a half-mirror wavelength splitting filter is used as the optical path splitting means. By using a larger diffraction angle, it is possible reduce the thickness T3 of the third glass plate 15.

<Embodiment 5>

Figure 48:
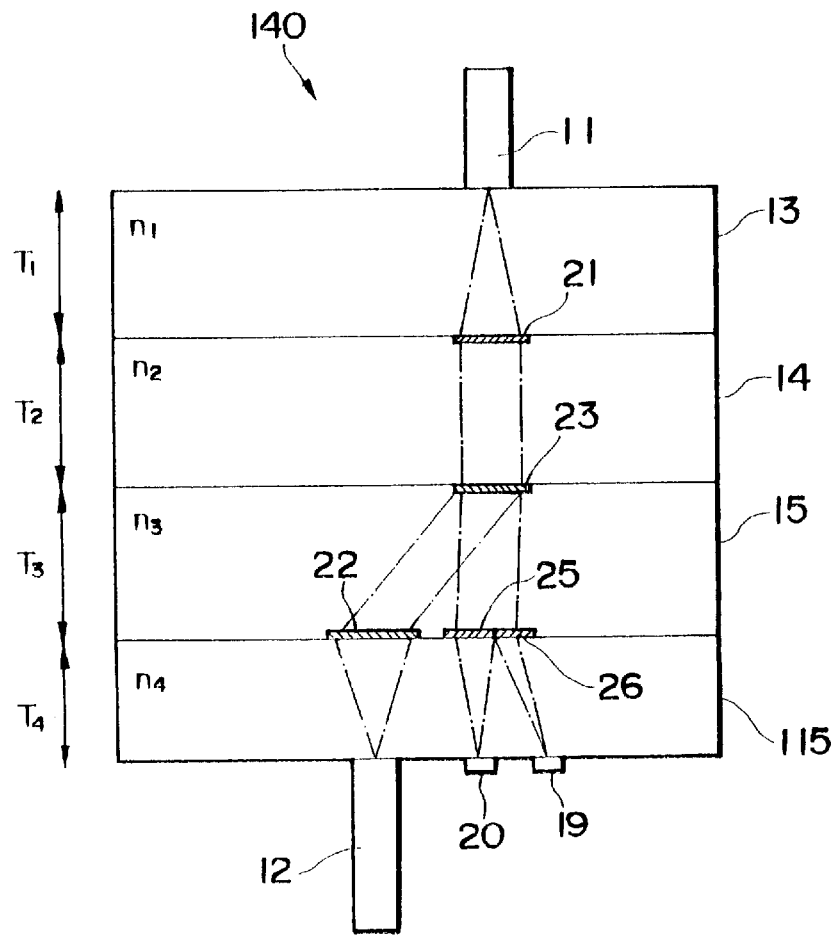
FIG. 48 is a longitudinal section schematically showing a still further optical device 140 according to the present invention.

In an optical device 140 in a fifth embodiment of the present invention shown in FIG. 48, the third CGH element 25 and the fourth CGH element 26 are arranged in parallel along the optical path of a single parallel light beam of 1.3 μm separated by the deflection means 23 formed by a transmission type CGH element with a prism function.

The elements 25 and 26 with different deflection directions are arranged in parallel with a single parallel light beam not divided by the optical path splitting means, so that the third CGH element 25 is associated with the photodetector 20 and the fourth CGH element 26 is associated with the semiconductor laser 19.

Therefore, the third CGH element 25 and the fourth CGH element 26 substantially perform an optical path disjoining function. This obviates the need to install separate optical path splitting means 24, so that the optical device can be reduced in size.

<Embodiment 6>

Figure 49:
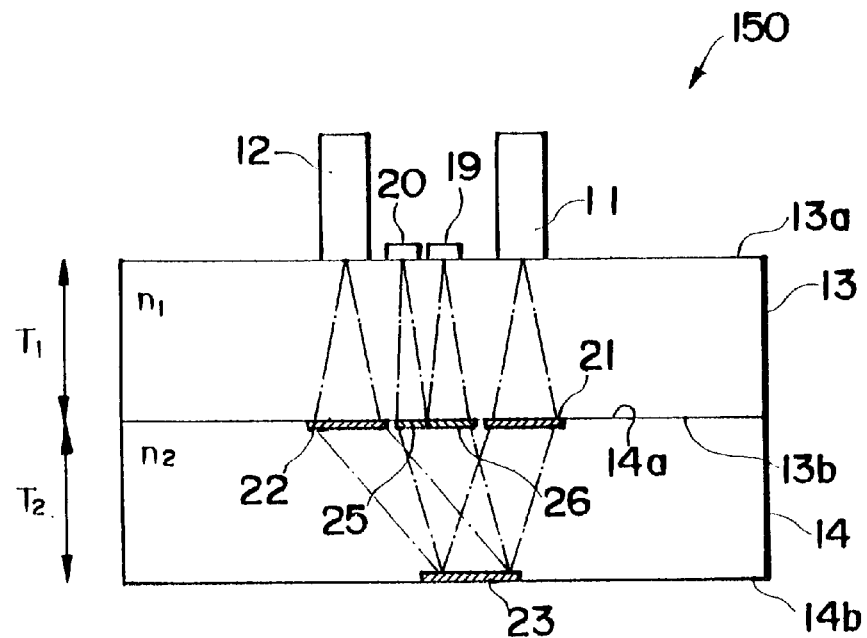
FIG. 49 is a longitudinal section schematically showing an additional optical device 150 according to the present invention.

In an optical device 150 according to a sixth embodiment shown in FIG. 49, the first input terminal 11 and the first output terminal 12 along with the semiconductor laser 19 and the photodetector 20 are provided on one surface 13a of the first glass plate 13.

The first CGH element 21, the second CGH element 22, the third CGH element 25 and the fourth CGH element 26 are provided on one surface of the second glass plate 14 to which the other surface 13b of the first glass plate 13 is bonded. The deflection means formed by a reflection type CGH element is provided on the other surface 14b of the second glass plate 14.

This reflection type CGH element 23 may be formed by combining the transmission type CGH element, described as the deflection means 23 in the third embodiment, with a mirror.

The multiplexed light entering from the first input terminal 11 is directed to the deflection means 23 as it passes through the first CGH element 21.

The deflection means 23 formed by a reflection type CGH element, as described above, separates the multiplexed light into the first wavelength component and the second wavelength according to wavelengths. The deflection means 23 formed by a reflection type CGH element reflects a parallel light beam of the first wavelength component 1.55 μm toward the second CGH element 22, and also reflects a parallel light beam of the separated second wavelength component 1.3 μm toward the third CGH element 25 and the fourth CGH element 26.

The relation between the depth of each phase in etching through the etching masks used to form the reflection type CGH element and the transmission type CGH element, in other words, the etching depth and the wavelength λ are expressed by the following equations.

$$T_{Transmission} = \lambda/(2|n_1 - n_2|) \quad (63)$$

$$T_{Reflection} = \lambda/(4n_1) \quad (64)$$

Equation (63) shows the relation between the etching depth of the two-phase level transmission type CGH element and wavelength, while on the other hand, equation (64) shows the relation between the etching depth of the two-phase level reflection type CGH element and wavelength.

In equation (63) for the transmission type CGH element, a difference of refractive indexes of two media through which light passes (n1−n2) is concerned. On the other hand, in equation (64) for the reflection type CGH element, only the refractive index n1 of one medium is concerned.

The foregoing indicates that the reflection type CGH element provides a diffraction efficiency equal to that by the transmission type at a shallower etching depth for the reflection type.

Therefore, as shown in FIG. 49, the deflection means 23 using a reflection type CGH element makes it possible to obtain a greater diffraction angle at the same etching depth than by the deflection means using a transmission type CGH element. The reflection type deflection means 23 has other advantages which include a greater diffraction angle obtainable with a shallower etching depth, and a possibility of reducing the aspect ratio.

If reflection type deflection means 23 is used, the multilayer structure 16 can be formed by two pieces of glass plates: the first glass plate 13 and the second glass plate 14, so that the structure of the optical device can be further simplified.

<Embodiment 7>

Figure 50:
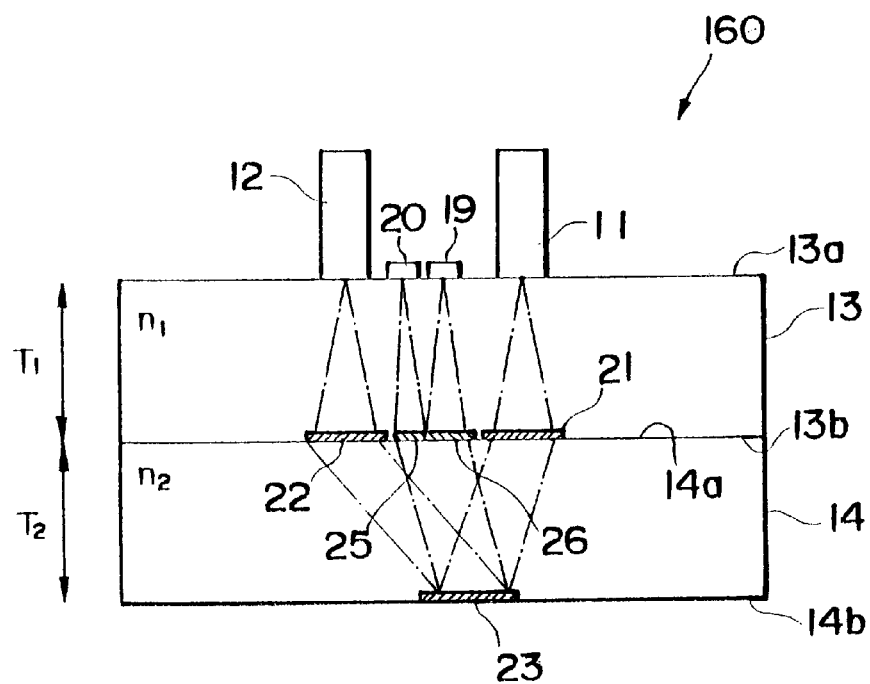
FIG. 50 is a longitudinal section schematically showing another optical device 160 according to the present invention.

As indicated in a seventh embodiment in FIG. 50, when the first input terminal 11, the first output terminal 12, the semiconductor laser 19 and the photodetector 20 are provided on one surface 13a of the first glass plate 13, by providing the other surface 13b of the first glass plate 13 with the first CGH element 21, the second CGH element 22, the third CGH element 25 and the fourth CGH element 26, the accuracy of matching of the optical elements 11, 12, 19, 20, 21, 22, 25 can be enhanced.

<Embodiment 8>

Figure 51:
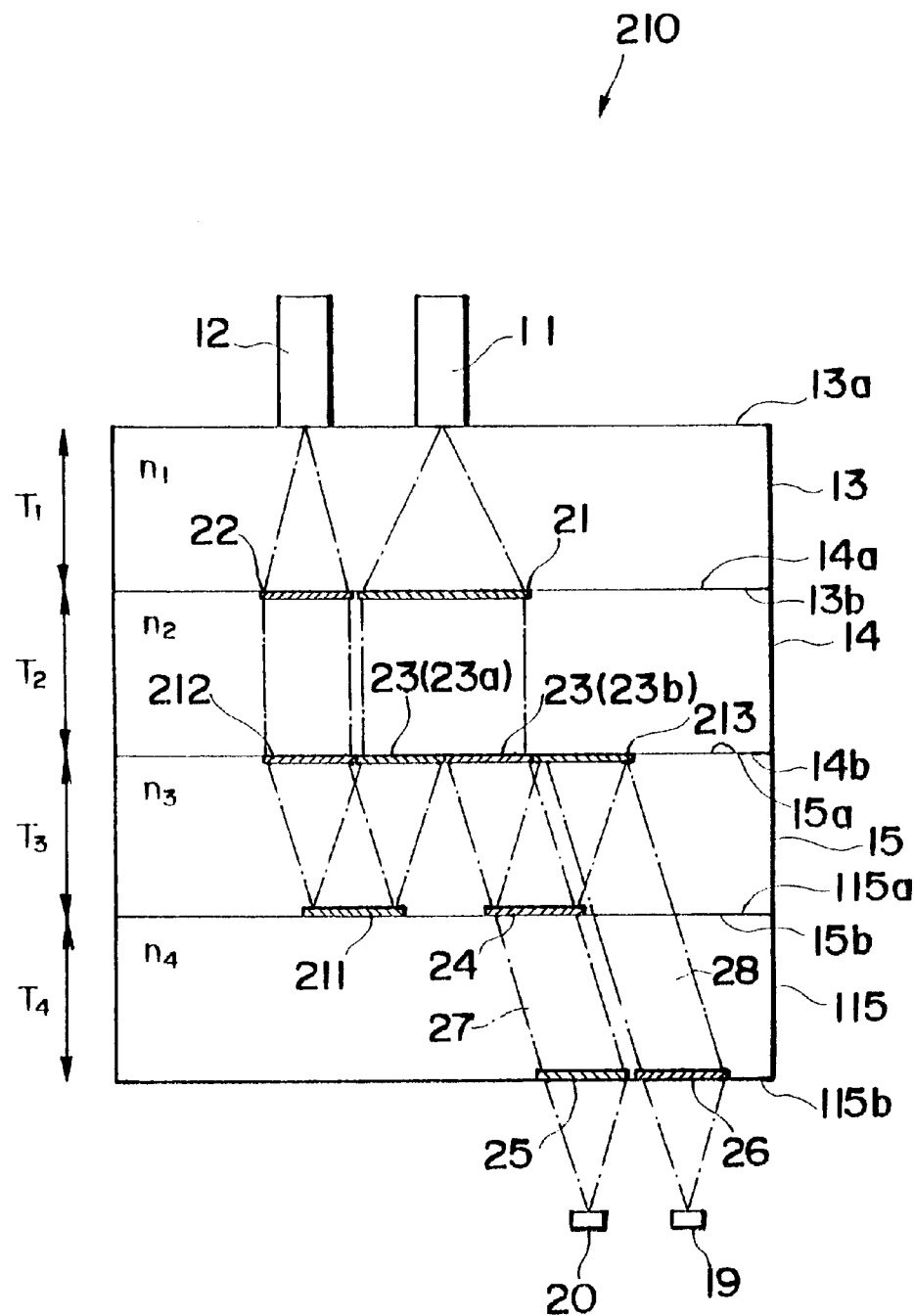
FIG. 51 is a longitudinal section schematically showing a further optical device 210 according to the present invention.

In an optical device 210 in FIG. 51, the multiplexed light which is converted into a parallel light beam as it enters from the first input terminal 11 and passes through the first CGH element 21 is separated into a parallel light beam of the first wavelength component 1.55 μm and a parallel light beam of the second wavelength component 1.3 μm by the deflection means 23 (23a and 23b) formed by a combination of two transmission type CGH elements 23a and 23b formed on one surface 15a of the third glass plate 15.

With the intention of utilizing CGH elements with different deflection angles owing to difference in wavelength dependency, the deflection means 23 is formed by arranging two CGH elements 23a and 23b having different characteristics in parallel in the optical path for a parallel light beam after the first CGH element 21.

The first wavelength component that has passed one CGH element 23a is directed by the deflecting function thereof toward the mirror 211 as the reflection means provided on the other surface 15b of the third glass plate 15, and converted by an auxiliary CGH element 212 having a prism function into a parallel light beam which is guided to the second CGH element 22.

The second wavelength component that has passed through the other CGH element 23b is guided by the deflecting function of the CGH element 23b toward the optical path splitting means 24 formed by a half-mirror made of multiple dielectric films, in other words, a dielectric filter.

The optical path splitting means 24, like in the first embodiment, guides a parallel light beam of the second wavelength component 1.3 μm into a first optical path 27 and a second optical path 28. The parallel light beam traveling along the first optical path 27 passes through the third CGH element 25 and strikes the photodetector 20. The second optical path 28 is reflected by a mirror 213 and goes to the fourth CGH element 26.

With the optical device 210 in an eighth embodiment in FIG. 51, by selecting the intensity distribution of the incident light to the CGH element 23a and the CGH element 23b, which are the components of the deflection means 23, and also selecting the area ratio of the two CGH elements, the first and the second wavelength components can be separated at a desired intensity ratio.

<Embodiment 9>

Figure 52:
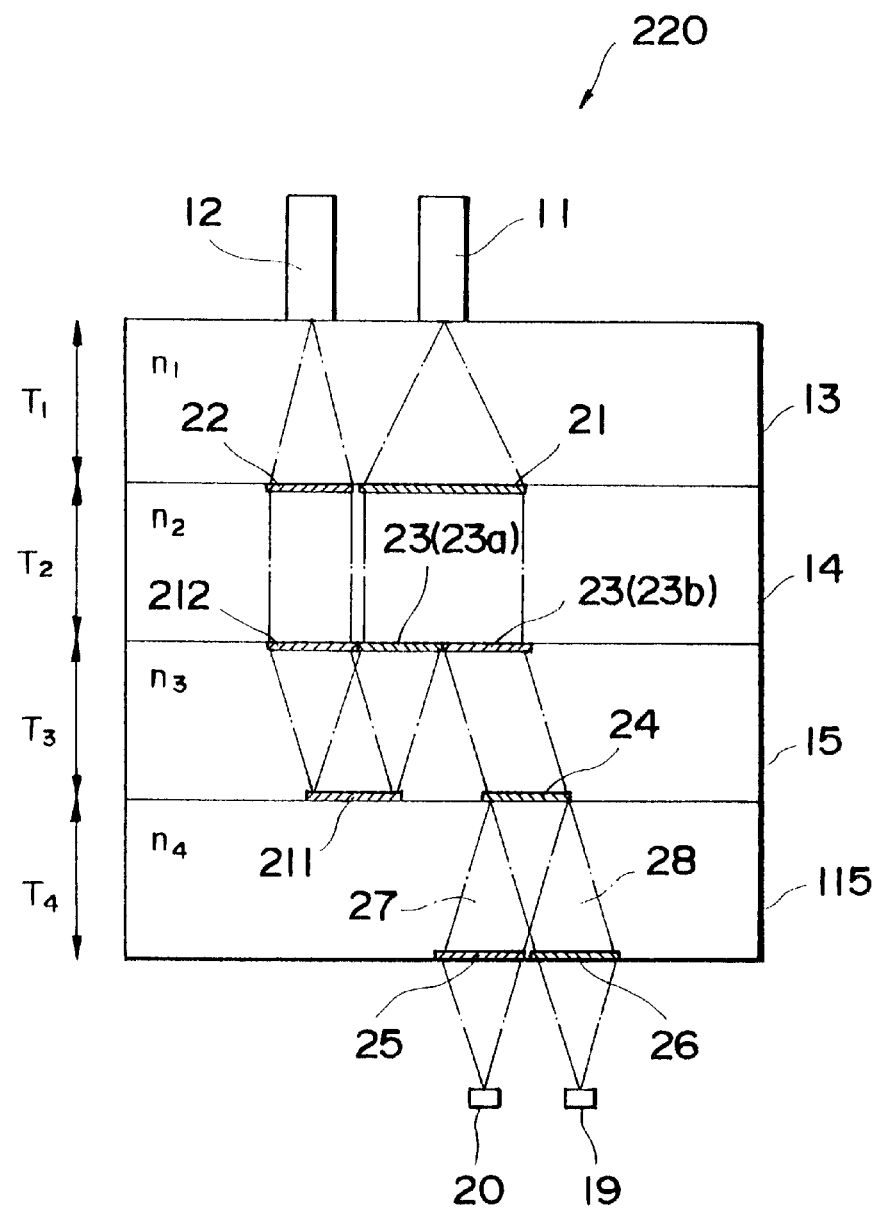
FIG. 52 is a longitudinal section schematically showing yet another optical device 220 according to the present invention.

In a ninth embodiment shown in FIG. 52, a parallel light beam of the second wavelength component separated by the deflection means 23, comprising transmission type CGH elements 23a and 23b, shown in the eighth embodiment is divided by the optical path splitting means 24 made of a transmission type CGH element into a flux traveling along the first path 27 leading to the third CGH element 25 and a flux traveling along the second path 28 leading to the fourth CGH element 26.

According to the optical device 220 including the optical path splitting means 24 formed by a transmission type CGH element, as described referring to the fourth embodiment, by selecting the number of phases by etching to produce a CGH element or the etching depth, the second wavelength component can be divided at a desired distribution ratio, so that it becomes easy to adequately set the relation between light intensity from the semiconductor laser 19 and light intensity to the photodetector.

<Embodiment 10>

Figure 53:
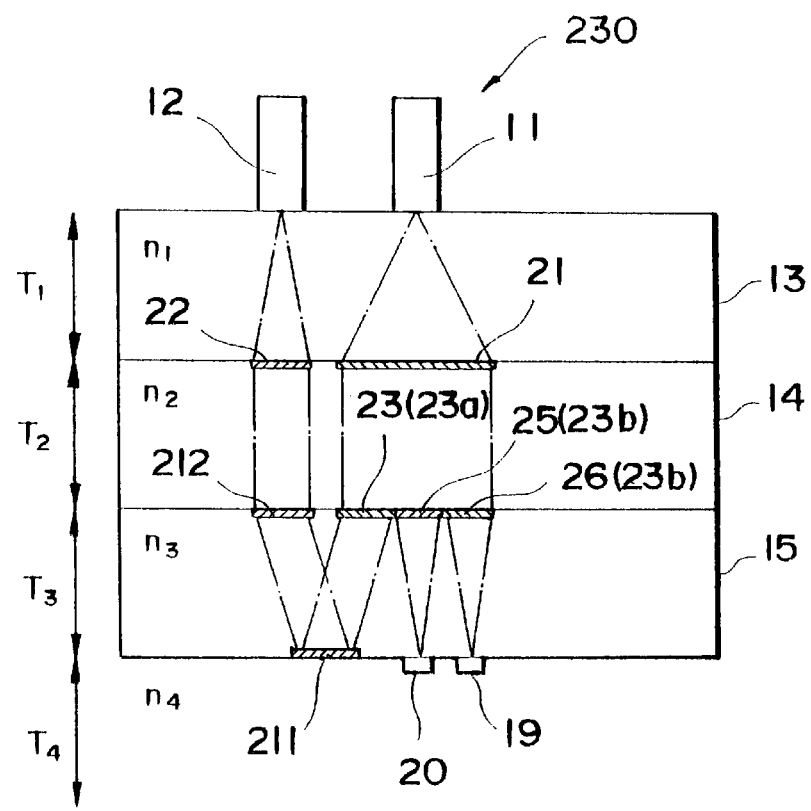
FIG. 53 is a longitudinal section schematically showing a still further optical device 230 according to the present invention.

In a 10th embodiment shown in FIG. 53, provided in parallel as deflection means along the optical path for a parallel light beam after the first CGH element 21 are the CGH element 23a shown in the ninth embodiment, and also the third CGH element 25 and the fourth CGH element 26, the latter two serving as the CGH element 23b.

In the optical device 230 according to the 10th embodiment, the third CGH element 25 and the fourth CGH element 26 formed along the optical path for the parallel light beam from the first CGH element 2, by their deflection characteristics with respect to wavelengths, guide the second wavelength components directly to the photodetector 20 and the semiconductor laser 19.

Therefore, in the 10th embodiment, the third CGH element 25 and the fourth CGH element 26 both perform the separating function of the deflection means 23, for which reason it is not necessary to mount an independent deflection optical element and the optical device can be structured in a simple form.

<Embodiment 11>

Figure 54:
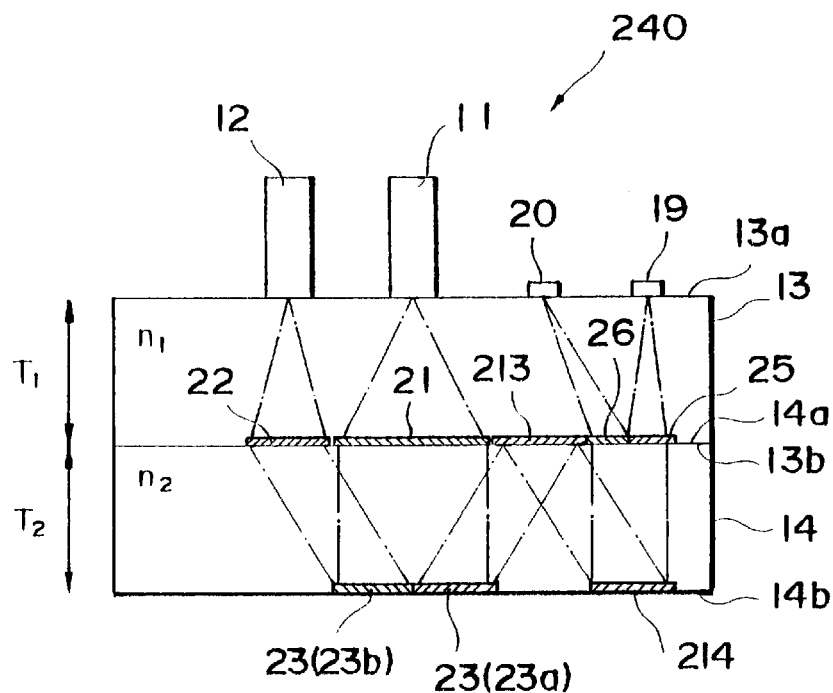
FIG. 54 is a longitudinal section schematically showing an additional optical device 240 according to the present invention.

In an optical device 240 according to an 11th embodiment shown in FIG. 54, the first input terminal 11, the first output terminal 12, the semiconductor laser 19 and the photodetector 20 are on one surface 13a of the first glass plate 13.

In the optical device 240, in place of the deflection means 23 comprising the transmission type CGH elements 23a and 23b shown in the eighth and ninth embodiments, reflection type CGH elements 23a and 23b are provided on the other surface of the first glass plate 13.

In this deflection means, consideration is given to the three-dimensional arrangement of the optical elements so that an incident light and output beams from the reflection type CGH elements 23a and 23b do not overlap.

The first wavelength component deflected by the reflection type CGH element 23a passes through the second CGH element 22 and is guided to the first output terminal 12.

On the other hand, the second wavelength component deflected by the reflection type CGH element 23b is reflected by the mirror 213 to an auxiliary CGH element 214 formed by a reflection type CGH element having a prism function. The auxiliary CGH element 214 guides a parallel light beam of the second wavelength component to the third CGH element 25 to perform the function of the deflection means 23, and also to the fourth CGH element 26.

The deflection means 23, including the reflection type CGH elements 23a and 23b, performs a diffraction function equal to that by the transmission type CGH elements at a shallower etching depth for the reflection type CGH element, so that the optical device using the reflection type deflection means is easier to manufacture. If the etching depth is the same, a greater deflection angle is available with the reflection type deflection means than with the transmission type deflection means. Because of this, the reflection type deflection means is more favorable for reduction of the thickness of the optical device 240.

<Embodiment 12>

Figure 55:
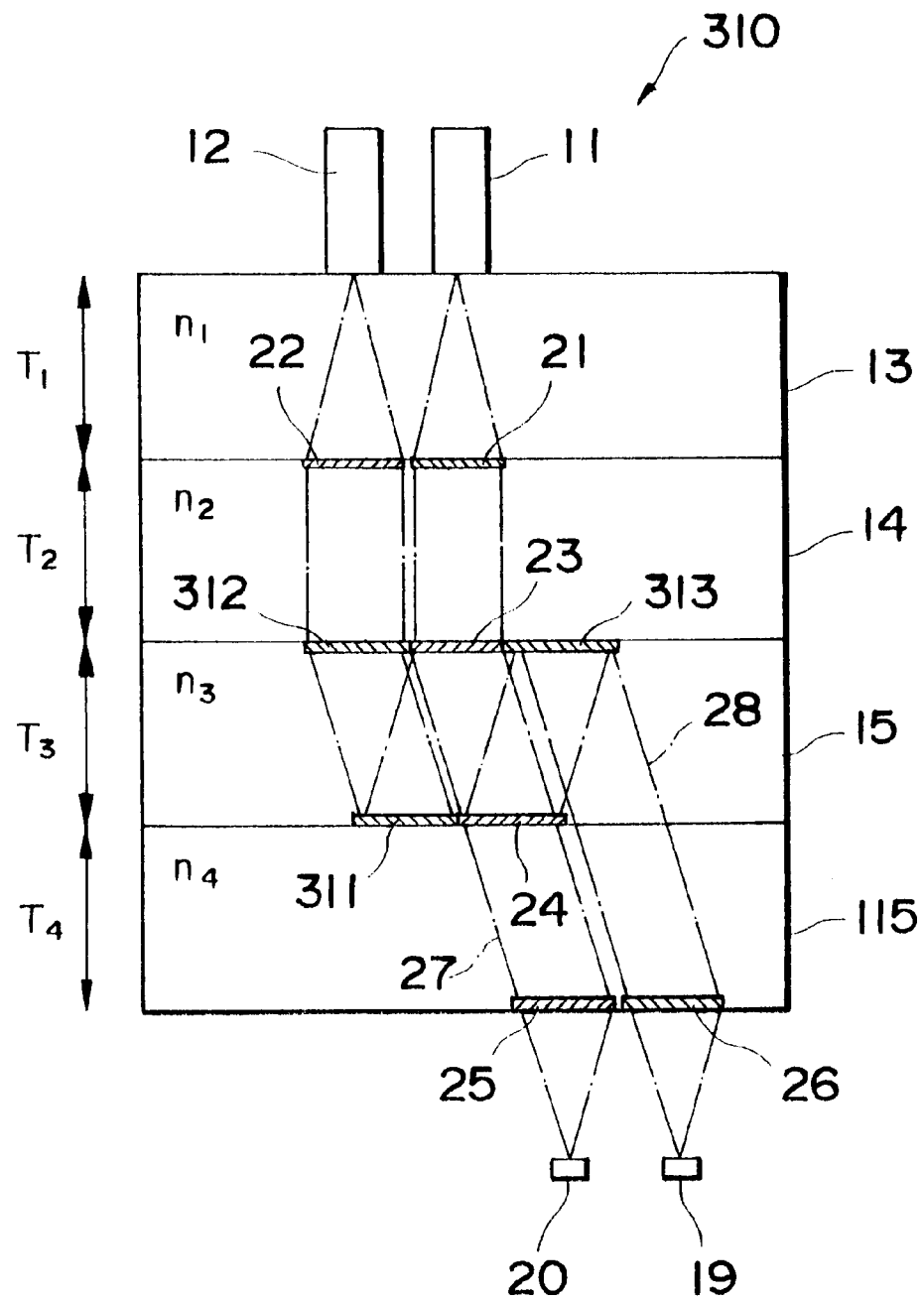
FIG. 55 is a longitudinal section schematically showing another optical device 310 according to the present invention.

In an optical device 310 according to a 12th embodiment shown in FIG. 55, as the deflection means 23 for separating a multiplexed light having passed through the first CGH element 21 into parallel light beams of the first and second wavelength components, the deflection means 23 formed by a transmission type CGH element shown in the third embodiment is used.

The parallel light beam of 1.55 μm separated by the deflection means 23 is reflected by the mirror 311 as the reflection means and thus guided to the auxiliary CGH element 312 having the prism function, which further guides the parallel light beam to the second CGH element 22.

Meanwhile, the parallel light beam of 1.3 μm separated by the transmission type CGH element 23 is guided to the path splitting means 24 formed by a half-mirror of a multilayer dielectric film, in other words, the wavelength splitting filter.

The optical path splitting means 24, like in the first embodiment, separates the second parallel light beam to the first path 27 and the second path 28. The parallel light beam on the firs path 27 passes through the third CGH element 25 and reaches the photodetector 20. The parallel light beam on the second path coming from the mirror 313 reaches the fourth CGH element 26.

<Embodiment 13>

Figure 56:
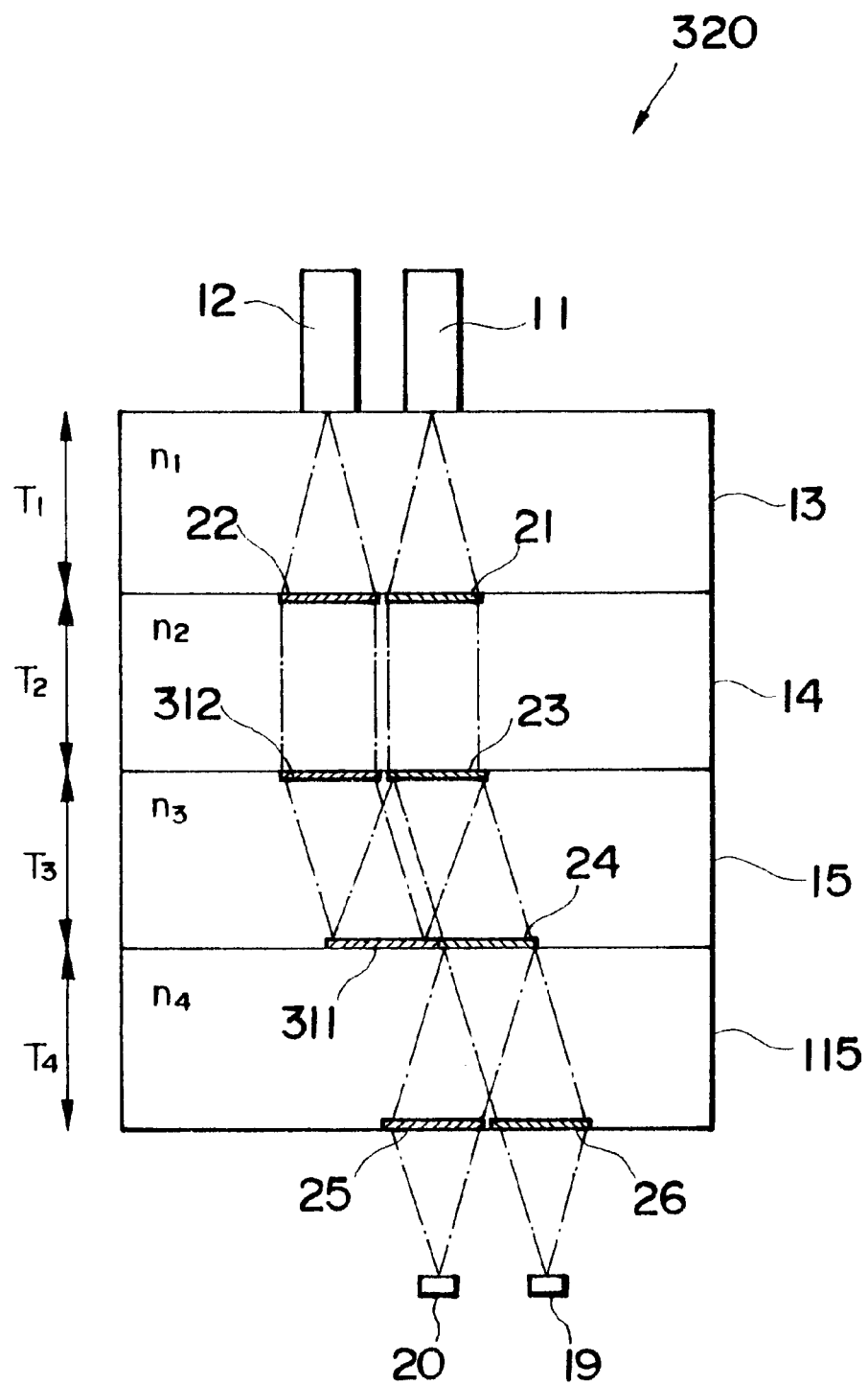
FIG. 56 is a longitudinal section schematically showing a further optical device 320 according to the present invention.

In a 13th embodiment (optical device 320) shown in FIG. 56, as the optical path splitting means 24 for splitting the parallel light beam of the second wavelength component separated by the transmission type CGH elements 23a and 23b in the 12th embodiment, a transmission type CGH element 24 same as that in the first embodiment can be used.

The optical device 230, in which the deflection means and the optical path splitting means 24 can both be formed by CGH elements, is favorable for size reduction.

<Embodiment 14>

Figure 57:
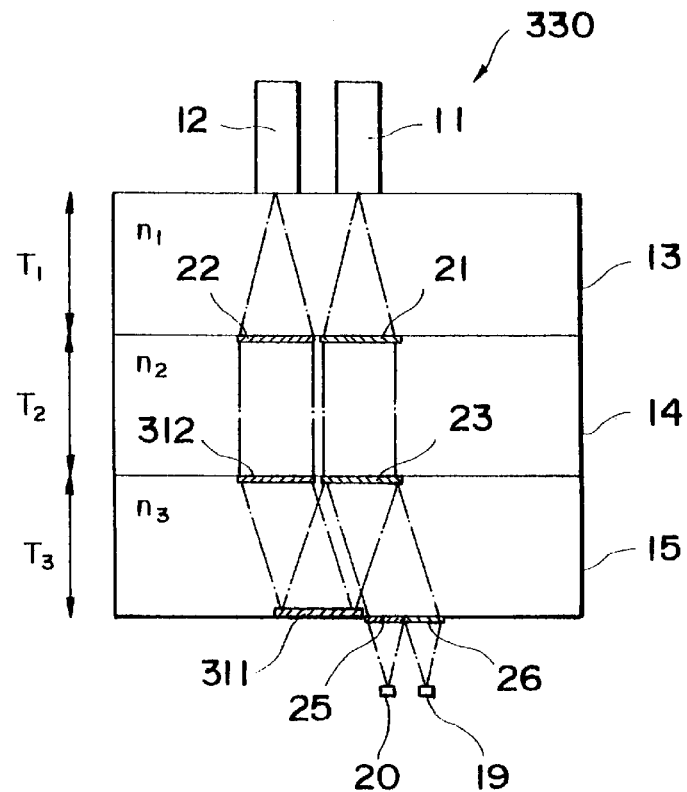
FIG. 57 is a longitudinal section schematically showing yet another optical device 330 according to the present invention.

In a 14th embodiment (optical device 330) in FIG. 57, the third CGH element 25 and the fourth CGH element 26, which are used to also perform the path disjoining function of the path splitting means, are arranged on the optical path of a parallel light beam of the second wavelength component separated by the deflection means 23 formed by a transmission type CGH element shown in the $13^{th}$ embodiment. By this arrangement, the device structure can be simplified as in the fifth embodiment.

<Embodiment 15>

Figure 58:
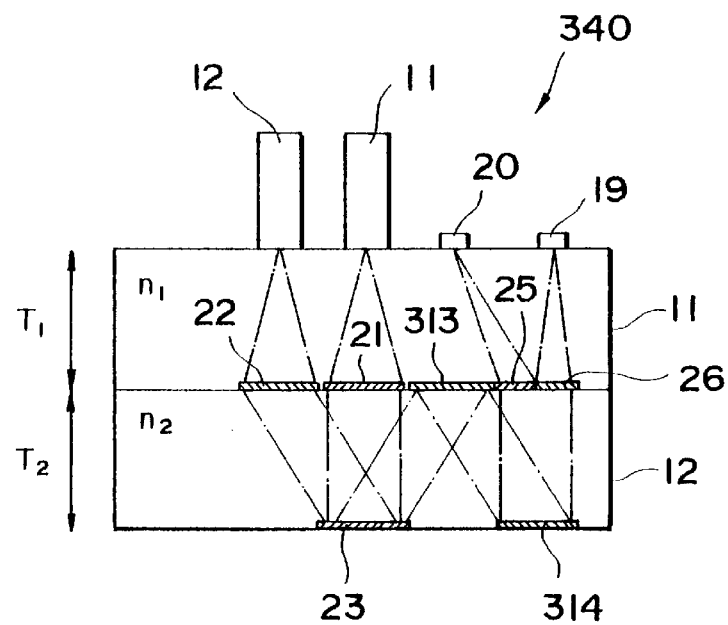
FIG. 58 is a longitudinal section schematically showing a still further optical device 340 according to the present invention.

As shown in a 15th embodiment (optical device 340) in FIG. 58, as the deflection means 23, deflection means 23 formed of a reflection type CGH element like the one in the sixth embodiment can be used.

The second wavelength component separated by the reflection type CGH element is reflected by a mirror 313 as the reflection means and guided to the auxiliary CGH element 314 formed by a reflection type CGH element having a prism function like the one in the 11th embodiment. The auxiliary CGH element 314 guides a parallel light beam of the second wavelength component to the third CGH element 25 and the fourth CGH element 26 together performing the function of the deflection means 23.

<Embodiment 16>

Figure 59:
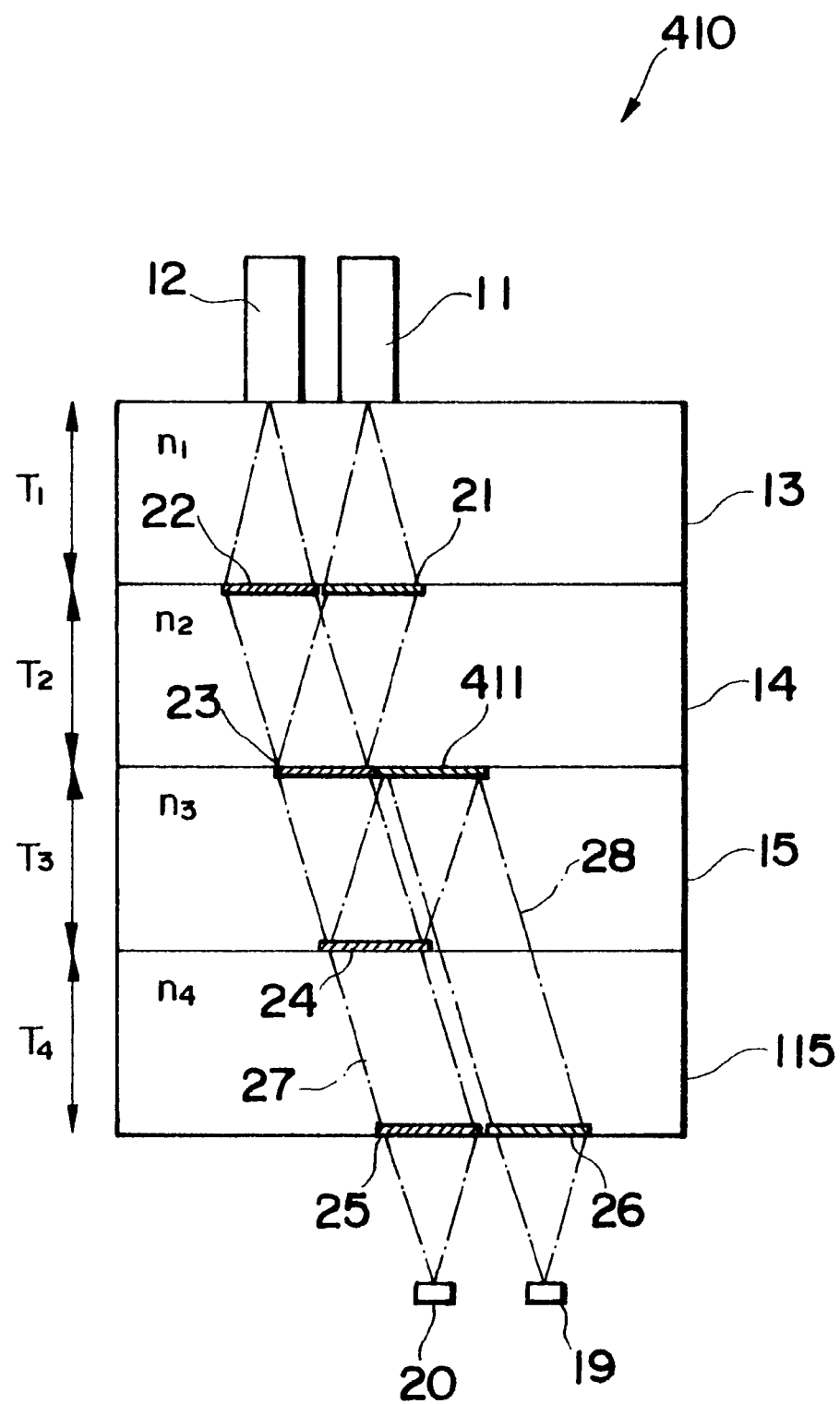
FIG. 59 is a longitudinal section schematically showing an additional optical device 410 according to the present invention.

In a 16th embodiment (optical device 410) in FIG. 59, a multiplexed light having passed through the first CGH element 21 is separated by the wavelength splitting filter 23 formed of multiple dielectric films like the one in the first embodiment into the first and second wavelength components.

The parallel light beam of the first wavelength component is guided to the second CGH element 22, which then guides the light beam to the first output terminal 12.

On the other hand, the parallel light beam of the second wavelength component is separated by the optical path splitting means 24 formed by a half-mirror made of multiple dielectric films like the one mentioned above into a light beam to go to the first path and a light beam to travel to the second path.

The parallel light beam going along the first path, as described referring to the 12th embodiment, passes through the third CGH element 25 to the photodetector 20. The parallel light beam traveling along the second path is reflected by a mirror 411 as the reflection means and passes through the fourth CGH element 26 to the semiconductor laser 19.

<Embodiment 17>

Figure 60:
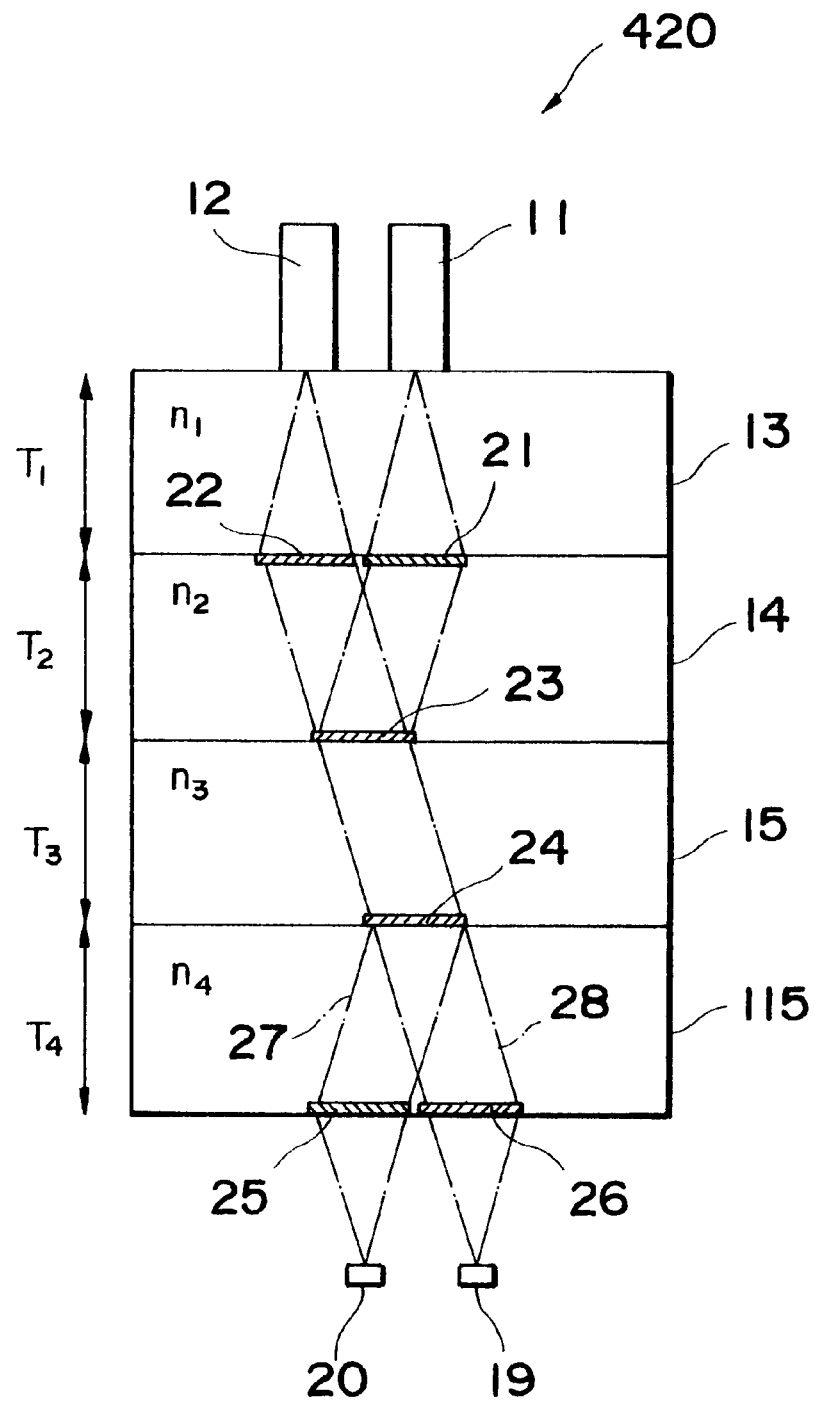
FIG. 60 is a longitudinal section schematically showing another optical device 420 according to the present invention.

As shown in a 17th embodiment (optical device 420) in FIG. 60, in place of the optical path splitting means 24 formed by a half-mirror in the 16th embodiment, a CGH element 24 having a prism function like the one in the first embodiment can be used.

In the 17th embodiment, a parallel light beam separated by the CGH element 24 and traveling along the first path 27 passes through the third CGH element 25 to the photodetector 20. A parallel light beam separated by the CGH element 24 and traveling along the second path 28 passes through the fourth CGH element 26 to the semiconductor layer 19.

<Embodiment 18>

Figure 61:
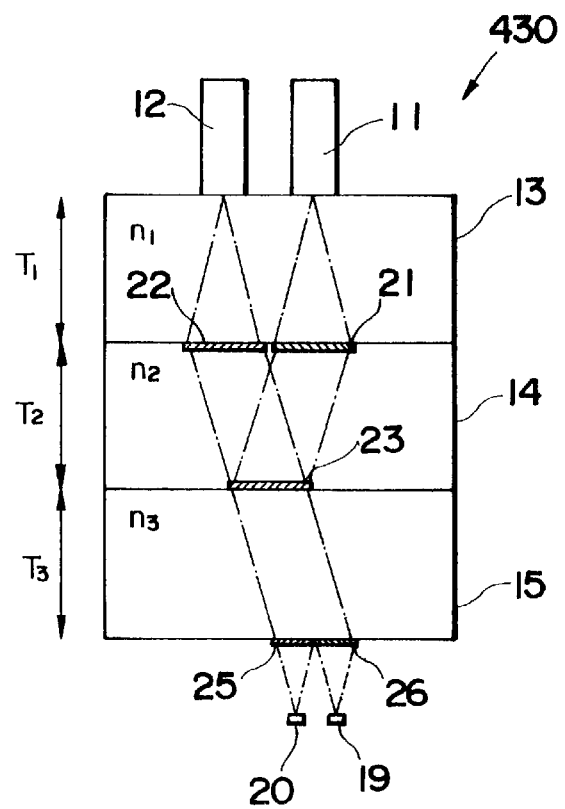
FIG. 61 is a longitudinal section schematically showing a further optical device 430 according to the present invention.

As shown in a 18th embodiment (optical device 430) in FIG. 61, on the optical path for a parallel light beam for the second wavelength component having passed through the reflection type CGH element like the one in the $16^{th}$ embodiment, the third CGH element 25 and the fourth CGH element 26 together performing the function of the optical path splitting means 24. By this arrangement, the device structure can be simplified as in the fifth and 16th embodiments.

<Embodiment 19>

Figure 62:
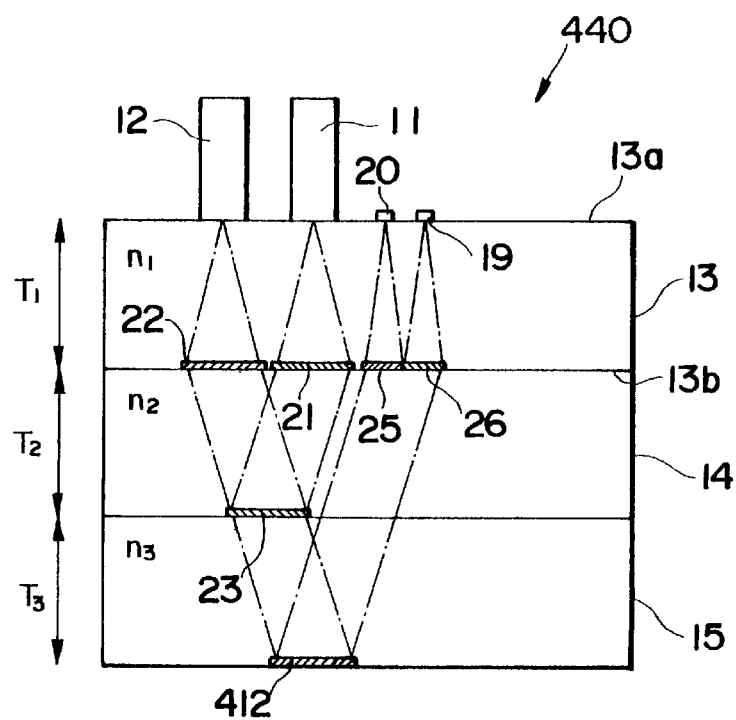
FIG. 62 is a longitudinal section schematically showing yet another optical device 440 according to the present invention.

In a 19th embodiment (optical device 440) in FIG. 62, the first input terminal 11, the first output terminal 12 and the semiconductor lasers 19 and 20 are provided on one surface of the first glass plate 13.

The first CGH element 21, the second CGH element 22, the third CGH element 25 and the fourth CGH element 26 are provided on the other surface 13b of the first glass plate 13. The deflection means 23 formed by a wavelength splitting filter like the one in the 18th embodiment is provided on the surface 14b of the second glass plate 14 which is opposite the surface 14a which is bonded to the first glass plate 13.

The parallel light beam of the second wavelength component having passed through the deflection means 23 is reflected to the third CGH element 25 and the fourth CGH element 26 by a mirror 412 provided on the surface 15b opposite the surface 15a of the third glass plate 15 which is bonded to the second glass plate 14.

With reference to the following embodiment, description will be made of an optical device for an optical network unit, comprising a common terminal for receiving a beam of one wavelength component and outputting a beam of the other wavelength component out of two opposite wavelength components for bi-directional communication; an output terminal for sending a beam of the one wavelength component to a light detector; and an input terminal for receiving a beam of the other wavelength component from a light source.

<Embodiment 20>

Figure 63:
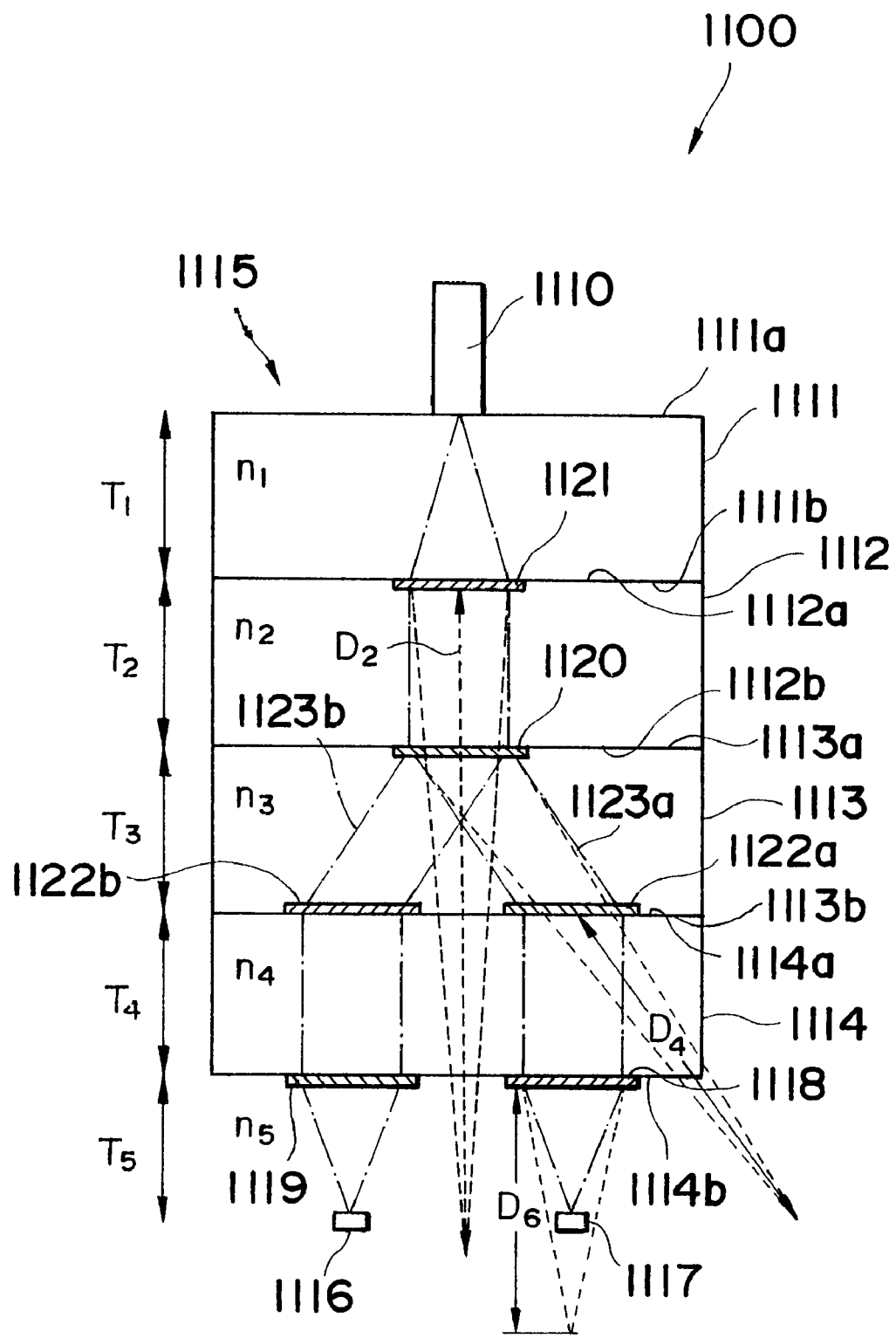
FIG. 63 is a longitudinal section schematically showing a still further optical device 1100 according to the present invention.

FIG. 63 shows an optical device 1100 according to a still further embodiment of the present invention. The optical device in FIG. 63 comprises a first glass plate 1111 made of the same material like the one in the first embodiment; a second glass plate 1112 having one surface 1112a bonded to the other surface 1111b of the first glass plate; a third glass plate 1113 having one surface 1113a bonded to the other surface 1112b of the second glass plate 1112; and a fourth glass plate 1114 having one surface 1114a bonded to the other surface 1113b of the third glass plate 1113.

The glass plates 1111, 1112, 1113 and 1114 have thicknesses $T_1$, $T_2$, $T_3$, and $T_4$ and refractive indexes $n_1$, $n_2$, $n_3$ and $n_4$. In the space indicated by the refractive index $n_5$, a light source 1116 and a light detector 1117 are provided at positions which are separate for a distance $T_5$ from the other surface 1114b of the fourth glass plate 1114.

The part of the other surface 1114b of the fourth glass plate 1114 which faces the light detector 1117 is an output terminal of light to the light detector, and this output terminal has a first CGH element 1118 formed thereon. For this light detector 1117, a photoelectric conversion element, such as the photodetector mentioned above is used.

The part of the other surface 1114b of the glass plate 1114 which faces the light source 1116 serves as an input terminal for light from the light source 1116, and this input terminal has a second CGH element 1119 formed thereon. For the light source 1116, a light-emitting element, such as the semiconductor laser mentioned above is used.

A beam of a wavelength 1.5 μm, for example, is incident on the common terminal 1110 provided on the first glass plate 1111. Also, the common terminal 1110 emits a beam of a wavelength 1.3 μm, for example, from the light source 1116, which will be described later.

Between the common terminal 1110 and the first CGH element 1118 and the second CGH element 1119, a third CGH element 1120 as the deflection means, a fourth CGH element 1121, and a pair of fifth CGH element 1122 (1122a and 1122b) are provided in the 20th embodiment.

The fourth CGH element 1121 is provided on one surface 1112a of the second glass plate 1112, and has a collimating function to convert divergent spherical waves entering from the common terminal into a parallel light beam, and guides the parallel light beam to the deflection means 1120.

Figure 64:
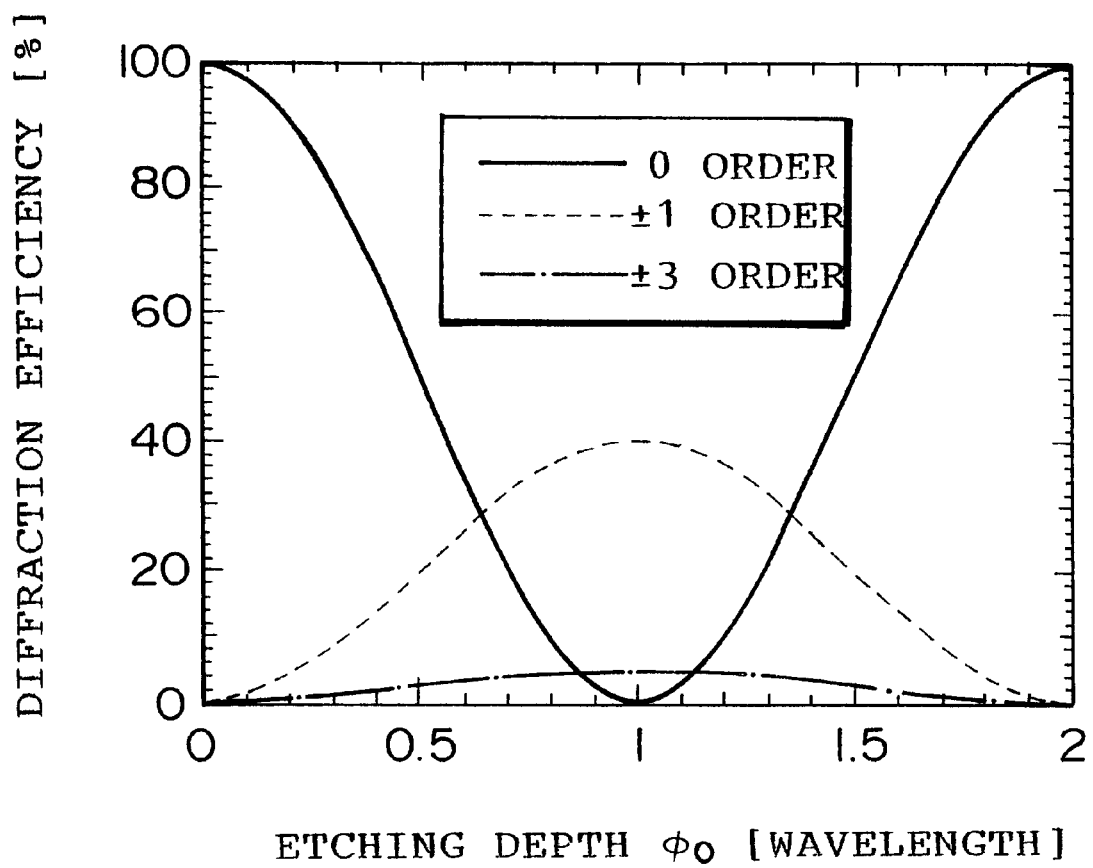
FIG. 64 is a longitudinal section schematically showing a graph showing the relation between the CGH element diffraction efficiency and the etching depth of the CGH element.

The third CGH element 1120 as the deflection means, in the example in FIG. 64, is provided on one surface 1113a of the third glass plate 1113. The deflection means 1120 to receive a parallel light beam from the fourth CGH element 1121 acts as a linear grating, and splits the light from the incident light path to the first path 1123a and the second path 1123b. The first path 1123a can be formed as a 1st order diffracted light path and the second path 1123b can be formed as a minus 1st order diffracted light path, for example.

On the first path 1123a, a fifth CGH element 1122a is arranged and on the second path 1123b, the other fifth CGH element 1122b is arranged. The fifth CGH elements 1122a and 1122b in a pair both have the prism function, and are provided on the other surface 1113b of the third glass plate 1113.

One fifth CGH element 1122a guide to the first CGH element 1118 a beam of one wavelength component of 1.5 μm traveling on the first path 1123a guided by the deflection means 1120. Therefore, a beam of one wavelength component entering from the common terminal 1110 is guided by the first CGH element 1118 and led by the converging function of the CGH element 1118 to the light detector 1117.

A beam of divergent spherical waves from the light source 1116, more specifically, a beam of the other wavelength component of 1.3 μm, for example, is guided to the fifth CGH element 1122b by the second CGH element 1119 which has a converging function and acts as a collimator lens, and further guided by the prism function of the CGH element 1122b to the second path 1123b of the deflection means 1120.

Therefore, a beam of the other wavelength component from the light source passes through the fifth CGH element 1122b, the deflection means 1120 and the fourth CGH element 1121, and then is emitted from the common terminal 1110.

The respective CGH elements 1118, 1119, 1121, 1120 and 1122 (1122a, 1122b) can be obtained in the same as in the first embodiment. In the design of those CGH elements, for example, the CGH elements are considered so that they comply with one wavelength component, and then, the CGH elements associated with the other wavelength component can be modified with regard to a difference in wavelength.

Here, the CGH elements are considered in terms of characteristics related to a wavelength component of 1.3 μm, for example, and then corrections due to wavelength difference are made on those CGH elements for a wavelength component of 1.5 μm.

The fourth CGH element 1121 has a collimating function. Therefore, as with the first CGH element in the first embodiment, etching masks required for etching can be obtained on the basis of the optical path difference function ρ(x, y) obtained from equations (5) and (6) for converting divergent spherical waves into a parallel light beam. By etching of lens material with etching masks, the fourth CGH element 1121 can be produced.

The third CGH element 1120 as the deflection means and the fifth CGH elements 1122a and 1122b each have a transmission type prism function. Therefore, as with the CGH element 24 in the first embodiment, etching masks can be obtained on the basis of the optical path difference function ρ(x, y) obtained from equation (28) for converting a parallel light beam into a parallel light beam. By etching with the etching masks, those CGH elements 1120, 1122a and 1122b can be obtained.

The third CGH element 1120 as the deflection means acts as a linear grating, and for this CGH element, a CGH element of two phase levels can be used as with the optical path splitting means in the first embodiment.

FIG. 64 shows the relation between the diffraction efficiency η with one etching mask, in other words, at two phase levels and the etching depth φ(in wavelength units), in which the vertical axis indicates the diffraction efficiency and the horizontal axis indicates the etching depth.

The patterns of the respective characteristic curves in this graph vary with the number of phase levels.

According to the characteristic curves in FIG. 64, it is understood that by setting the etching depth at 1.3 μm, which corresponds to a 1.3 μm wavelength, for example, a 1st order diffracted light and a minus 1st order diffracted light can be obtained with an intensity of substantially 40% of the incident light. By setting the etching depth at about 60 of the wavelength, the incident light can be separated into about 30% of a 0-order diffracted light or a linear transmitted light and about 30% of a 1st order diffracted light and a minus 1st order diffracted light.

The correspondence relationship between the diffraction efficiency, in other words, the divided intensity proportion and the etching depth varies with the number of phase levels and the etching depth. Therefore, by selecting an appropriate etching depth according to the number of phase levels of the CGH element used, a beam of the same wavelength can be divided at an appropriate intensity ratio.

Therefore, as has been described with reference to the first embodiment, the optical path can be divided at an appropriate intensity ratio by selecting an etching depth of the CGH element in addition to by selecting a phase level of the CGH element. For example, the optical path can be divided into the first path 1123a and the second path 1123b.

The optical path splitting means formed by a CGH element can select the direction of diffraction from a relatively wide range by using a high-order diffracted light in contrast to a case where a WDM mirror is used as the optical path splitting means. By using a larger diffraction angle, it is possible to reduce the thickness T3 of the third glass plate 1113.

The first CGH element 1118 and the second CGH element 1119 can be regarded as CGH elements for equivalently converging parallel light beams traveling along the first path 1123a and the second path 1123b at an image point.

Therefore, as with the CGH element 22 in the first embodiment, the first CGH element 1118 and the second CGH element 1119 can be obtained on the basis of the optical path difference function $\rho(x, y)$ from the equations (10) and (11) mentioned earlier.

Meanwhile, as has been described, with the CGH elements, the focal length and the diffraction angle depend on the wavelength of light. Therefore, if the CGH elements 1121, 1120, 1122a and 1118 are designed for a wavelength 1.3 m, corrections due to wavelength difference must be made on the CGH elements for communication of a wavelength component of 1.5 $\mu$m.

The fourth CGH element 1121 exhibits a proper collimating function with a wavelength component of 1.3 $\mu$m, but is unable to convert a wavelength component of 1.5 $\mu$m entering from the common terminal into a parallel light beam and converges the 1.5 $\mu$m wavelength component at the image point at a distance of $D_2$ away. The deflection means 1120 behaves differently between wavelengths 1.5 $\mu$m and 1.3 $\mu$m.

With the fourth CGH element 1120, the distance $D_2$ up to the image point for a wavelength component of 1.5 $\mu$m can be obtained by the following equation derived from equation (27).

$$D_2 = 5.2(n_2T_1/n_1) \quad (65)$$

The deflection angle of the fourth CGH element 1121 with the wavelength component of 1.5 $\mu$m can be corrected by equation (20). This correction of the deflection angle can be done by ray tracing by an optical CAD program available on the market.

To convert this convergent light into a parallel light beam, the fifth CGH element 1122a can be corrected. The distance $D_4$ to an equivalent point light source with the fifth CGH element 1122a can be obtained by the following equation derived from equation (65).

$$(D_4/n_4) = (D_2/n_2) - \{(T_1/n_1) + (T_2/n_2) + (T_3/n_3)\} \quad (66)$$

From this relation, the collimating function of the fifth CGH element 1122a for a beam of 1.5 $\mu$m can be obtained. The first CGH element 1118 is corrected so that a collimated beam of 1.5 $\mu$m is converged.

It is possible to make the first CGH element 1118 perform an image-forming action as shown in FIG. 28 and equation (38) without providing the fifth CGH element 1122a with the collimating function. This image-forming action of the CGH element 1118 can supplement the collimating function of the fifth CGH element 1122a. At this time, the distance $D_6$ from the first CGH element 1118 to the object point can be derived from the following equation.

$$(D_6/n_5) = (D_2/n_2) - \{(T_1/n_1) + (T_2/n_2) + (T_3/n_3) + (T_4/n_4)\} \quad (67)$$

From the optical path difference function $\rho(x, y)$ of equation (38) which takes the correction by equation (67) into consideration, the first CGH element 1118 having the image-forming action can be obtained.

For correction with regard to a wavelength difference as mentioned above, as in the first embodiment, the CGH elements are first designed for a wavelength 1.5 $\mu$m, and then correction for another wavelength 1.3 $\mu$m can be introduced.

In the optical device 1100 according to a 20th embodiment of the present invention, a beam of 1.5 $\mu$m wavelength as one wavelength component entering from the common terminal 1110 is converted into a parallel light beam by the fourth CGH element 1121 and guided to the deflection means 1120 and travels through the first path defined by the deflection means and enters the fifth CGH element 1122a.

A beam of one wavelength component passing through the first path is deflected by the fifth CGH element 1122a to the first CGH element 1118 which converges the beam to the light detector 1117.

A beam of a wavelength 1.3 $\mu$m as the other wavelength component from the light source 1116 is converted by the second CGH element 1119 by its collimating function into a parallel light beam, and this parallel light beam is guided by the prism function of the fifth CGH element 1122b to pass through the second path 1123b to the deflection means.

The beam of the other wavelength component from the deflection means 1120 is converged by the converging function of the fourth CGH element 1121 to the common terminal 1110.

Therefore, according to the optical device 1100, by adoption of those CGH elements, the optical device can be configured in a small size and manufactured in mass production, so that the optical device can be provided at lower cost.

<Embodiment 21>

Figure 65:
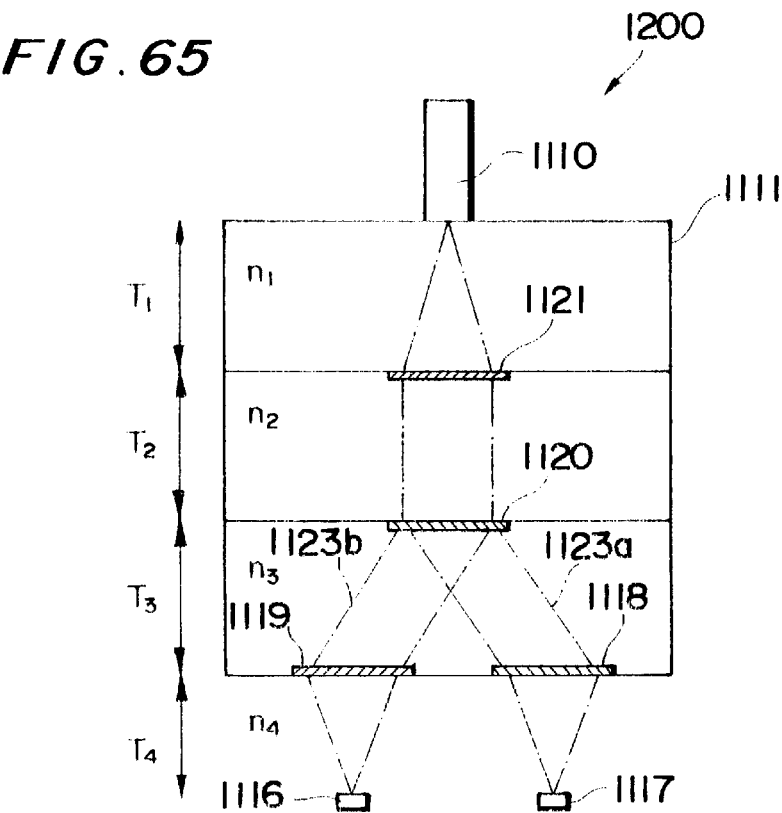
FIG. 65 is a longitudinal section schematically showing an additional optical device 1200 according to the present invention.

FIG. 65 shows an optical device 1200 according to a 21st embodiment of the present invention.

According to the optical device 1200, as shown in FIG. 65, the fifth CGH element 1122 (1122a and 1122b) used in the 20th embodiment can be obviated. In this embodiment, the first CGH element 1118 and the second CGH element 1119 each having the collimating function and the image-forming function as mentioned above, are further provided with a prism function.

According to the optical device 1200, in conjunction with the possibility of obviating the fifth CGH element 1122 (1122a and 1122b), the fourth glass plate 1114 can be obviated, making it possible to further reduce the device size and the production cost.

<Embodiment 22>

Figure 66:
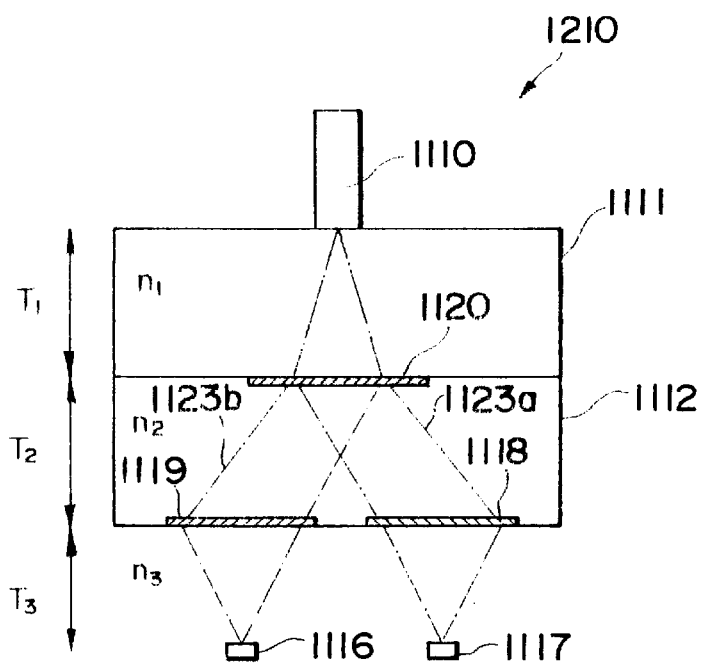
FIG. 66 is a longitudinal section schematically showing a still further optical device 1210 according to the present invention.

FIG. 66 shows an optical device 1210 according to a 22th embodiment of the present invention.

In the 22nd embodiment, as shown in FIG. 66, the fourth CGH element 1121 with the collimating function shown in the 20th and 21st embodiments can be obviated.

By the elimination of the fourth CGH element 1121, the first path 1123a and the second path 1123b, which extend from the deflection means to the CGH element 1118 and the CGH element 1119, respectively, are both divergent light paths. Therefore, the first CGH element 1118 and the second CGH element 1119 are each provided with an image-forming function.

According to the optical device 1210, the fourth CGH element 1211 and the third glass plate 1113 can be obviated. Therefore, this embodiment is favorable for extra reductions of device size and production cost.

In the 20th to 22nd embodiments, as the deflection means 1120, the transmission type CGH elements are used, but a reflection type CGH element can be used as will be shown in the next 23rd to the 26th embodiments.

The reflection type CGH element can be obtained by combining the transmission type CGH element with reflection means made by vapor-deposition of a metal, such as aluminum or gold.

<Embodiment 23>

Figure 67:
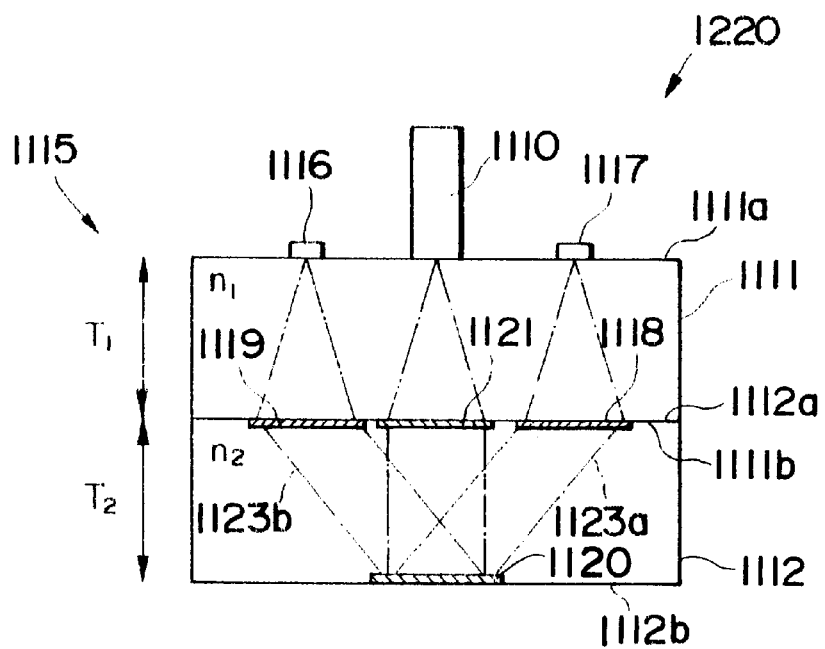
FIG. 67 is a longitudinal section schematically showing another optical device 1220 according to the present invention.

In an optical device 1220 shown in FIG. 67, the common terminal 1111, the light source 1116 and the light detector 1117 are provided on one surface of the first glass plate 1111. The fourth CGH element 1121, the first CGH element 1118 and the second CGH element 1119 are formed on one surface of 1112a of the second glass plate 1112 which is bonded to the other surface 1111b of the first glass plate 1111.

The deflection means 1120 is formed on the other surface 1112b of the second glass plate 1112, and for the third CGH element 1120 as the deflection means, a reflection type CGH element is used.

Thus, the parallel light beam from the fourth CGH element 1121 is reflected by the third CGH element 1120 of the reflection type to the first CGH element 1118 and the second CGH element 1119. The parallel light beams traveling along the first path 1123a and the second path 1123b are converged by the first CGH element 1118 and the second CGH element 1119 to the light detector 1117 and the light source 1116.

The relation between the depths of the phases in etching with etching masks to form the reflection type CGH element and the transmission type CGH element, in other words, the etching depth and the wavelength λ is as expressed by equations (63) and (64) mentioned above.

This means that the reflection type CGH element provides an equal diffraction effect with a shallower etching depth than the transmission type CGH element as described above.

Therefore, as shown in FIG. 67, the deflection means 1120 using a reflection type CGH element provides a greater diffraction angle with the same etching depth than the deflection means using a transmission type CGH element. Moreover, the deflection means using a reflection type CGH element provides an equal diffraction angle with a shallower etching depth, and makes it possible to decrease the aspect ratio, among many better features.

When the reflection type deflection means 1120 is used, the multilayer structure 1115 can be formed with only two glass plates, namely, the first glass plate 1111 and the second glass plate 1112, so that the device structure can be simplified.

<Embodiment 24>

Figure 68:
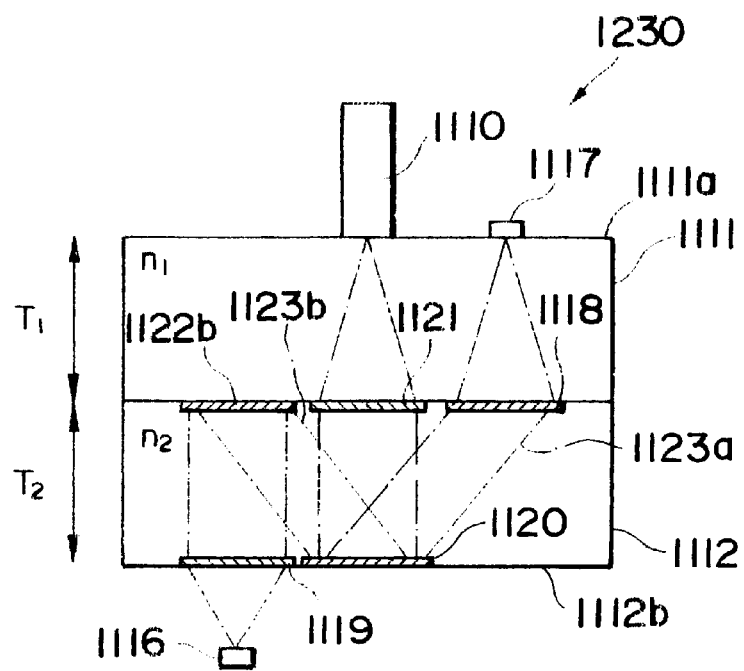
FIG. 68 is a longitudinal section schematically showing a further optical device 1230 according to the present invention.

In an optical device 1230 according to a 24th embodiment shown in FIG. 68, the fifth CGH element 1122b of the reflection type is used in the second path 1123b. If the reflection action of the reflection type CGH element 1122b is utilized, the light source 1116 can be arranged on the other surface 1112b of the second glass plate 1112 which is opposite the side where the light detector is provided (the surface 1111a of the first glass plate 1111).

<Embodiment 25>

Figure 69:
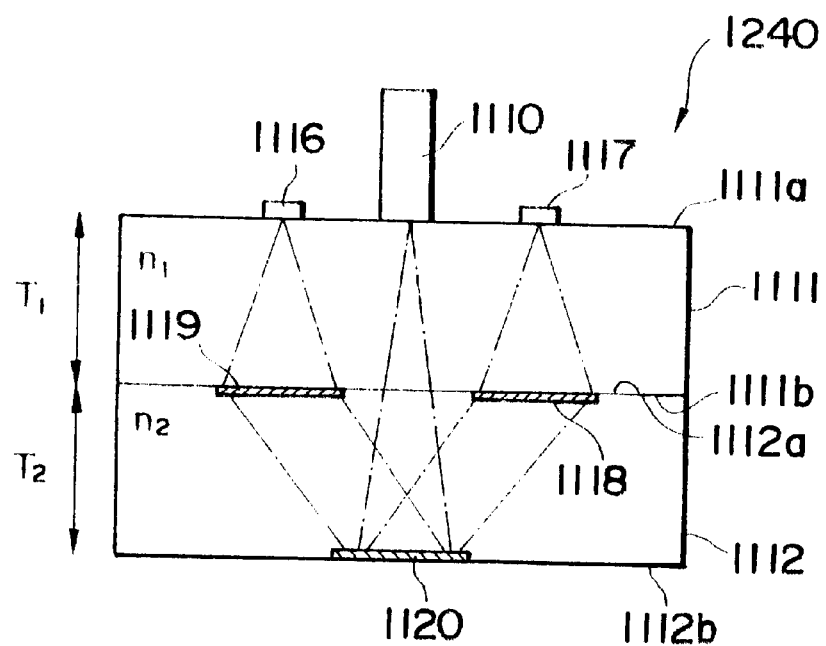
FIG. 69 is a longitudinal section schematically showing yet another optical device 1240 according to the present invention.

As shown in FIG. 69, also in a 25th embodiment using the third CGH element 1120 of the reflection type, the fourth CGH element 1121 with the collimating function can be obviated. In the optical device 1240 of the 25th embodiment, as in the 22nd embodiment, the first CGH element 1118 and the second CGH element 1119 are each added with an image-forming function in addition to the prism function as in the 22nd embodiment.

<Embodiment 26>

Figure 70:
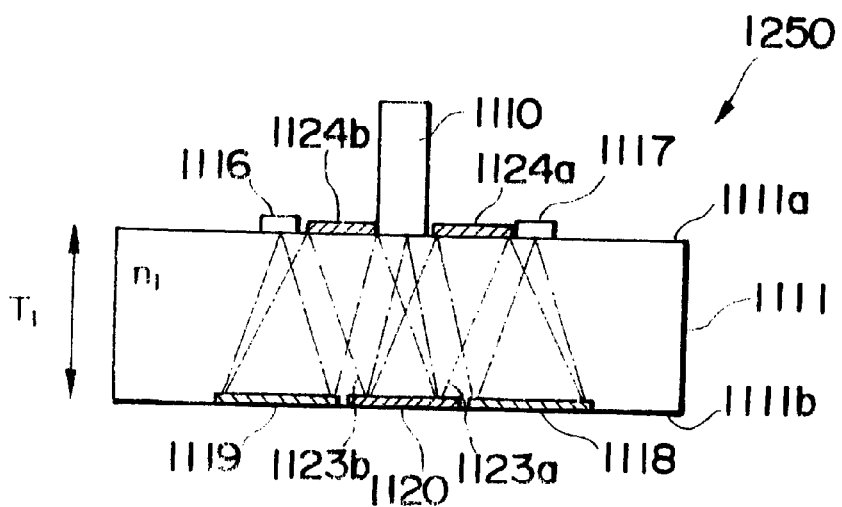
FIG. 70 is a longitudinal section schematically showing a still further optical device 1250 according to the present invention.

As shown in FIG. 70, reflection type CGH elements can be used for the first CGH element 1118 and the second CGH element 1119 in addition to the third CGH element 1120.

In an optical device 1250 in a 26th embodiment, mirrors 1124a and 1124b are used in the first path 1123a and the second path 1123b. According to this optical device 1250, the optical elements can be mounted on a single glass plate 1111 without using a plurality of glass plates.

For the first path 1123a and 1123b defined by the deflection means 1120 formed by a CGH element, it is possible to adopt a combination of a 0-order diffracted light path or a 1st order diffracted light path or a combination of a 1st order diffracted light path and a 2nd order diffracted light path as will be shown in the 27th to 29th embodiments.

<Embodiment 27>

Figure 71:
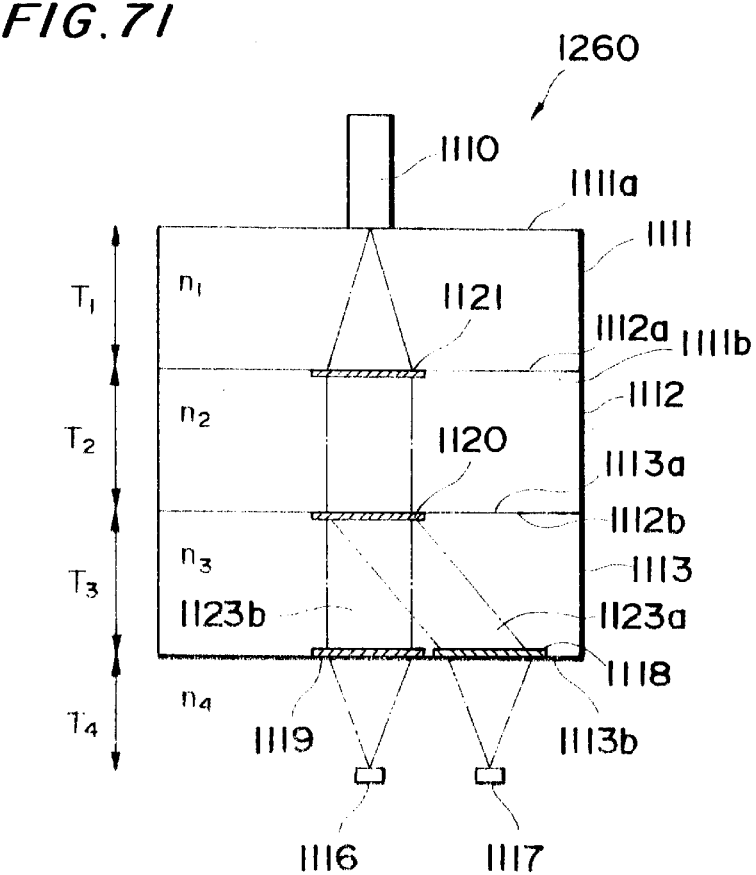
FIG. 71 is a longitudinal section schematically showing an additional optical device 1260 according to the present invention.

In an optical device shown in FIG. 71, the deflection means 1120 formed by a CGH element to receive a parallel light beam from the fourth CGH element 1121 has the first path 1123a and the second path 1123b defined respectively by the 1st order diffracted light path and the 0-order diffracted light path which is a linear propagation path.

Therefore, in the optical device according to the 27th embodiment, a beam of one wavelength component entering from the common path and guided by the fourth CGH element 1121 to the deflection means 1120 travels through the first path 11123a and the first CGH element 1118 to the light detector 1117.

A beam of the other wavelength component emitted from the light source 1116 and guided by the second CGH element 1119 to the second path 1123b travels through the deflection means 1120 and the fourth CGH element 1121 and is output to the common terminal 1110.

In the deflection means 1120 formed by a CGH element, as described above, in the etching process of a lens material with etching masks to form a CGH element, the intensity ratio of the 0-order diffracted light path and the 1st order diffracted light path can be varied by changing the etching depth, so that an appropriate intensity ratio can be obtained by adjusting the etching depth.

Because the 0-order diffracted light path is configured by linearly aligning the diffracted light path with the incident light path, the third CGH element 1120 and the second CGH element 1119 can be formed coaxially. For this reason, in the matter of manufacturing technology, the lens numerical aperture of the CGH element 1119 can be increased more than the case where the CGH element 1119 is used in a high-order diffracted light path at some angle to the incident light path, so that its coupling efficiency with the light source can be improved.

<Embodiment 28>

Figure 72:
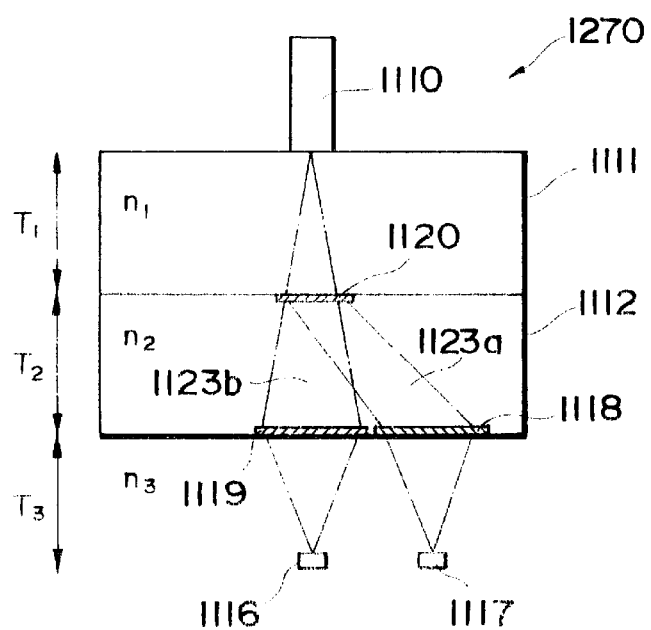
FIG. 72 is a longitudinal section schematically showing another optical device 1270 according to the present invention.

As shown in a 28$^{th}$ embodiment in FIG. 72, the fourth CGF element 1121 can be removed as unnecessary from the 27$^{th}$ embodiment.

In the optical device 1270, in which the fourth CGH element 1121 is omitted (just as in the 22$^{nd}$ embodiment, FIG. 66), each of the first CGH element 1118 and the second CGH element 1119 is provided with an image-forming function.

<Embodiment 29>

Figure 73:
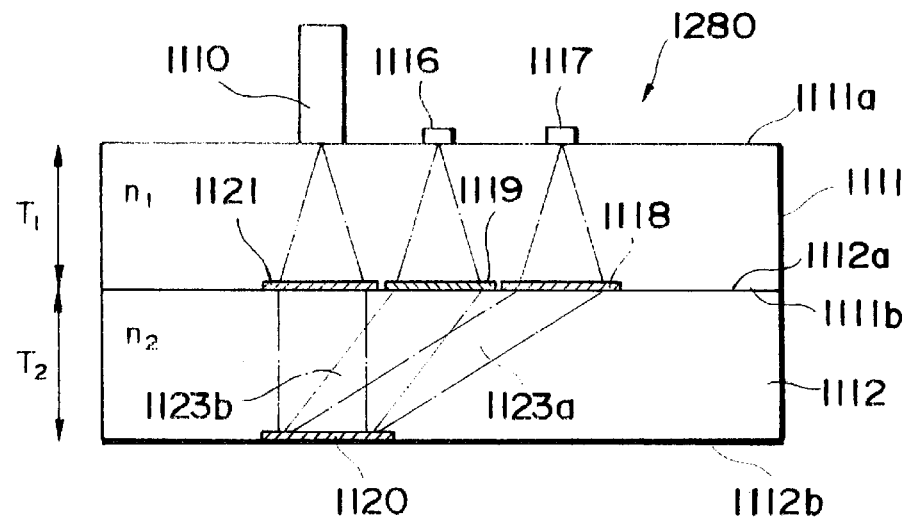
FIG. 73 is a longitudinal section schematically showing a further optical device 1280 according to the present invention.

As shown in a 29th embodiment in FIG. 73, a reflection type CGH element can be adopted for the third CGH element 1120 in the 27th embodiment. In the optical device 1280 in the 29th embodiment, the CGH elements 1121, 1119 and 1118 can be formed on the other surface 1111b of the first glass plate 1111.

In contrast to the arrangement of the 29th embodiment in FIG. 73, the CGH elements 1121, 1119 and 1118 may be formed on one surface 1112a of the second glass plate 1112.

However, the CGH elements 1121, 1119 and 1118 are formed on the other surface 1111b of the first glass plate 1111, which is opposite one surface 1111a, on which the common terminal 1110, the light source 1116 and the light receiver 1117 are formed.

This arrangement makes it relatively easy to align the corresponding optical elements on the opposite surfaces 1111a and 1111b in manufacture.

In the optical device 1280 in the 29th embodiment, the 2nd order diffracted light path of the third CGH element 1120 is used as the first path 1123a, and the 1st order diffracted light path of the third CGH element 1120 is used as the second path 1123b.

In the third CGH element 1120, by using a CGH element of eight phases and setting the etching depth at 1.5 times the wavelength, split light beams each with an intensity of about 40% of the incident light intensity can be obtained.

Further, in the 29th embodiment, the 0-order diffracted light path of the third CGH element 1120 is used as the incident light path to the CGH element 1120. However, for example, a high-order diffracted light path can be used as the incident light path and the 0-order diffracted light path can be used as one optical path (the first path 1123a or the second path 1123b). 30th to 38th embodiments to be described below are the cases of using two CGH element portions, formed in parallel in the optical path, which have fluxes deflected in mutually different directions.

<Embodiment 30>

Figure 74:
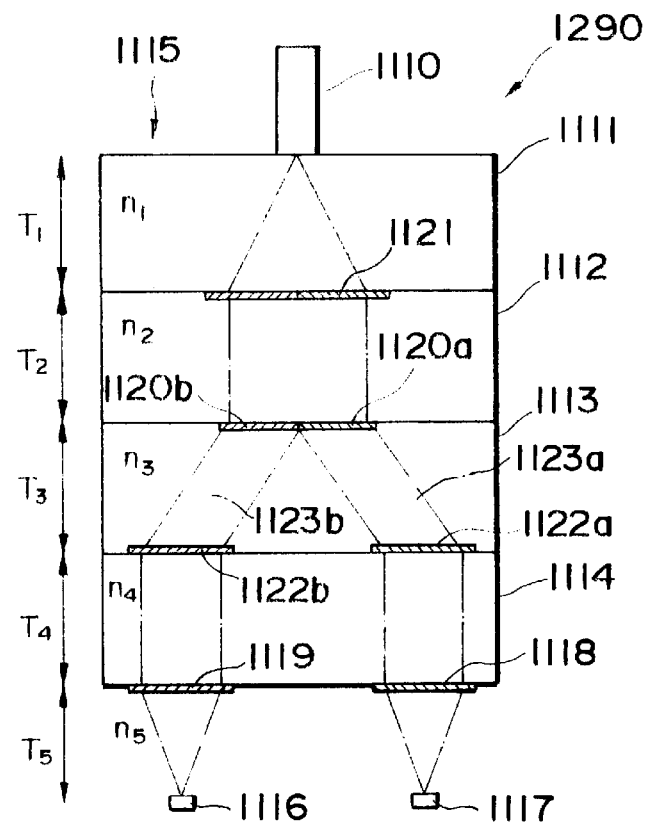
FIG. 74 is a longitudinal section schematically showing yet another optical device 1290 according to the present invention.

In an optical device shown in FIG. 74, an input light of one wavelength component, which is input from the first input terminal 1110 and converted by the fourth CGH element 1121 into a parallel light beam, is separated to the first path 1123a and the second path 1123b by the deflection means 1120 (1120a and 1120b) including two transmission type CGH elements 1120a and 1120b formed on one surface 1113b of the third glass plate 1113.

The deflection means 1120 has CGH element portions thereof (1120a and 1120b) formed in parallel in the parallel light beam path extending from the fourth CGH element 1121 in such a manner that the CGH element portions 1120a and 1120b deflect the light at different deflection angles due to their prism functions.

The one CGH element 1120a defines the first path 1123a and the other CGH element 1120b defines the second path 1123b.

Therefore, a beam of one wavelength component guided by the first path 1123a passes through the fifth CGH element 1122a to the first CGH element 1118 and is guided by the converging function of the CGH element 1118 to the light detector 1117.

A beam of the other wavelength component emitted from the light source 1116 is collimated by the second CGH element 1119 so as to reach the fifth CGH element 1122b which guides the parallel light beam to go through the second path 1123b to the 1120b which further guides the light beam to pass the fourth CGH element 1121 to the common terminal 1110.

<Embodiment 31>

Figure 75:
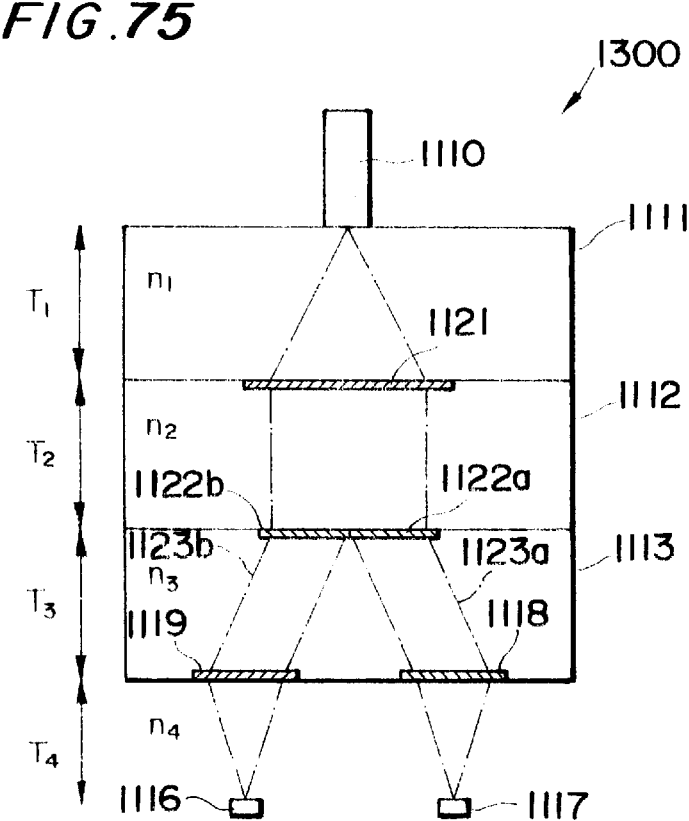
FIG. 75 is a longitudinal section schematically showing a still further optical device 1300 according to the present invention.

As shown in a 31st embodiment in FIG. 75, the fifth CGH element 1122 (1122a and 1122b) in the 30th embodiment can be obviated. In the optical device 1300 in the 31st embodiment, the first CGH element 1118 and the second CGH element 1119 are each added with a prism function in addition to the above-mentioned collimating function and the image-forming function.

In the optical device 1300, in conjunction to the possibility of obviating the fifth CGH element (1122a and 1122b), the fourth glass plate 1114 can also be obviated. Therefore, the device size and production cost can additionally be reduced.

<Embodiment 32>

Figure 76:
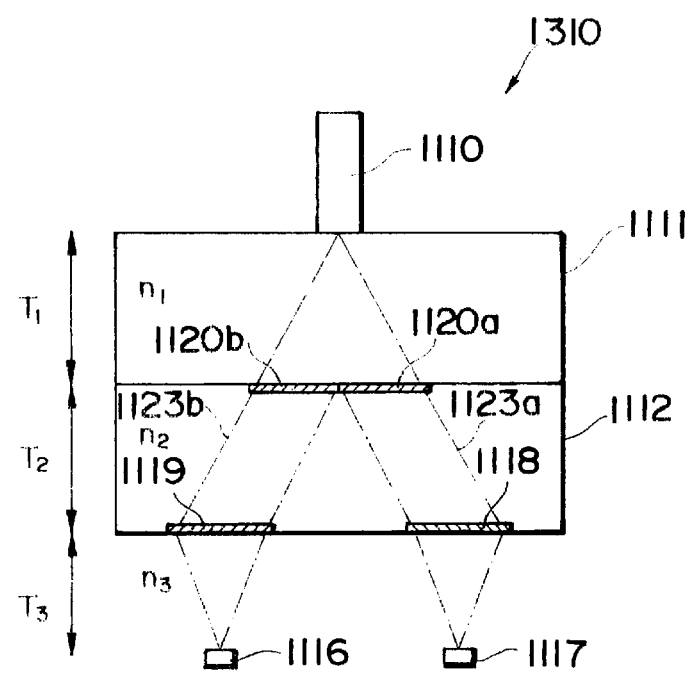
FIG. 76 is a longitudinal section schematically showing an additional optical device 1310 according to the present invention.

As shown in a 32nd embodiment in FIG. 76, the fourth CGH element 1121 shown in the 31st embodiment can be obviated. In the optical device in which the fourth CGH element 1121 has been eliminated, the third CGH element portion 1120a and the third CGH element portion 1120b are each added with a collimating function. The light beams collimated by the third CGH element portions 1120a and 1120b are equivalently converged by the first CGH element 1118 and the second CGH element 1119 to the light source 1116 and the light detector 1117.

In the optical device 1310, besides the fourth CGH element 1121, the third glass plate 1113 can be obviated, and therefore this embodiment is favorable for further reductions of device size and production cost.

<Embodiment 33>

Figure 77:
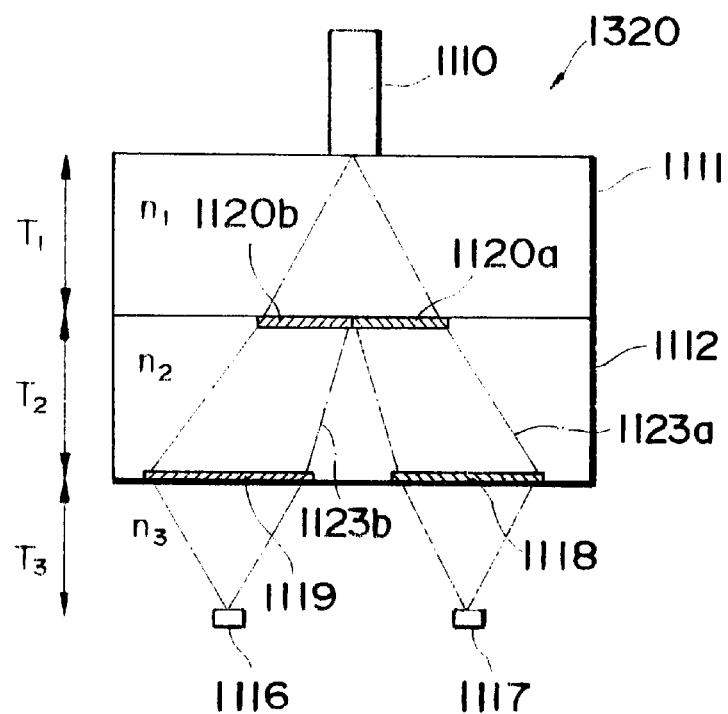
FIG. 77 is a longitudinal section schematically showing another optical device 1320 according to the present invention.

In the 32nd embodiment, the third CGH element portion 1120a and the third CGH element portion 1120b are each added with the collimating function. In contrast, as shown in a 33rd embodiment in FIG. 77, the CGH element portions 1120a and 1120b may be formed as linear gratings.

In the optical device 1320 in the 33rd embodiment, the third CGH element portions 1120a and 1120b formed as linear gratings are unable to collimate light. To compensate for the absence of the collimating function, the first CGH element 1118 and the second CGH element 1119 are each provided with an image-forming function.

<Embodiment 34>

Figure 78:
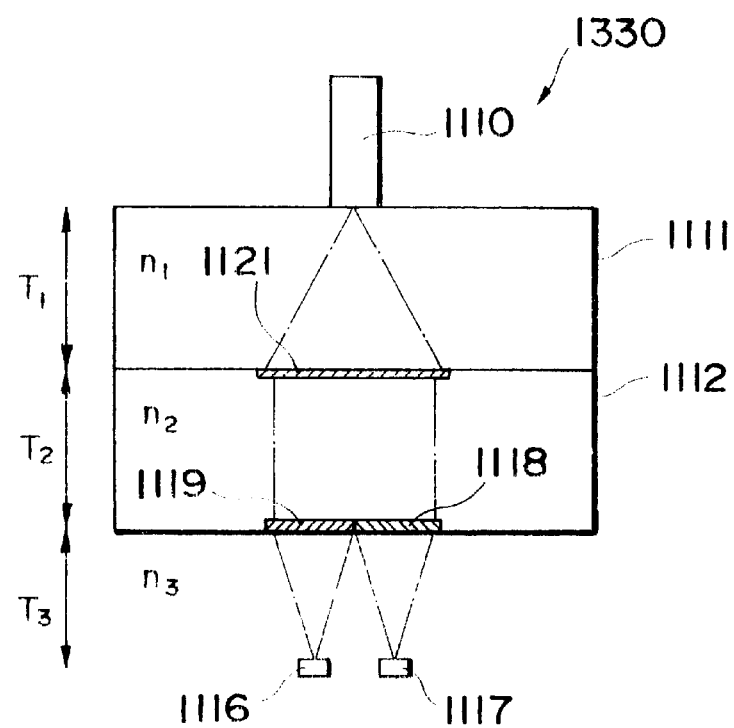
FIG. 78 is a longitudinal section schematically showing a further optical device 1330 according to the present invention.

In a 34th embodiment in FIG. 78, in combination with the optical path having installed therein the four CGH element 1121 capable of collimation, the first CGH element 1118 and the second CGH element 1119 respectively capable of converging light to the light detector 1117 and the light source 1116 are arranged in parallel.

The first CGH element 1118 is arranged to converge a beam of one wavelength component of a parallel light beam from the fourth CGH element 1121 to the light detector 1117. The second CGH element 1119 is arranged to collimate a beam of the other wavelength component from the light source 1116 into a parallel light beam to be guided to the fourth CGH element 1121.

Therefore, in the optical device 1330 according to the 34th embodiment, the first CGH element 1118 and the second CGH element 1119 are charged with performing the functions of the CGH element portions 1120a and 1120b of the deflection means shown in the 30th to 33rd embodiments.

In the 34th embodiment, the second CGH element 1119 can be formed concentric with the fourth CGH element 1121. Therefore, as described with reference to the 27th embodiment, in the phase of manufacturing technology, the number of lens numerical aperture of the CGH element 1119 can be made greater than in the second CGH element 1119 in the 33rd embodiment.

The light intensity distribution to the light source 1116 and the light detector 1117 is determined according to the area ratio of the CGH elements 1118 and 1119. Therefore, despite the fact that the intensity of the light source 1116 is generally difficult to adjust, by setting the light intensity distribution, it becomes possible to adjust the relative coupling efficiency of the light source 1116 with respect to the light detector 1117, the sensitivity of which is generally adjustable. This method is favorable for improvement of the relative coupling efficiency of the light source 1116.

<Embodiment 35>

Figure 79:
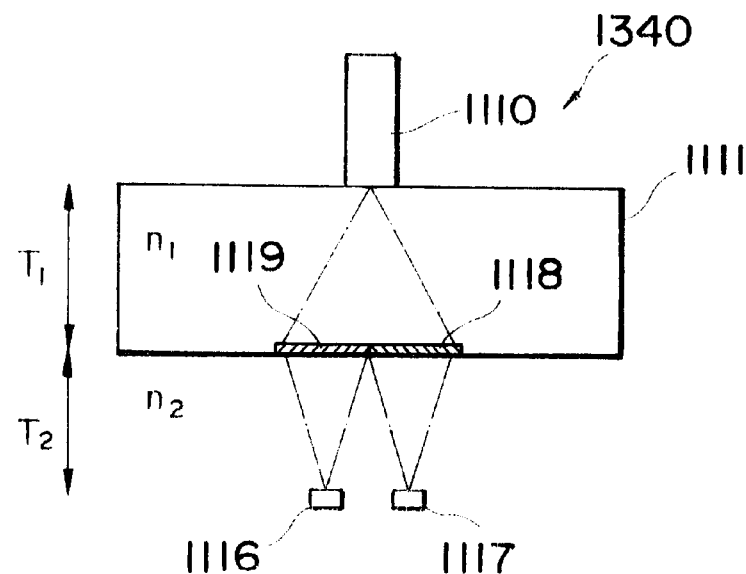
FIG. 79 is a longitudinal section schematically showing yet another optical device 1340 according to the present invention.

As shown in a 35th embodiment in FIG. 79, a divergent light from the common terminal 1110 can be guided to the first CGH element 1118 and the second CGH element 1119 additionally charged with performing the functions of the CGH elements 1120a and 1120b of the deflection means as has been described referring to the 34th embodiment.

According to an optical device 1340 according to the 35th embodiment, the optical device 1340 for bi-directional communication can be realized by mounting, on a single glass plate, the first CGH element 1118 charged with performing the function of the deflection means to guide one wavelength component and also the second CGH element 1119 charged with performing the function of the deflection means to guide the other wavelength component. On account of this, the device structure can be simplified.

Furthermore, the CGH elements 1118 and 1119 can be designed under the identical conditions so as to be adaptable both to one wavelength component and the other wavelength component.

Consequently, it is unnecessary to make corrections to suit one wavelength component or the other wavelength component, for which reason design work can be simplified.

In the 36th to 38th embodiments which will be described below, examples will be described in which for the deflection means 1120, two CGH element portions of the reflection type having mutually different deflection directions are arranged in parallel in the optical path.

<Embodiment 36>

Figure 80:
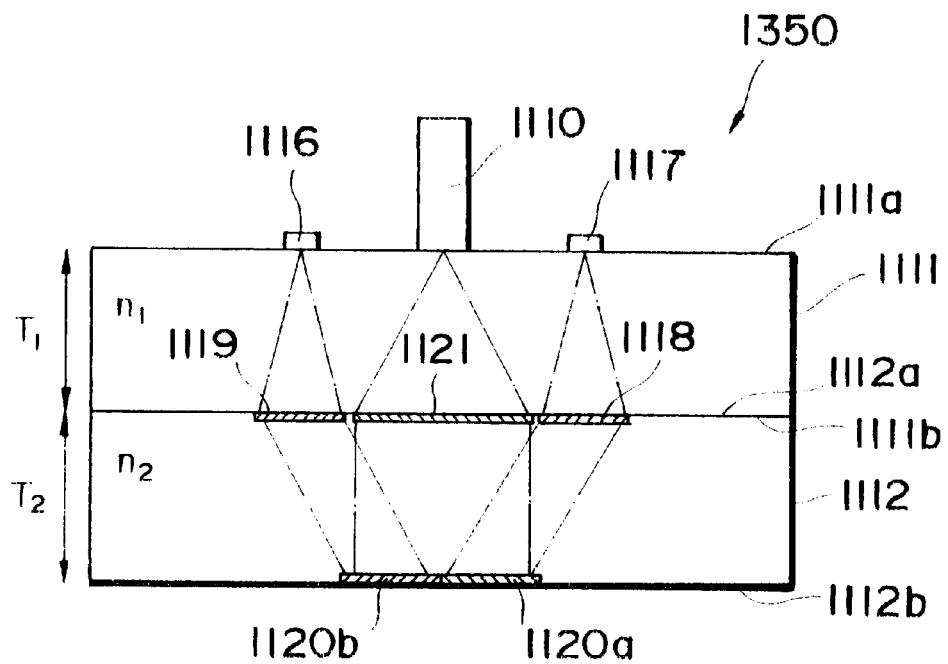
FIG. 80 is a longitudinal section schematically showing a still further optical device 1350 according to the present invention.

In an optical device 1350 according to a 36th embodiment shown in FIG. 80, the common terminal 1110, the light source 1116 and the light detector 1117 are provided on one surface 1111a of the first glass plate 1111. The fourth CGH element 1121, the first CGH element 1118 and the second CGH element 1119 are formed on one surface 1112a of the second glass plate 1112 to which the other surface 1111b of the first glass plate is bonded.

The reflection type CGH element portions 1120a and 1120b, which are the components of the deflection means 1120, are formed in parallel on the other surface 1112b of the second glass plate 1112.

In the optical device 1350, a parallel light beam from the fourth CGH element 1121 is reflected by the reflection type third CGH element portions 1120a and 1120b respectively toward the first CGH element 1118 and the second CGH element 1119, and two separate light beams travel through the first path 1123a and the second path 1123b, and converged by the first CGH element 1118 and the second CGH element 1119 to the light detector 1117 and the light source 1116.

<Embodiment 37>

Figure 81:
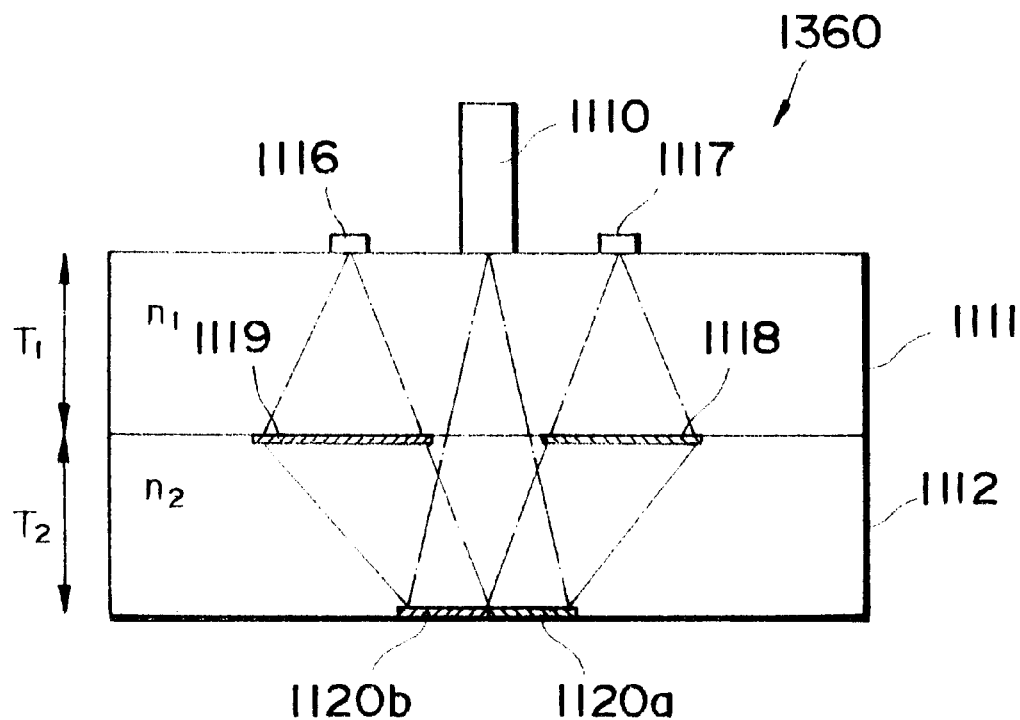
FIG. 81 is a longitudinal section schematically showing an additional optical device 1360 according to the present invention.

As shown in FIG. 81, the fourth CGH element 1121 having the collimating function can be removed as unnecessary from the 36th embodiment in which the reflection type third CGH element 1120 (1120a and 1120b) are used.

In an optical device 1360 of a 37th embodiment, in which the CGH element 1121 is obviated, the first CGH element 1118 and the second CGH element 1119 are each added with an image-forming function in addition to the prism function.

<Embodiment>

Figure 82:
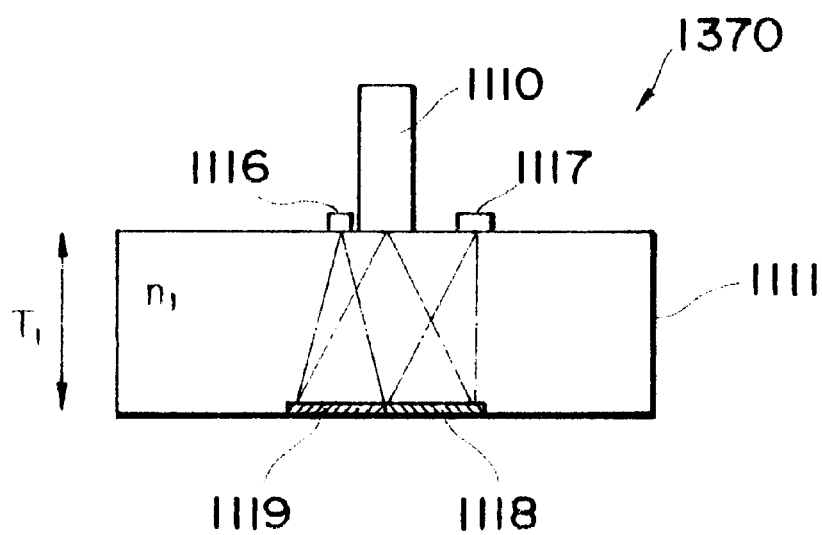
FIG. 82 is a longitudinal section schematically showing another optical device 1370 according to the present invention.

As shown in a 38th embodiment in FIG. 82, reflection type CGH elements can be used for the first CGH element 1118 and the second CGH element 1119 shown in the 35th embodiment, more specifically, for the first CGH element 1118 and the second CGH element 1119 respectively charged with performing the functions of the CGH element portions 1120a and 1120b, which are the components of the deflection means 1120.

According to the optical device 1370 of the 38th embodiment, an optical device like the optical device 1340 for bi-directional communication can be realized by mounting, on a single glass plate, the first CGH element 1118 charged with the function of the deflection means to guide one wavelength component and also the second CGH element 1119 charged with the function of the deflection means to guide the other wavelength component. On account of this, the device structure can be simplified.

Furthermore, the CGH elements 1118 and 1119 can be designed under the identical conditions so as to be adaptable both to one wavelength component and the other wavelength component. Consequently, it is unnecessary to make corrections to suit one wavelength component or the other wavelength component, for which reason design work can be simplified.

In the 39th to 41st embodiments, description will be made of cases in which the deflection means 1120 utilizing the wavelength dependency of the CGH element is used.

<Embodiment 39>

Figure 83:
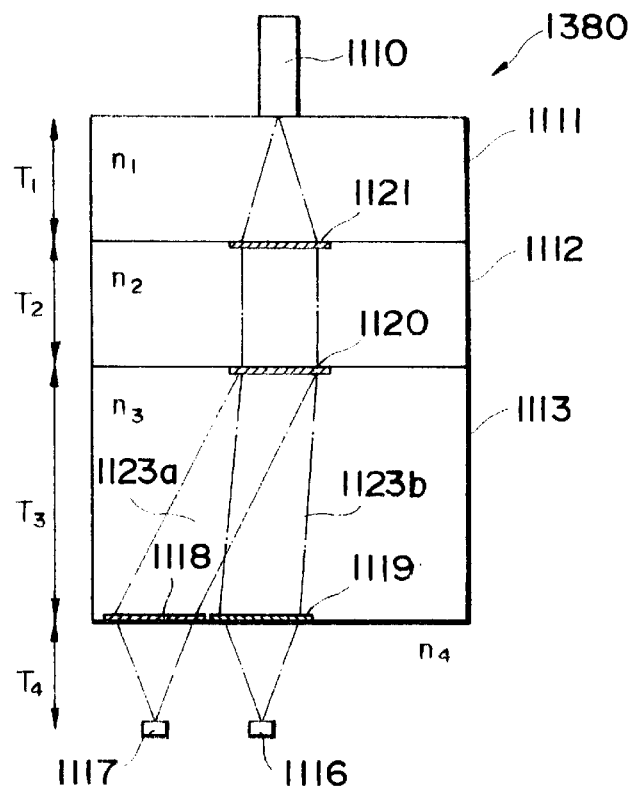
FIG. 83 is a longitudinal section schematically showing a further optical device 1380 according to the present invention.

In an optical device 1380 shown in FIG. 83, the deflection means 1120 to receive a parallel light beam from the fourth CGH element 1121 is formed by a transmission type CGH element with a prism function.

This transmission type CGH element 1120 is a linear grating, and the deflection angle at which it deflects light is greater for light of greater wavelength than light of smaller wavelength.

According to a difference of the deflection angles, the deflection means 1120 defines the first path 1123a with a large deflection angle for a beam of a 1.5 $\mu$m wavelength component and the second path 1123b with a small deflection angle for a 1.3 $\mu$m wavelength component.

Therefore, when a beam of one wavelength component enters from the common terminal 1110, the beam is converted by the fourth CGH element 1121 into a parallel light beam and guided to the deflection means 1120 which deflects the light beam through the first path 1123a to the first CGH element 1118 which, by the image-forming function or the light-converging function, converges the light beam to the light detector 1117.

A beam of the other wavelength component from the light source 1116 is guided by the collimating function or the converging function of the second CGH element 1119 through the second path 1123b to the deflection means 1120 which guides the collimated light beam to pass through the fourth CGH element 1121 to the common terminal 1110.

The CGH element 1120 defines the two optical paths 1123a and 1123b by its wavelength dependency, that is, the wavelength splitting property, and therefore this deflection means 1120 does not suffer loss of light quantity as in wavelength splitting by the WDM mirror.

39

<Embodiment 40>

Figure 84:
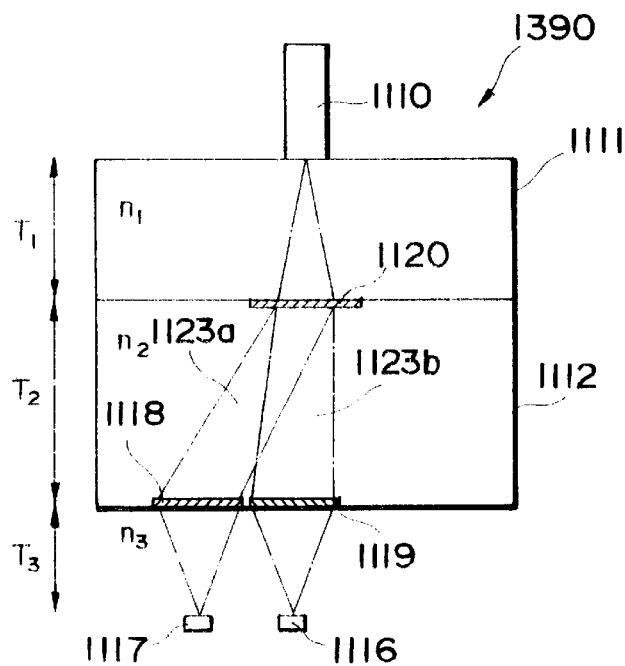
FIG. 84 is a longitudinal section schematically showing yet another optical device 1390 according to the present invention.

As shown in an optical device 1390 in FIG. 84, the fourth CGH element with the collimating function in the optical device 1380 used in the 39$^{th}$ embodiment can be obviated.

By the elimination of the fourth CGH element 1121, the first path 1123a and the second path 1123b extending from the deflection means 1120 and respectively leading to the CGH elements 1118 and 1119 become divergent light paths. Therefore, as described referring to the 22nd embodiment, the first CGH element 1118 and the second CGH element 1119 are each provided with an image-forming function.

Compared with the optical device 1380, the optical device 1390 can obviate the fourth CGH element 1121 and the third glass plate 1113, and is favorable for reductions of device size and production cost.

<Embodiment 41>

Figure 85:
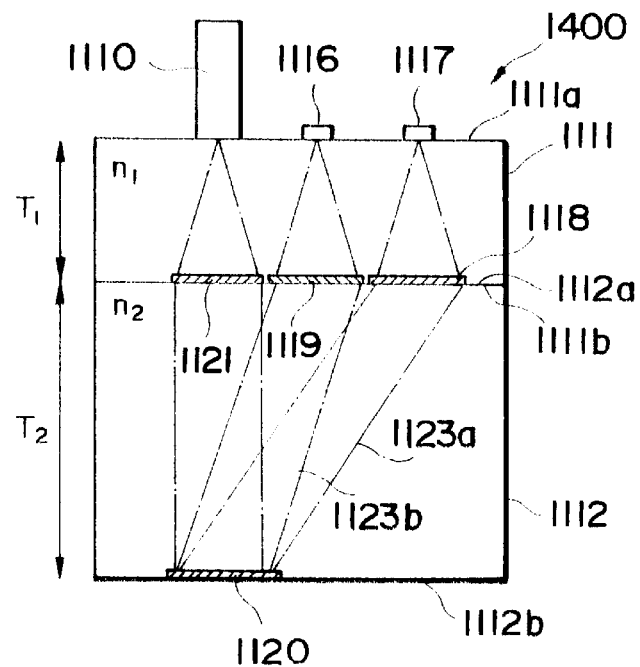
FIG. 85 is a longitudinal section schematically showing a still further optical device 1400 according to the present invention.

In an optical device 1400 according to a 41st embodiment shown in FIG. 85, a reflection type CGH element is used for the wavelength-splitting type deflection means 1120. The common terminal 1110, the light source 1116 and the light detector 1117 are provided on one surface 1111a of the first glass plate 1111. The fourth CGH element 1121, the first CGH element 1118 and the second CGH element 1119 are provided on one surface of the second glass plate 1112 which is bonded to the other surface of the first glass plate 1111.

The wavelength-splitting type deflection means 1120 is provided on the other surface 1112b of the second glass plate 1112, and a reflection type CGH element is used for the third CGH element 1120 as the deflection means.

Thus, one wavelength component of a parallel light beam from the fourth CGH element 1121 is reflected by the reflection type third CGH element 1120 toward the first CGH element 1118, and the light beam is guided through the first path 1123a to the light detector 1117. The other wavelength component from the light source 1116 is guided through the second CGH element 1119 to travel through the second path 1123b. By the reflection of the deflection means 1120, the other wavelength component is guided to the fourth CGH element 1121 and converted by the CGH element 1121 to the common terminal 1110.

The CGH elements 1118, 1119 and 1121 of the optical device 1400 can be formed on one surface of the second glass plate 1112. However, as in the 29th embodiment, in the 41st embodiment shown in FIG. 85, the CGH elements 1118, 1119 and 1121 are formed on the surface 1111b of the first glass plate 1111 which is opposite the one surface 1111a where the common terminal 1110, the light source 1116 and the light detector 1117 are provided.

In this 41st embodiment of FIG. 85, it is relatively easy to align the corresponding optical elements on the opposite surfaces 1111a and 1111b of the first glass plate 1111, which is an advantage in the manufacturing process.

In the 42nd to 45th embodiments, description will be made of cases where a wavelength splitting filter is used for the deflection means 1120.

<Embodiment 42>

Figure 86:
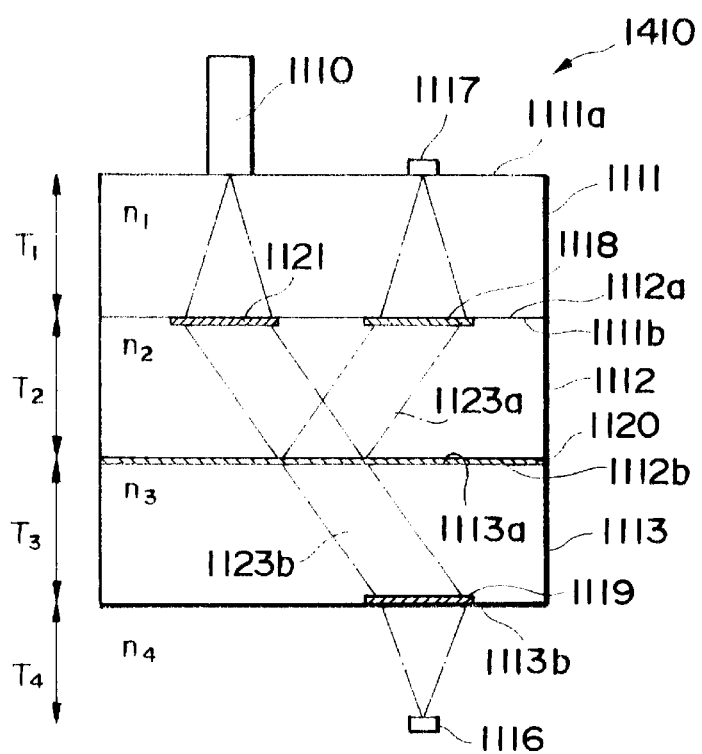
FIG. 86 is a longitudinal section schematically showing an additional optical device 1410 according to the present invention.

In an optical device 1410 according to a 42nd embodiment of FIG. 86, the common terminal 1110 and the light detector 1117 are provided on one surface 1111a of the first glass plate 1111. The first CGH element 1118 and the fourth CGH element 1121 are provided on one surface 1112a of the second glass plate 1112 which is bonded to the other surface 1111b of the first glass plate 1111. A wavelength splitting filter 1120 such as a WDM mirror made of multiple electric films is mounted between the second glass plate 1112 and the third glass plate 1113.

In the optical device 1410, the incident light from the common terminal 1110 enters the wavelength splitting filter 1120 as it passes through and is deflected by the fourth CGH element 1121. Therefore, this wavelength splitting filter 1120 reflects the incident parallel light beam of one wavelength component toward the first CGH element 1118. The beam of one wavelength component reflected by the deflection means 1120 travels along the first path 1123a and is guided to the first CGH element 1118 and converged by the first CGH element 1118 to the light detector 1117.

The wavelength splitting filter 1120 transmits the beam of the other wavelength component. The transmitted light path defines the second path 1123b. The second CGH element 1119 is provided on the surface 1113b of the third glass plate 1113 to which the second path 1123b extends.

Therefore, the light beam of the other wavelength component from the light source 1116 is guided by the second CGH element 1119 to the second path 1123b, and the wavelength splitting filter transmits the light beam of the other wavelength component to the fourth CGH element 1121 which converges the light beam to the common terminal 1110.

<Embodiment 43>

Figure 87:
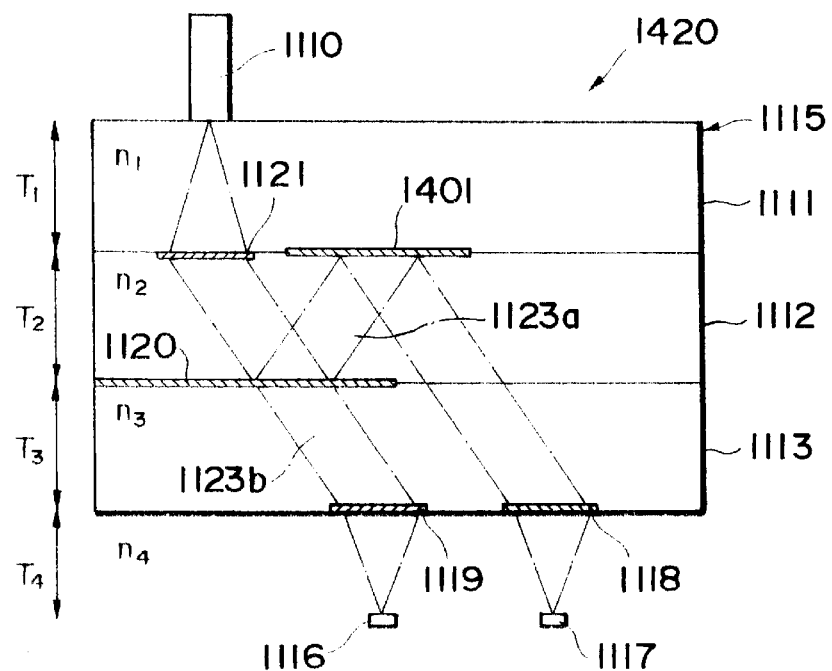
FIG. 87 is a longitudinal section schematically showing another optical device 1420 according to the present invention.

In an optical device 1420 according to a 43rd embodiment in FIG. 87, in the first path 1123a defined by the reflection by the wavelength splitting filter 1120, a reflective means 1401 such as a mirror is provided between the first glass plate 1111 and the second glass plate 1112.

By this reflective means 1401, the first path 1123a can be turned toward the surface 1113b of the third glass plate 1113 on which the second CGH element 1119 is provided.

By the reflection by the reflective means 1401, the first CGH element 1118 can be provided, which is matched to the first CGH element 1118, on the surface 1113b of the third glass plate where the second CGH element 1119 is provided, in other words, on the same surface of the multilayer structure 1115.

<Embodiment 44>

Figure 88:
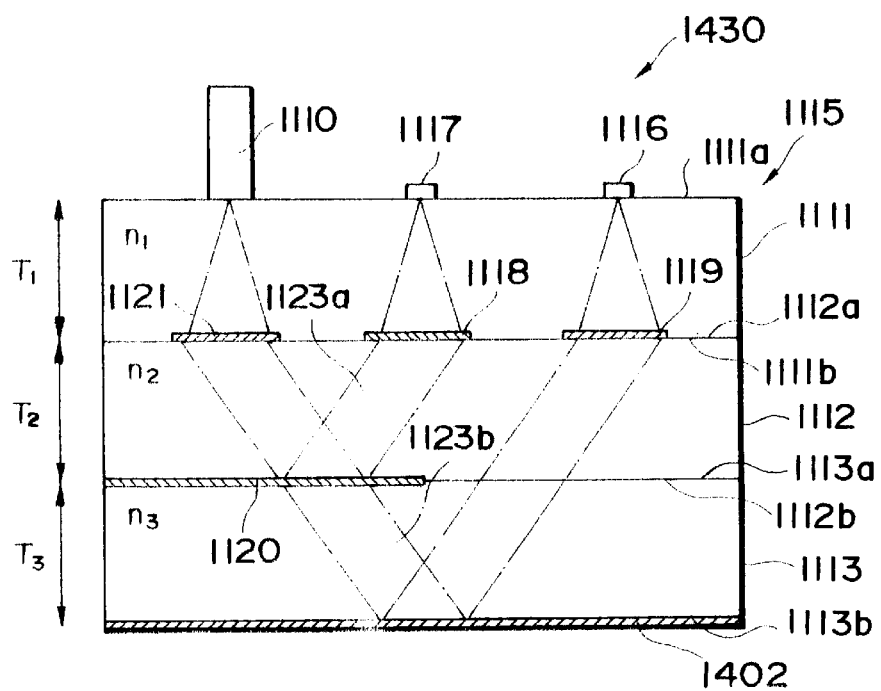
FIG. 88 is a longitudinal section schematically showing a further optical device 1430 according to the present invention.

As shown in a 44th embodiment in FIG. 88, a mirror 1402 to reflect the second path 1123b continuous from the wavelength splitting filter 1120 is provided on the other surface 1113 of the third glass plate 1113 which is bonded at one surface 1113a thereof to the second glass plate 1112.

According to the optical device 1430 of the 44th embodiment, the second path 1123b can be directed to the same direction as the first path 1123a by the mirror 1402. Therefore, the second CGH element 1119 can be provided on the other surface 1111b of the first glass plate on which the first CGH element 1118 is mounted.

As a result, it becomes possible to arrange the common terminal 1110, the light source 1116 and the light detector 1117 on the same surface, in other words, on the same side of the multilayer structure 1115.

<Embodiment>

Figure 89:
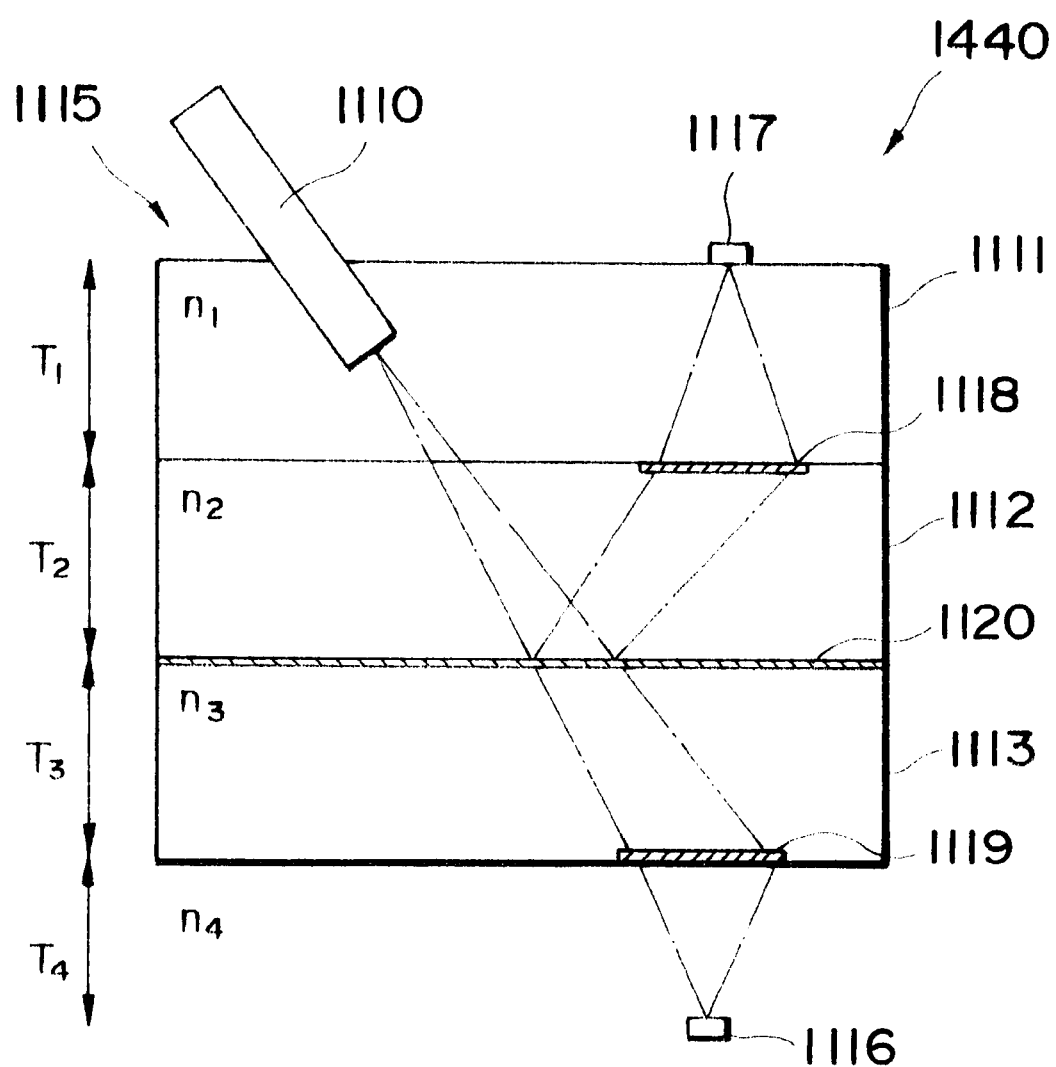
FIG. 89 is a longitudinal section schematically showing yet another optical device 1440 according to the present invention.

To clearly separate the first path 1123a from the second path 1123b, the incident light from the common terminal 1110 is guided obliquely to the wavelength splitting filter 1120 by the deflection function of the fourth CGH element 1121. However, as shown in the 45th embodiment in FIG. 89, by arranging the common terminal 1110 in a position at an angle to the glass plate 1111, the incident light from the common terminal 1110 can be guided obliquely to the wavelength splitting filter 1120 without using the fourth CGH element 1121 shown in the 42nd embodiment.

In the optical device 1440 of the 45th embodiment, by the elimination of the fourth CGH element 1121, the first path 1123a and the second path 1123b from the deflection means 1120 to the CGH elements 1118 and 1119 are both divergent light paths.

Therefore, as described in the 22nd embodiment, the first CGH element 1118 and the second CGH element 1119 are each provided with an image-forming function.

In the optical device according to the present invention, besides the combinations of the deflection means and the optical path splitting means shown in the various embodiments, those means can be used in appropriate combinations in accordance with various changes and modifications of the optical paths.

Furthermore, the optical paths of the multilayer structure can be changed as necessity requires.

According to the above-mentioned optical device according to the present invention, the diffraction-applied computer generated holograms can be charged with the collimating function, the light converging function, deflection function, the optical path dividing action, and the wavelength splitting action in duplication or selectively as required, for which reason the optical device can be made in a compact size. Furthermore, since the computer generated holograms obviate the need of fusion splicing with optical fibers, the computer generated holograms save fusion splicing labor and reduce production cost, so that it becomes possible to produce the optical device at lower cost than the conventional fiber optical device.

By the above-mentioned manufacturing method according to the present invention, by forming a multilayer structure containing a plurality of sets of optical devices by integrating optical elements, including many computer generated holographic elements, and splitting the multilayer structure into individual optical devices, the optical device according to the present invention can be manufactured with very high efficiency.

What is claimed is:

1. For use in optical network units in optical communication, an optical device having a first input terminal for receiving a multiplexed light having component beams of mutually different wavelengths included therein; a first output terminal for outputting a beam of a first wavelength component separated from said multiplexed light received at said input terminal; and a pair of second input and output terminals for enabling bi-direction communication to direct to said first input terminal a beam of a second wavelength component separated from said multiplexed light, said optical device comprising:

a first computer generated hologram for converting said multiplexed light from said first input terminal into a parallel beam;

deflection means for deflecting said multiplexed light having passed through said first computer generated hologram according to wavelengths thereof;

a second computer generated hologram for directing to the first output terminal a beam of the first wavelength component separated by said deflection means;

optical path splitting means for separating said second wavelength component separated by said deflection means;

a third computer generated hologram for directing a beam of the second wavelength component traveling through one optical path separated by said optical path splitting means to said second output terminal; and a fourth computer generated hologram for guiding a beam of the second wavelength component from said second input terminal to said optical path splitting means in order to direct the beam of the second wavelength component from the second input terminal to said first input terminal through the other optical path, the optical path splitting means and the first computer generated hologram.

2. An optical device for an optical network unit in optical communication according to claim 1, wherein said first computer generated hologram has a collimating function to producing a parallel light beam and a deflection means to deflect said parallel light beam to direct the beam from said first input terminal to said deflection means.

3. An optical device for an optical network unit in optical communication according to claim 1, wherein said second computer generated hologram has a light converging function and a deflection function to direct a beam of the first wavelength component separated by said deflection means to said first output terminal.

4. An optical device for an optical network unit in optical communication according to claim 1, wherein said deflection means is formed by a wavelength splitting filter to reflect a beam of the first wavelength component and transmit a beam of the second wavelength component.

5. An optical device for an optical network unit in optical communication according to claim 1, wherein said wavelength splitting filter is formed by a dielectric filter.

6. An optical device for an optical network unit in optical communication according to claim 1, wherein said optical path splitting means is formed by a transmission type computer generated hologram having a prism function to separate out a beam of the second wavelength component.

7. An optical device for an optical network unit in optical communication according to claim 6, wherein said transmission type computer generated hologram having a prism function separates a beam of the second wavelength component into a 1st order diffracted light and a minus 1st order diffracted light.

8. An optical device for an optical network unit in optical communication according to claim 1, wherein said third computer generated hologram has a deflecting function and a converging function to direct a beam of the second wavelength component to said second output terminal.

9. An optical device for an optical network unit in optical communication according to claim 1, wherein said fourth computer generated hologram has a collimating function to direct a beam of the second wavelength component from said second input terminal to said deflection means.

10. An optical device for an optical network unit in optical communication according to claim 1, further comprising a first plate, a second plate and a third plate each having transparency, laminated one on another, wherein said first and second computer generated holograms are mounted in parallel on one surface bonded to the other surface opposite one surface of said first plate where said first input terminal and said first output terminal are provided, wherein said deflection means is provided on the other surface of said second plate, wherein said optical path splitting means is provided on one surface of said third plate, bonded to said second plate, and wherein said third and fourth computer generated holograms are arranged in parallel on the other surface of said third plate.

11. An optical device for an optical network unit in optical communication according to claim 1, further comprising a first plate, a second plate, a third plate and a fourth plate each having transparency, laminated one on another, wherein said first and second computer generated holograms are mounted in parallel on one surface bonded to the other surface opposite one surface of said first plate where said first input terminal and said first output terminal are provided, wherein said deflection means is provided on the other surface of said second plate, wherein said optical path splitting means is provided on one surface of said third plate, bonded to said second plate, wherein said third and fourth computer generated holograms are arranged in parallel on one surface of said fourth plate bonded to the other surface of said third plate, and wherein said second input and output terminals are provided on the other surface of the fourth plate.

12. An optical device for an optical network unit in optical communication according to claim 1, wherein said deflection means is formed by a transmission type computer generated hologram having a prism function.

13. An optical device for an optical network unit in optical communication according to claim 1, wherein said deflection means includes two computer generated holograms having mutually different deflection characteristics, arranged in parallel in the optical path extending from said first computer generated hologram.

14. An optical device for an optical network unit in optical communication according to claim 1, wherein said deflection means is formed by a reflection type computer generated hologram.

15. An optical device for an optical network unit in optical communication according to claim 1, wherein said optical path splitting means is formed by a wavelength splitting filter made of multiple dielectric films.

16. An optical device for an optical network unit in optical communication according to claim 1, wherein said third and fourth computer generated holograms are arranged in parallel in the optical path extending from said deflection means and respectively perform the function of the optical path disjoining function.

17. An optical device for an optical network unit in optical communication according to claim 1, wherein said third and fourth computer generated holograms are arranged in parallel in the optical path extending from the first computer generated hologram and reform the functions of said deflection means and said optical path splitting means.

18. An optical device for an optical network unit in optical communication according to claim 1, wherein said pair of second input and output terminals correspond to a light source and a light detector.

19. An optical device for an optical network unit in optical communication having a common terminal for receiving a beam of one wavelength component and outputting a beam of the other wavelength component out of beams of mutually different wavelength components for bidirectional communication; an output terminal for sending out the beam of one wavelength component to a light detector; and an input terminal for receiving the beam of the other wavelength component from a light source, comprising:
  deflection means for separating the optical path from said common terminal into first and second optical paths according to wavelengths of light;
  a first computer generated hologram for converging the beam of one wavelength component entering the common terminal to the light detector; and
  a second computer generated hologram for guiding the beam of the second wavelength component from the light source to said deflection means to direct the beam of the second wavelength component to the common terminal through said deflection means.

20. An optical device for an optical network unit in optical communication according to claim 19, wherein said deflection means is formed by the third computer generated hologram.

21. An optical device for an optical network unit in optical communication according to claim 20, wherein the high-order diffracted light path of said third computer generated hologram is used as at least one of the separated optical paths.

22. An optical device for an optical network unit in optical communication according to claim 21, wherein said third computer generated hologram is a transmission type computer generated hologram.

23. An optical device for an optical network unit in optical communication according to claim 21, said third computer generated hologram is a reflection type computer generated hologram.

24. An optical device for an optical network unit in optical communication according to claim 21, wherein with said third computer generated hologram, the optical paths for the 1st order diffracted light and the minus 1st order diffracted light are used as said first and second optical paths.

25. An optical device for an optical network unit in optical communication according to claim 21, wherein with said third computer generated hologram, the optical paths for the 0-order diffracted light or the 2nd order diffracted light and the 1st order diffracted light are used as said first and second optical paths.

26. An optical device for an optical network unit in optical communication according to claim 20, wherein said third computer generated hologram is formed by a pair of computer generated hologram portions with mutually different directions of diffraction, arranged in parallel in the optical path.

27. An optical device for an optical network unit in optical communication according to claim 20, wherein said third computer generated hologram forms said first and second optical paths by utilizing the wavelength dependency of diffraction angle by the prism function thereof.

28. An optical device for an optical network unit in optical communication according to claim 19, wherein said first computer generated hologram has a light-converging function to direct the beam from said deflection means to said light detector, and said second computer generated hologram has a collimating function or an image-forming function to direct the beam from said light source to said deflection means.

29. An optical device for an optical network unit in optical communication according to claim 19, wherein between said common terminal and said deflection means, there is provided a fourth computer generated hologram having a collimating function to obtain a parallel light beam to direct a beam from said common terminal to said deflection means.

30. An optical device for an optical network unit in optical communication according to claim 19, wherein said first and second computer generated holograms are arranged in parallel in the optical path between said common terminal and said light source and said light detector and perform the function of said deflection means.

31. An optical device for an optical network unit in optical communication according to claim 19, wherein said deflection means is formed by a wavelength splitting filter to reflect a beam of the first wavelength component and transmit a beam of the second wavelength component.

32. An optical device for an optical network unit in optical communication according to claim 31, wherein said wavelength splitting filter is formed by a dielectric filter.

33. A method of manufacturing an optical device for an optical network unit in optical communication, including:
  a first computer generated hologram for converting a multiplexed light from a first input terminal into a parallel light beam;
  deflection means for deflecting the multiplexed light having passed through said first computer generated hologram according to wavelengths;
  a second computer generated hologram for directing a beam of a first wavelength component separated by said deflection means to a first output terminal;

optical path splitting means for deflecting a beam of a second wavelength component separated by said deflection means;

a third computer generated hologram for directing the beam of the second wavelength component traveling along one optical path separated by said optical path splitting means from a second output terminal to a light detector;

a fourth computer generated hologram for guiding a beam of the second wavelength component from a light source to said optical path splitting means in order to direct the beam of the second wavelength component from a second input terminal through the other optical path, said optical path splitting means and said first computer generated hologram to said first input terminal, said manufacturing method comprising the steps of:

forming said computer generated holograms, the deflection means and the optical path splitting means in high density on selected attaching surfaces of a plurality of plates with transparency to be bonded together;

joining said plates together to form a laminated body; and splitting said laminated body in the through-thickness direction to form a large number of said optical device.

34. A method of manufacturing an optical device for an optical network unit in optical communication, including:

a first computer generated hologram for converting a multiplexed light from a first input terminal into a parallel light beam;

deflection means for deflecting the multiplexed light having passed through said first computer generated hologram according to wavelengths;

a second computer generated hologram for directing a beam of a first wavelength component separated by said deflection means to a first output terminal;

optical path splitting means for deflecting a beam of a second wavelength component separated by said deflection means;

a third computer generated hologram for directing the beam of the second wavelength component traveling along one optical path separated by said optical path splitting means from a second output terminal to a light detector;

a fourth computer generated hologram for guiding a beam of the second wavelength component from a light source to said optical path splitting means in order to direct the beam of the second wavelength component from a second input terminal through the other optical path, said optical path splitting means and said first computer generated hologram to said first input terminal, said manufacturing method comprising the steps of:

forming in high density a large number of first and second computer generated holograms in pairs on one attaching surface of a second plate with transparency to be bonded to a first plate with transparency;

forming said deflection means in high density on the other surface of said second plate;

forming said deflection means in high density on one surface of a third plate with transparency facing said second plate and forming said third and fourth computer generated holograms in corresponding pairs in high density on the other surface of said third plate;

forming a laminated body by joining said first and third plates together; and splitting said laminated body in the through-thickness direction to obtain a large number of separate optical device.

* * * * *